US012658567B2

(12) United States Patent
Xue et al.

(10) Patent No.: US 12,658,567 B2
(45) Date of Patent: Jun. 16, 2026

(54) ELECTRONIC DEVICE

(71) Applicant: Huawei Technologies Co., Ltd., Shenzhen (CN)

(72) Inventors: Liang Xue, Shanghai (CN); Hanyang Wang, Reading (GB); Meng Hou, Shanghai (CN); Mao Ye, Xi'an (CN); Sining Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/901,872

(22) Filed: Sep. 30, 2024

(65) Prior Publication Data

US 2025/0030154 A1 Jan. 23, 2025

Related U.S. Application Data

(63) Continuation of application No. PCT/CN2023/084759, filed on Mar. 29, 2023.

(30) Foreign Application Priority Data

Apr. 1, 2022 (CN) ......................... 202210348011.3
Jul. 19, 2022 (CN) ......................... 202210849062.4

(51) Int. Cl.
*H01Q 1/24* (2006.01)
*H01Q 5/328* (2015.01)
(Continued)

(52) U.S. Cl.
CPC ............. *H01Q 1/243* (2013.01); *H01Q 5/328* (2015.01); *H01Q 5/371* (2015.01); *H01Q 7/00* (2013.01);
(Continued)

(58) Field of Classification Search
CPC ........ H01Q 1/243; H01Q 5/314; H01Q 5/321; H01Q 5/328; H01Q 5/357; H01Q 5/364;
(Continued)

(56) References Cited

U.S. PATENT DOCUMENTS

2025/0183519 A1* 6/2025 Li ............................ H01Q 7/00

FOREIGN PATENT DOCUMENTS

CN 111276806 A 6/2020
CN 112467371 A 3/2021
(Continued)

OTHER PUBLICATIONS

H. Nakano, "Metaline-based antennas," 2017 11th European Conference on Antennas and Propagation (EUCAP), Paris, France, Mar. 19-24, 2017, pp. 739-742, doi: 10.23919/EuCAP.2017.7928041, total 4 pages.
(Continued)

*Primary Examiner* — Robert Karacsony
(74) *Attorney, Agent, or Firm* — Conley Rose, P.C.

(57) ABSTRACT

An electronic device has a radiator including a first end, a second end, a ground point, a first connection point, and a second connection point. The ground point is disposed in a central area of the radiator. A length of the radiator is greater than three-quarters of a first wavelength which is a medium wavelength of a first resonance generated by the radiator. A first inductor is electrically connected between the first connection point and the ground plane, and a second inductor is electrically connected between the second connection point and the ground plane, inductance values of the inductors are less than or equal to a first threshold. A distance between the first connection point and the first end is less than a quarter of the first wavelength, and the second connection point is located between the first connection point and the second end.

20 Claims, 48 Drawing Sheets

100

(51) Int. Cl.

*H01Q 5/371* (2015.01)
*H01Q 7/00* (2006.01)
*H01Q 9/28* (2006.01)
*H01Q 9/42* (2006.01)
*H01Q 13/10* (2006.01)

(52) U.S. Cl.

CPC ............... *H01Q 9/285* (2013.01); *H01Q 9/42* (2013.01); *H01Q 13/10* (2013.01)

(58) Field of Classification Search

CPC .......... H01Q 5/371; H01Q 7/00; H01Q 9/285; H01Q 9/42; H01Q 13/10

See application file for complete search history.

(56) References Cited

FOREIGN PATENT DOCUMENTS

| | | | |
|---|---|---|---|
| CN | 114122712 | A | 3/2022 |
| CN | 116345153 | A | 6/2023 |
| WO | 2021238557 | A1 | 12/2021 |

OTHER PUBLICATIONS

H. Li and Y. Li, "Mode Compression Method for Wideband Dipole Antenna by Dual-Point Capacitive Loadings," in IEEE Transactions on Antennas and Propagation, vol. 68, No. 8, pp. 6424-6428, Aug. 2020, doi: 10.1109/TAP.2020.2972642., total 5 pages.

* cited by examiner

400

400

400

ELECTRONIC DEVICE

CROSS-REFERENCE TO RELATED APPLICATIONS

This is a continuation of International Patent Application No. PCT/CN2023/084759 filed on Mar. 29, 2023, which claims priority to Chinese Patent Application No. 202210849062.4 filed on Jul. 19, 2022 and Chinese Patent Application No. 202210348011.3 filed on Apr. 1, 2022. All of the aforementioned patent applications are hereby incorporated by reference in their entireties.

TECHNICAL FIELD

This application relates to the field of wireless communication, and in particular, to an electronic device.

BACKGROUND

Wireless communication technologies are rapidly evolving. In the past, a second generation (2G) mobile communication system mainly supports a call function, electronic devices are only a tool used by people to send and receive Short Message Service (SMS) messages and perform voice communication, and a wireless network access function is extremely slow because data is transmitted through a voice channel. Nowadays, in addition to making a call, sending an SMS message, and taking a photo, the electronic devices may be further used for listening to music online, watching an online movie and real-time video, and the like, which cover various applications such as calls, movie and television entertainment, and e-commerce in people's life. In these applications, a plurality of functional applications may need to upload and download data over a wireless network. Therefore, high-speed data transmission is of great importance.

As people's demands for high-speed data transmission increase, a development trend of an industrial design of an electronic device is to have a large screen-to-body ratio and a plurality of cameras. Consequently, antenna clearance is greatly reduced, and space for layout is increasingly limited. In addition, many new communication specifications have emerged, and more antennas may need to be deployed in a mobile phone. A multi-antenna co-existence design and single-antenna performance improvement have been subjects of research for antenna designers. A trend of a design of an antenna in an electronic device is antenna miniaturization, but this requirement is in conflict with features of the antenna serving as an open system, restricting performance of the antenna.

SUMMARY

An embodiment of this application provides an electronic device, including a radiator, a ground plane, a first inductor, and a second inductor. With the use of the inductors disposed between the radiator and the ground plane, a radiation aperture in an antenna structure may be expanded, and a conductor loss is reduced, to effectively improve radiation efficiency of the antenna structure.

According to a first aspect, an electronic device is provided, including: a radiator, including a first end, a second end, a ground point, a first connection point, and a second connection point, the ground point, the first connection point, and the second connection point are located between the first end and the second end, where the ground point is disposed in a central area of the radiator, and both the first end and the second end are open ends; a ground plane, where the radiator is grounded at the ground point through the ground plane; and a first inductor and a second inductor, where inductance values of the first inductor and the second inductor are both less than or equal to a first threshold. A length of the radiator from the first end to the second end is greater than three-quarters of a first wavelength, a part of the radiator from the first end to the second end is configured to generate a first resonance, and the first wavelength is a medium wavelength of the first resonance; the first inductor is electrically connected between the first connection point and the ground plane, and the second inductor is electrically connected between the second connection point and the ground plane; and a distance between the first connection point and the first end is less than a quarter of the first wavelength, and the second connection point is located between the first connection point and the second end.

According to this embodiment of this application, the inductors disposed between the radiator and the ground plane may be used, so that when an electrical signal is fed at a feed point, because the first inductor and the second inductor are electrically connected between the radiator and the ground plane at the first connection point and the second connection point respectively, a current on the radiator is reversed in areas near the first connection point and the second connection point. Correspondingly, a current on the ground plane is also reversed in an area near a connection between the first inductor and the ground plane and an area near a connection between the second inductor and the ground plane Current density on the radiator may be dispersed (strength of a single maximum current is reduced, so that the current is distributed more evenly). Therefore, a loss caused by the radiator and a conductor disposed around the radiator is reduced, to further improve efficiency of an antenna structure.

With reference to the first aspect, in some implementations of the first aspect, when a frequency of the first resonance is less than or equal to 1 gigahertz (GHz), the first threshold is 6 nanohenries (nH); when a frequency of the first resonance is greater than 1 GHz and less than or equal to 2.2 GHz, the first threshold is 4 nH; when a frequency of the first resonance is greater than 2.2 GHz and less than or equal to 3 GHz, the first threshold is 3 nH; or when a frequency of the first resonance is greater than 3 GHz, the first threshold is 2 nH.

According to this embodiment of this application, the inductance values of the first inductor and the second inductor are designed based on different operating frequency bands of the antenna structure, so that the current on the radiator is distributed more evenly in the operating frequency band, and a conductor loss is reduced, to further improve the efficiency of the antenna structure.

With reference to the first aspect, in some implementations of the first aspect, the first connection point is located between the first end and the ground point, and the second connection point is located between the second end and the ground point; and a distance between the second connection point and the second end is less than a quarter of the first wavelength.

According to this embodiment of this application, the distance between the first connection point and the first end is less than a quarter of the first wavelength, so that the efficiency of the antenna structure may be further improved.

With reference to the first aspect, in some implementations of the first aspect, the electronic device further includes a third inductor, electrically connected between a third connection point and the ground plane, where the third connection point is located between the ground point and the first connection point; and/or a fourth inductor, electrically connected between a fourth connection point and the ground plane, where the fourth connection point is located between the ground point and the second connection point.

According to this embodiment of this application, a quantity of inductors that are electrically connected between the radiator and the ground plane is increased, so that current density distribution on the radiator is more evenly, to further reduce a loss caused by the radiator and the conductor disposed around the radiator. In addition, each position at which the radiator is connected to the inductor includes a current reverse area, so that the electric field cannot reach zero, and the electric field generated by the radiator is continuous and is not reversed (does not include an electric field reverse area). This increases a radiation aperture of the antenna structure, reduces the conductor loss, and improves the efficiency of the antenna structure.

With reference to the first aspect, in some implementations of the first aspect, one or more insulation gaps are disposed on the radiator, and a width of each gap is greater than or equal to 0.1 mm and less than or equal to 2 mm.

According to this embodiment of this application, a capacitor (for example, a lumped capacitor) may be connected in series at both ends of the gap disposed on the radiator, to form a metamaterial structure in which the capacitor is connected in series.

With reference to the first aspect, in some implementations of the first aspect, the electronic device further includes a conductive frame, the frame has a first position and a second position, a frame between the first position and the second position is used as the radiator, the central area of the radiator is an area within 5 mm from a center of the radiator, and insulation gaps are respectively disposed at the first position and the second position on the frame.

According to this embodiment of this application, the first position and the second position may be located on a same side of the frame, and the radiator may be of a straight line type; or the first position and the second position may be located on two adjacent sides of the frame, and the radiator may be of a polyline type, for example, an L-shaped type.

According to a second aspect, an electronic device is provided, including: a radiator, including a first end, a second end, and a first connection point and a second connection point that are located between the first end and the second end; a ground plane, where the radiator is grounded at the first end and the second end through the ground plane; and a first inductor and a second inductor, where inductance values of the first inductor and the second inductor are both less than a first threshold. A length of the radiator is greater than three-quarters of a first wavelength, a part of the radiator from the first end to the second end is configured to generate a first resonance, and the first wavelength is a medium wavelength of the first resonance; the first inductor is electrically connected between the first connection point and the ground plane, and the second inductor is electrically connected between the second connection point and the ground plane; and the first connection point is located between a center of the radiator and the first end, a distance between the first connection point and the center of the radiator is less than one-eighth of the first wavelength, and the second connection point is located between the first connection point and the second end.

With reference to the second aspect, in some implementations of the second aspect, a distance between the first end and the second end is equal to the length of the radiator, where when a frequency of the first resonance is less than or equal to 1 GHz, the first threshold is 6 nH; when a frequency of the first resonance is greater than 1 GHz and less than or equal to 2.2 GHz, the first threshold is 4 nH; when a frequency of the first resonance is greater than 2.2 GHz and less than or equal to 3 GHz, the first threshold is 3 nH; or when a frequency of the first resonance is greater than 3 GHz, the first threshold is 2 nH. In one embodiment, a distance between the first end and the second end is equal to the length of the radiator.

With reference to the second aspect, in some implementations of the second aspect, the second connection point is located between the second end and the center of the radiator; and a distance between the second connection point and the center of the radiator is less than one-eighth of the first wavelength.

With reference to the second aspect, in some implementations of the second aspect, a distance between the first end and the second end is less than the length of the radiator, where when a frequency of the first resonance is less than or equal to 1 GHz, the first threshold is 20 nH; when a frequency of the first resonance is greater than 1 GHz and less than or equal to 2.2 GHz, the first threshold is 16 nH; when a frequency of the first resonance is greater than 2.2 GHz and less than or equal to 3 GHz, the first threshold is 12 nH; or when a frequency of the first resonance is greater than 3 GHz, the first threshold is 10 nH.

With reference to the second aspect, in some implementations of the second aspect, the electronic device further includes: a third inductor, electrically connected between at least one corresponding third connection point and the ground plane, where the third connection point is located between the center of the radiator and the first connection point; and/or a fourth inductor, electrically connected between at least one corresponding fourth connection point and the ground plane, where the fourth connection point is located between the center of the radiator and the second connection point.

With reference to the second aspect, in some implementations of the second aspect, one or more insulation gaps are disposed on the radiator, and a width of each gap is greater than or equal to 0.1 millimeters (mm) and less than or equal to 2 mm.

With reference to the second aspect, in some implementations of the second aspect, the electronic device further includes a conductive frame, the frame has a first position and a second position, a frame of the frame between the first position and the second position is used as the radiator, and the frame at the first position and the second position is continuous with a remaining part of the frame.

According to a third aspect, an electronic device is provided, including: a radiator, including a first part, where the first part of the radiator includes a first end, a second end, and a first connection point and a feed point that are located between the first end and the second end, and the second end is an open end; a ground plane, where the radiator is grounded at the first end through the ground plane; and a first inductor, where an inductance value of the first inductor is less than a first threshold. A length of the first part is greater than three eighths of a first wavelength, the first part is configured to generate a first resonance, and the first wavelength is a medium wavelength of the first resonance; the first inductor is electrically connected between the first connection point and the ground plane, and the first connection point is disposed between the feed point and the first end; and a distance between the first connection point and the second end is less than a quarter of the first wavelength.

With reference to the third aspect, in some implementations of the third aspect, the radiator further includes a second connection point located between the first connection point and the first end; and the electronic device further includes a second inductor, and the second inductor is electrically connected between the first connection point and the ground plane.

With reference to the third aspect, in some implementations of the third aspect, the radiator further includes a second part, the second part of the radiator includes a third end, a fourth end, and a third connection point located between the third end and the fourth end, and the first end of the first part is connected to the third end of the second part to form a continuous radiator, where the fourth end is an open end; the electronic device further includes a third inductor, where the third inductor is electrically connected between the third connection point and the ground plane, and an inductance value of the third inductor is less than a second threshold; the length of the first part is different from a length of the second part; the length of the second part is greater than three eighths of a second wavelength, the second part is configured to generate a second resonance, and the second wavelength is a medium wavelength of the second resonance; and a distance between the third connection point and the fourth end is less than a quarter of the second wavelength.

With reference to the third aspect, in some implementations of the third aspect, when a frequency of the first resonance is less than or equal to 1 GHz, the first threshold is 6 nH; when a frequency of the first resonance is greater than 1 GHz and less than or equal to 2.2 GHz, the first threshold is 4 nH; when a frequency of the first resonance is greater than 2.2 GHz and less than or equal to 3 GHz, the first threshold is 3 nH; or when a frequency of the first resonance is greater than 3 GHz, the first threshold is 2 nH.

With reference to the third aspect, in some implementations of the third aspect, when a frequency of the second resonance is less than or equal to 1 GHz, the second threshold is 6 nH; when a frequency of the second resonance is greater than 1 GHz and less than or equal to 2.2 GHz, the second threshold is 4 nH; when a frequency of the second resonance is greater than 2.2 GHz and less than or equal to 3 GHz, the second threshold is 3 nH; or when a frequency of the second resonance is greater than 3 GHz, the second threshold is 2 nH.

With reference to the third aspect, in some implementations of the third aspect, the electronic device further includes a fourth inductor, electrically connected between at least one corresponding fourth connection point and the ground plane, and the fourth connection point is located between the first end and the first connection point; and/or a fifth inductor, electrically connected between at least one corresponding fifth connection point and the ground plane, where the fifth connection point is located between the fourth end and the third connection point.

According to a fourth aspect, an electronic device is provided, including: a radiator, including a first end, a second end, and a first connection point and a second connection point that are located between the first end and the second end; a ground plane, where the radiator is grounded through the ground plane; a first inductor, electrically connected between the first connection point and the ground plane, where an inductance value of the first inductor is less than or equal to a first threshold; and a second inductor, electrically connected between the second connection point and the ground plane, where an inductance value of the second inductor is less than or equal to the first threshold. A part of the radiator from the first end to the second end is configured to generate a first resonance, a current of the radiator in a first area and/or a current on the ground plane in a second area include/includes a current reverse area, the first area includes the first connection point and the second connection point, and the second area includes a connection between the first inductor and the ground plane and a connection between the second inductor and the ground plane; and/or when the radiator generates the first resonance, magnetic fields generated by the radiator between the first area and the ground plane are in a same direction.

With reference to the fourth aspect, in some implementations of the fourth aspect, there is no switch between the first inductor and the radiator or the ground plane, and there is no switch between the second inductor and the radiator or the ground plane.

With reference to the fourth aspect, in some implementations of the fourth aspect, when a frequency of the first resonance is less than or equal to 1 GHz, the first threshold is 6 nH; when a frequency of the first resonance is greater than 1 GHz and less than or equal to 2.2 GHz, the first threshold is 4 nH; when a frequency of the first resonance is greater than 2.2 GHz and less than or equal to 3 GHz, the first threshold is 3 nH; or when a frequency of the first resonance is greater than 3 GHz, the first threshold is 2 nH.

With reference to the fourth aspect, in some implementations of the fourth aspect, an insulation gap is disposed on the radiator; when the radiator generates the first resonance, a current of the radiator in a fifth area does not include a current reverse area, and the fifth area includes the insulation gap; and/or when the radiator generates the first resonance, a magnetic field of the radiator in the fifth area includes a magnetic field reverse area.

DESCRIPTION OF EMBODIMENTS

Figure 1:
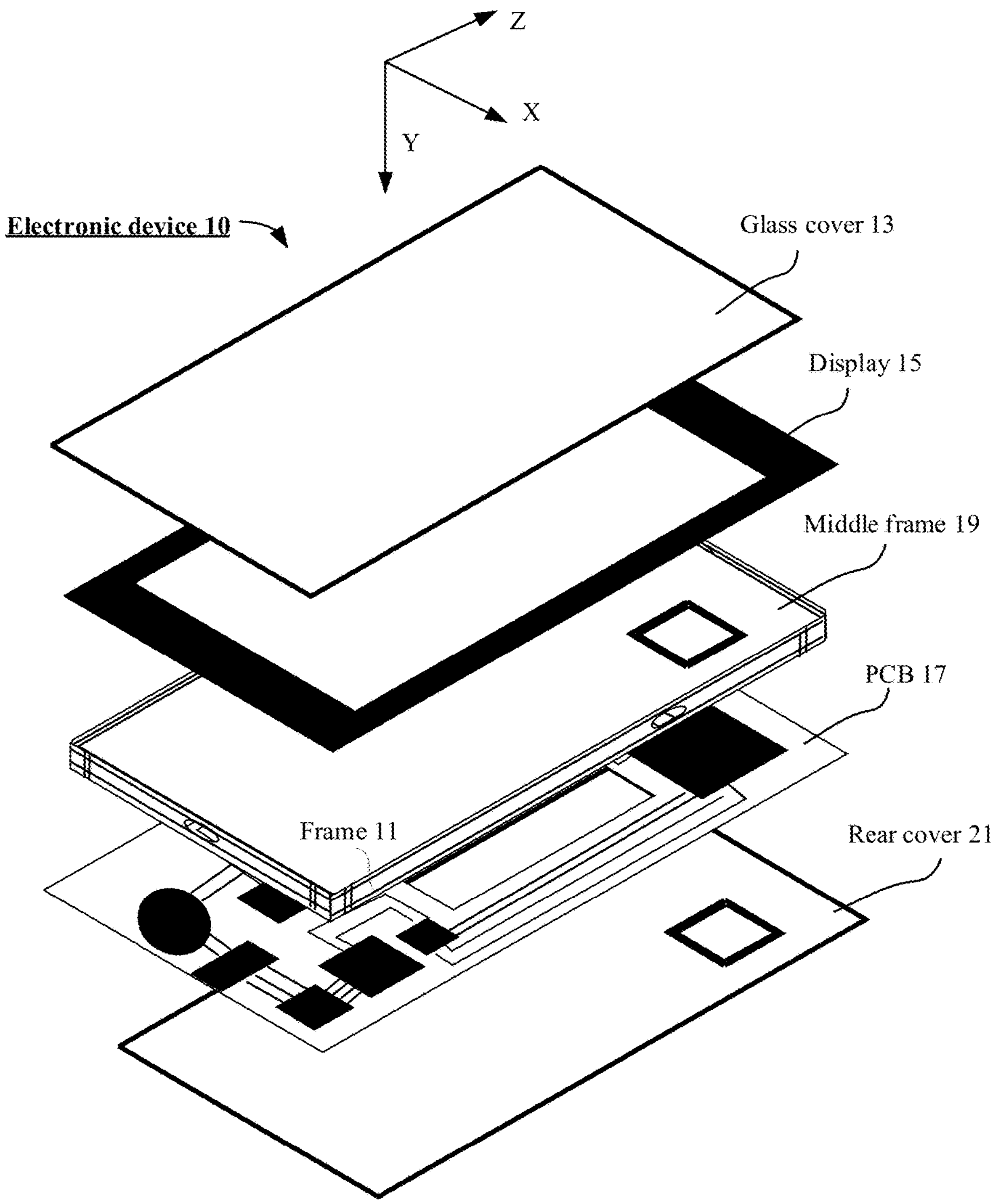
FIG. 1 is a diagram of an electronic device according to an embodiment of this application.

The following describes terms that may occur in embodiments of this application.

Coupling: The coupling may be understood as direct coupling and/or indirect coupling, and a "coupling connection" may be understood as a direct coupling connection and/or an indirect coupling connection. The direct coupling may also be referred to as an "electrical connection", and may be understood as physical contact and electrical conduction of components; or may be understood as a form in which different components in a line structure are connected by using a physical line that may transmit an electrical signal, for example, a copper foil or a conductive wire of a printed circuit board (PCB). The "indirect coupling" may be understood as electrical conduction of two conductors through air or without contact. In an embodiment, the indirect coupling may also be referred to as capacitive coupling. For example, signal transmission is implemented by forming equivalent capacitor through coupling of a gap between two conductive components.

Connection/Connected: The connection indicates a mechanical connection relationship or a physical connection relationship. For example, connection between A and B or A is connected to B may mean a fastened component (such as a screw, a bolt, a rivet, or the like) between A and B, or mean that A and B are in contact with each other and A and B are difficult to separate.

Connection: That two or more components are conducted or connected in the "electrical connection" or "indirect coupling" manner to perform signal/energy transmission may be referred to as connection.

Capacitor: The capacitor may be understood as a lumped capacitor and/or a distributed capacitor. The lumped capacitor is a capacitive component, for example, a capacitive component, and the distributed capacitor is an equivalent capacitor formed by a gap between two conductors.

Resonance/Resonance frequency: The resonance frequency is also referred to as a resonant frequency. The resonance frequency may be a frequency at which an imaginary part of an antenna input impedance is zero. The resonance frequency may have a frequency range, that is, a frequency range in which resonance occurs. The frequency corresponding to a strongest resonance point is a center frequency. A return loss of the center frequency may be less than −20 decibels (dB). It should be understood that, unless otherwise specified, "resonance generated by the antenna/radiator" mentioned in this application should mean a fundamental resonance generated by the antenna/radiator, or a resonance with a lowest frequency generated by the antenna/radiator.

Resonance frequency band/Communication frequency band/Operating frequency band: No matter what type of antenna, the antenna operates in a specific frequency range (bandwidth). For example, an operating frequency band of an antenna supporting a B40 frequency band includes a frequency ranging from 2300 megahertz (MHz) to 2400 MHz. In other words, an operating frequency band of an antenna includes a B40 frequency band. The frequency range that meets a requirement of an indicator may be regarded as the operating frequency band of the antenna.

Electrical length: The electrical length may be a ratio of a physical length (that is, a mechanical length or a geometric length) to a wavelength of a transmitted electromagnetic wave, and the electrical length may meet the following formula:

$$\overline{L} = \frac{L}{\lambda},$$

where L is the physical length, and $\lambda$ is the wavelength of the electromagnetic wave.

In some embodiments of this application, a physical length of the radiator may be understood as being within a range of ±25%, for example, within a range of ±10%, of an electrical length of the radiator.

Wavelength: The wavelength, or an operating wavelength, may be a wavelength corresponding to a center frequency of a resonance frequency or a center frequency of an operating frequency band supported by an antenna. For example, it is assumed that a center frequency of a B1 uplink frequency band (with a resonance frequency ranging from 1920 MHz to 1980 MHz) is 1955 MHz, the operating wavelength may be a wavelength calculated by using the frequency of 1955 MHz. The operating wavelength is not limited to the center frequency, and may alternatively be a wavelength corresponding to a resonance frequency or a frequency of an operating frequency band other than a center frequency.

It should be understood that, the wavelength (operating wavelength) may be understood as a wavelength of an electromagnetic wave in a medium. For example, a wavelength of an electromagnetic wave generated by a radiator transmitted in a medium and a wavelength transmitted in a vacuum meet the following formula:

$$\lambda_\varepsilon = \frac{\lambda_c}{\sqrt{\varepsilon_r}},$$

where $\lambda_\varepsilon$ is the wavelength of the electromagnetic wave in the medium, $\lambda_c$ is the wavelength of the electromagnetic wave in the vacuum, and $\varepsilon_r$ is a relative dielectric constant of the medium in a medium layer. The wavelength in embodiments of this application is usually a medium wavelength, and may be a medium wavelength corresponding to the center frequency of the resonance frequency, or a medium wavelength corresponding to the center frequency of the operating frequency band supported by the antenna. For example, it is assumed that a center frequency of a B1 uplink frequency band (with a resonance frequency ranging from 1920 MHz to 1980 MHz) is 1955 MHz, the wavelength may be a medium wavelength calculated by using the frequency of 1955 MHz. The “medium wavelength” is not limited to the center frequency, and may alternatively be a medium wavelength corresponding to a resonance frequency or a frequency of an operating frequency band other than a center frequency. For ease of understanding, the medium wavelength mentioned in embodiments of this application may be simply calculated by using a relative dielectric constant of the medium filled on one or more sides of the radiator.

A limitation on a position or a distance, such as middle or a middle position, mentioned in embodiments of this application, depends on a current process, and is not absolutely and strictly defined in a mathematical sense. For example, a middle (position) of a conductor may be a section of a conductor part including a midpoint on the conductor, for example, the middle (position) of the conductor may be a section of the conductor part whose distance from the midpoint on the conductor is less than a predetermined threshold (for example, 1 mm, 2 mm, or 2.5 mm).

Total efficiency of an antenna: The total efficiency is a ratio of input power to output power at an antenna port.

Radiation efficiency of an antenna: The radiation efficiency is a ratio of power radiated by an antenna to space (that is, power for effectively converting an electromagnetic wave) to active power input to the antenna. Active power input to the antenna=Input power of the antenna−Loss power. The loss power mainly includes return loss power and metal ohmic loss power and/or dielectric loss power. The radiation efficiency is a value for measuring a radiation capability of an antenna. The metal loss and dielectric loss are both factors that affect the radiation efficiency.

A person skilled in the art may understand that the efficiency is usually indicated by a percentage, and there is a corresponding conversion relationship between the efficiency and dB. Efficiency closer to 0 dB indicates better antenna efficiency.

Antenna return loss: The antenna return loss may be understood as a ratio of power of a signal reflected back to an antenna port through an antenna circuit to transmit power at the antenna port. A smaller reflected signal indicates a larger signal radiated by an antenna to space and higher radiation efficiency of the antenna. A larger reflected signal indicates a smaller signal radiated by an antenna to space and lower radiation efficiency of the antenna.

The antenna return loss may be represented by an S11 parameter, and S11 is one of S-parameters. S11 indicates a reflection coefficient, and the parameter indicates transmit efficiency of the antenna. The S11 parameter is usually a negative number. A smaller value of the S11 parameter indicates a smaller return loss of the antenna and less energy reflected back by the antenna. In other words, more energy actually enters the antenna and the total efficiency of the antenna is higher. A larger value of the S11 parameter indicates a larger return loss of the antenna and lower total efficiency of the antenna.

It should be noted that, −6 dB is usually used as a standard value of S11 in engineering. When the value of S11 of the antenna is less than −6 dB, it may be considered that the antenna can operate normally, or it may be considered that transmit efficiency of the antenna is good.

Specific absorption rate (SAR) of an electromagnetic wave: The specific absorption rate, an expression unit that measures how much radio frequency radiation energy is actually absorbed by the body, is referred to as a specific absorption rate, and is expressed in watts per kilogram (W/kg) or milliwatts per gram (mW/g). The SAR is accurately defined as a time derivative of unit energy (dw) absorbed by per unit of mass (dm) in per unit of volume (dv) of a given mass density ($\rho$-density of human tissues).

Currently, there are two international standards, where one is the European standard of 2 w/kg and the other is the American standard of 1.6 w/kg. The specific meaning of the European standard means that electromagnetic radiation energy absorbed by each kilogram of human tissues shall not exceed 2 watts in 6 minutes.

Ground, or ground plane: The ground may generally mean at least a part of any ground layer, grounding plane, ground metal layer, or the like in an electronic device (such as a mobile phone), or at least a part of any combination of the foregoing ground layer, grounding plane, ground component, or the like. The “ground” may be configured to ground components in the electronic device. In an embodiment, the “ground” may be a ground layer of a circuit board of the electronic device, or may be a grounding plane formed by a middle frame of the electronic device or a ground metal layer formed by a metal film below a screen of the electronic device. In an embodiment, a circuit board may be a PCB, for example, an 8-layer board, a 10-layer board, or a 12-layer board, a 13-layer board, or a 14-layer boards respectively having 8, 10, 12, 13, or 14 layers of conductive materials, or a component that is separated and electrically insulated by a dielectric layer or an insulation layer, for example, glass fiber, polymer, or the like. In an embodiment, a circuit board includes a dielectric substrate, a ground layer, and a trace layer, where the trace layer and the ground layer may be electrically connected through a via hole.

Any one of the foregoing ground layer, the grounding plane, or the ground metal layer is made of a conductive material. In an embodiment, the conductive material may be any one of the following materials: copper, aluminum, stainless steel, brass and alloys thereof, copper foil on insulation laminates, aluminum foil on insulation laminates, gold foil on insulation laminates, silver-plated copper, silver-plated copper foil on insulation laminates, silver foil on insulation laminates and tin-plated copper, cloth impregnated with graphite powder, graphite-coated laminates, copper-plated laminates, brass-plated laminates and aluminum-plated laminates. A person skilled in the art may understand that the ground layer/grounding plane/ground metal layer may alternatively be made of another conductive material.

The following describes technical solutions of embodiments in this application with reference to accompanying drawings.

As shown in FIG. 1, the electronic device 10 may include a cover 13, a display/display module (display) 15, a PCB 17, a middle frame 19, and a rear cover 21. It should be understood that, in some embodiments, the cover 13 may be a glass cover, or may be replaced with a cover of another material, for example, an ultra-thin glass material cover or a polyethylene terephthalate (PET) material cover.

The cover 13 may be disposed close to the display module 15, and may be mainly configured to protect and prevent dust on the display module 15.

In an embodiment, the display module 15 may include a liquid-crystal display (LCD), a light-emitting diode (LED) display panel, an organic light-emitting semiconductor (OLED) display panel, or the like. This is not limited in this embodiment of this application.

The middle frame 19 is mainly used to support the entire electronic device. FIG. 1 shows that the PCB 17 is disposed between the middle frame 19 and the rear cover 21. It should be understood that, in an embodiment, the PCB 17 may alternatively be disposed between the middle frame 19 and the display module 15. This is not limited in this embodiment of this application. The PCB 17 may be a flame-resistant material (FR-4) dielectric board, or may be a Rogers dielectric board, or may be a dielectric board mixing rogers and FR-4, or the like. The FR-4 is a grade code name of a material that is flame resistant, and the rogers dielectric board is a high frequency board. An electronic component, for example, a radio frequency chip, is carried on the PCB 17. In an embodiment, a metal layer may be disposed on the PCB 17. The metal layer may be used for grounding an electronic component carried on the PCB 17, or may be used for grounding another component, for example, a bracket antenna or a frame antenna. The metal layer may be referred to as a ground plane, a grounding plane, or a ground layer. In an embodiment, the metal layer may be formed by etching metal on a surface of any layer of dielectric boards in the PCB 17. In an embodiment, the metal layer used for grounding may be disposed on a side of the PCB 17 that is close to the middle frame 19. In one embodiment, an edge of the PCB 17 may be considered as an edge of the ground layer of the PCB 17. In one embodiment, the metal middle frame 19 may also be used for grounding the foregoing components. The electronic device 10 may further have another ground plane/grounding plane/ground layer. As described above, details are not described herein again.

The electronic device 10 may further include a battery (not shown in the figure). The battery may be disposed between the middle frame 19 and the rear cover 21, or may be disposed between the middle frame 19 and the display module 15. This is not limited in this embodiment of this application. In some embodiments, the PCB 17 is divided into a motherboard and a daughter board. The battery may be disposed between the motherboard and the daughter board. The motherboard may be disposed between the middle frame 19 and an upper edge of the battery, and the daughter board may be disposed between the middle frame 19 and a lower edge of the battery.

The electronic device 10 may further include a frame 11. The frame 11 may be formed of a conductive material such as metal. The frame 11 may be disposed between the display module 15 and the rear cover 21, and extends circumferentially around a periphery of the electronic device 10. The frame 11 may have four sides surrounding the display module 15 to help secure the display module 15. In an implementation, the frame 11 made of a metal material may be directly used as a metal frame of the electronic device 10 to form an appearance of the metal frame, and is applicable to a metal industrial design. In another implementation, an outer surface of the frame 11 may alternatively be made of a material other than metal, for example, a plastic frame, to form an appearance of a non-metal frame, and is applicable to a non-metal industrial design.

The middle frame 19 may include the frame 11, and the middle frame 19 including the frame 11 is used as an integral part, and may support electronic components in the entire electronic device. The cover 13 and the rear cover 21 are respectively covered along an upper edge and a lower edge of the frame, to form a shell or a housing of the electronic device. In an embodiment, the cover 13, the rear cover 21, the frame 11, and/or the middle frame 19 may be collectively referred to as the shell or the housing of the electronic device 10. It should be understood that, the "shell or housing" may be used to indicate a part or all of any one of the cover 13, the rear cover 21, the frame 11, or the middle frame 19, or indicate a part or all of any combination of the cover 13, the rear cover 21, the frame 11, or the middle frame 19.

The frame 11 on the middle frame 19 may be at least partially used as an antenna radiator to transmit/receive a radio frequency signal. There may be a gap between the frame that is used as the radiator and another part of the middle frame 19, to ensure that the antenna radiator has a good radiation environment. In an embodiment, an aperture of the middle frame 19 may be disposed at the frame that is used as the radiator, to facilitate radiation of the antenna.

Alternatively, the frame 11 may not be considered as a part of the middle frame 19. In an embodiment, the frame 11 may be connected to the middle frame 19 and integrally formed. In another embodiment, the frame 11 may include a protrusion extending inward, to be connected to the middle frame 19, for example, connected by using a spring or a screw, or connected through welding. The protrusion of the frame 11 may be further configured to receive a feeding signal, so that at least a part of the frame 11 is used as the antenna radiator to transmit/receive a radio frequency signal. There is a gap 42 between the frame that is used as the radiator and the middle frame 30, to ensure that the antenna radiator has a good radiation environment, so that the antenna has a good signal transmission function.

The rear cover 21 may be a rear cover made of a metal material, or a rear cover made of a non-conductive material, such as a glass rear cover, a plastic rear cover, and the like; or a rear cover made of both a conductive material and a non-conductive material. In an embodiment, the rear cover 21 including the conductive material may replace the middle frame 19, and serves as an integral part with the frame 11 to support electronic components in the entire electronic device. It should be understood that, the "middle frame" mentioned in this application should include a middle frame disposed in the housing and configured to support a component, and also include a conductive part of the rear cover 21 that is used as a part of the housing and configured to support a component.

In an embodiment, the middle frame 19 and/or the conductive part of the rear cover 21 may be used as a reference ground of the electronic device 10. The frame, the PCB, and the like of the electronic device may be grounded by electrically connecting to the middle frame.

Alternatively, the antenna of the electronic device 10 may be disposed in the frame 11. When the frame 11 of the electronic device 10 is made of a non-conductive material, the antenna radiator may be located in the electronic device 10 and disposed along the frame 11. For example, the antenna radiator is snapped to the frame 11, to minimize a size occupied by the antenna radiator, and is closer to the outside of the electronic device 10, to achieve a better signal transmission effect. It should be noted that, that the antenna radiator is snapped to the frame 11 means that the antenna radiator may be snapped to the frame 11, or may be disposed close to the frame 11. For example, there may be a small gap between the antenna radiator and the frame 11.

Alternatively, the antenna of the electronic device 10 may be disposed in the housing, for example, a bracket antenna or a millimeter wave antenna (not shown in FIG. 1). Clearance of the antenna disposed in the housing may be obtained by a gap/hole in any one of the middle frame, and/or the frame, and/or the rear cover, and/or the display, or by a non-conductive gap/aperture formed between any several of the middle frame, the frame, the rear cover, and the display. According to the setting of the clearance of the antenna, radiation performance of the antenna is ensured. It should be understood that, the clearance of the antenna may be a non-conductive area formed by any conductive component in the electronic device 10, and the antenna radiates a signal to external space through the non-conductive area. In an embodiment, the antenna 40 may be a flexible printed circuit (FPC)-based antenna, a laser-direct-structuring (LDS)-based antenna, a microstrip disk antenna (MDA)-based antenna, or another antenna. In an embodiment, the antenna may alternatively be in a transparent structure embedded in the screen of the electronic device 10, so that the antenna is a transparent antenna unit embedded in the screen of the electronic device 10.

FIG. 1 shows only an example of some components included in the electronic device 10. An actual shape, an actual size, and an actual configuration of the components are not limited to those in FIG. 1.

It should be understood that, in this embodiment of this application, it may be considered that a surface on which the display of the electronic device is located is a front surface, a surface on which the rear cover is located is a rear surface, and a surface on which the frame is located is a side surface.

It should be understood that, in this embodiment of this application, it is considered that when a user holds (usually holding the electronic device vertically and facing the screen), an orientation in which the electronic device is located includes top, bottom, left, and right. It should be understood that, in this embodiment of this application, it is considered that when a user holds (usually holding the electronic device vertically and facing the screen), an orientation in which the electronic device is located includes top, bottom, left, and right.

Figure 2A:
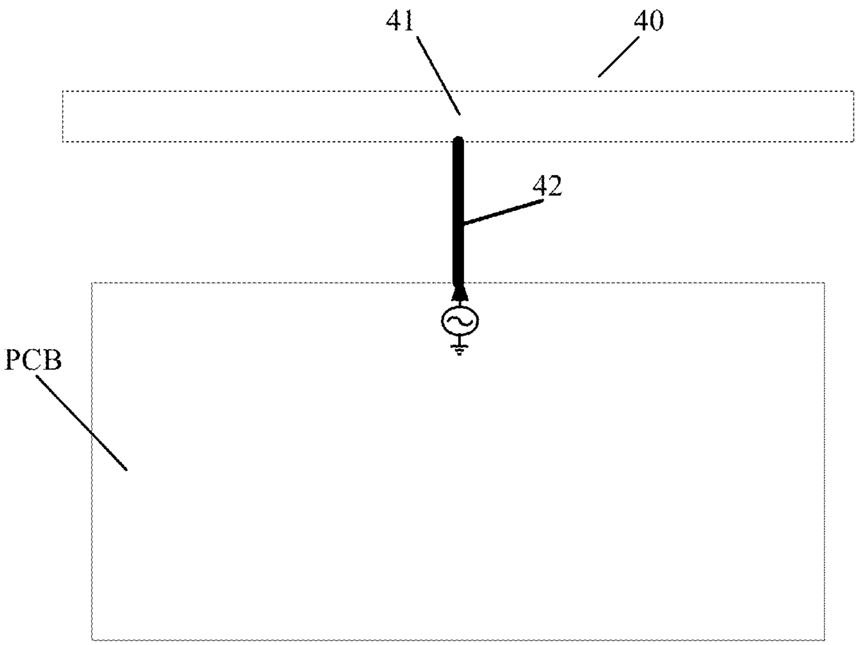
FIGS. 2A-2B are diagrams of a structure of a wire antenna in a common-mode and distribution of a corresponding current and electric field according to this application.
Figure 2B:
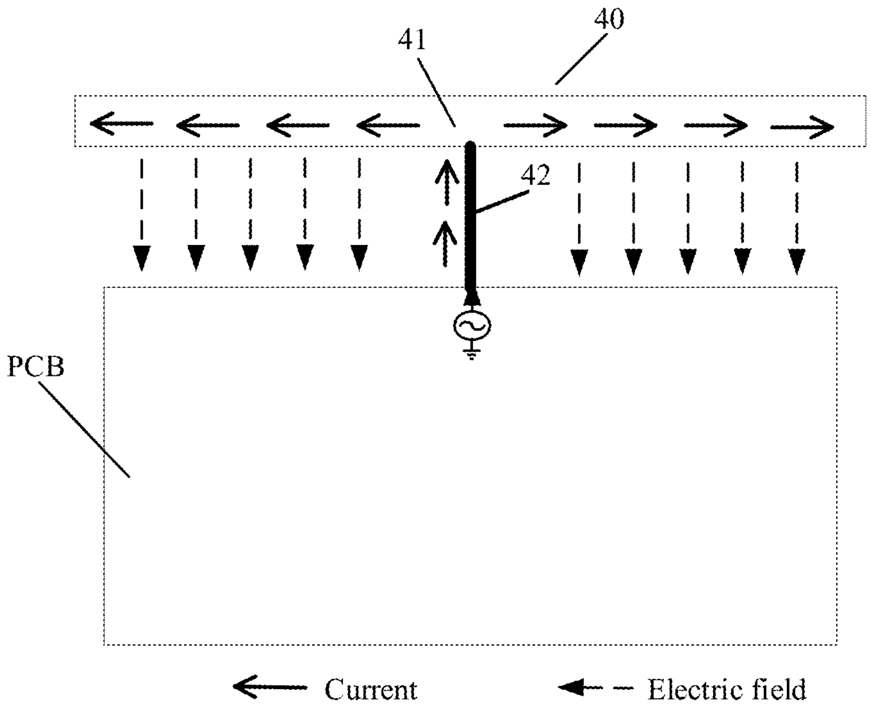
Figure 3A:
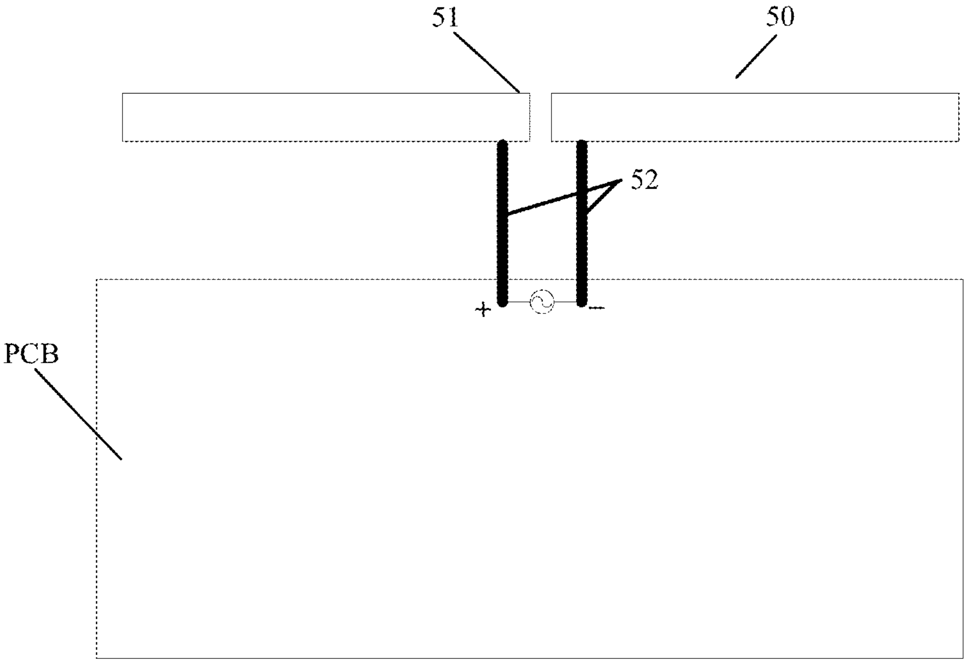
FIGS. 3A-3B are diagrams of a structure of a wire antenna in a differential-mode and distribution of a corresponding current and electric field according to this application.
Figure 3B:
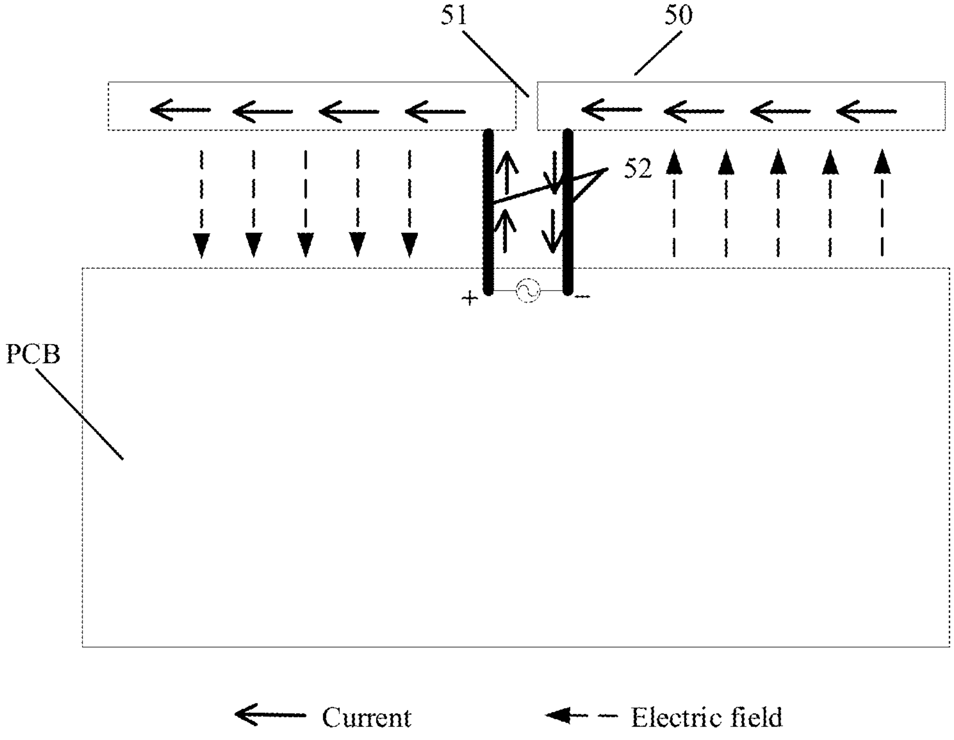
Figure 4A:
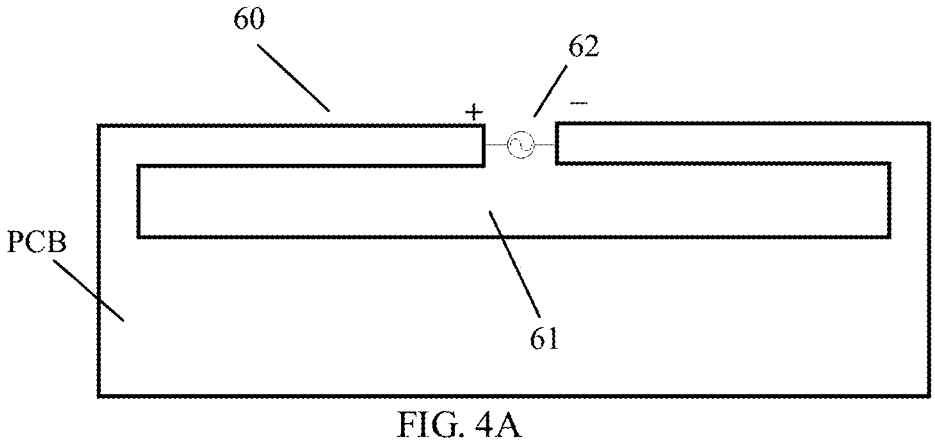
FIGS. 4A-4B are diagrams of a structure of a slot antenna in a common-mode and distribution of a corresponding current, electric field, and magnetic current according to this application.
Figure 4B:
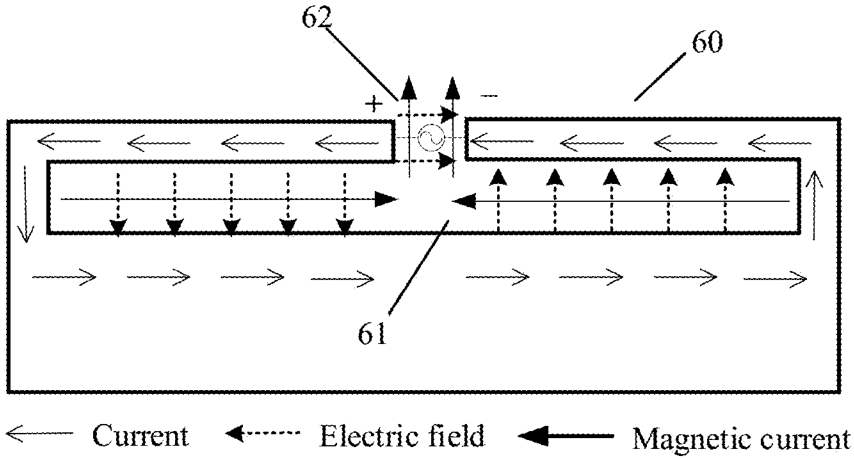
Figure 5A:
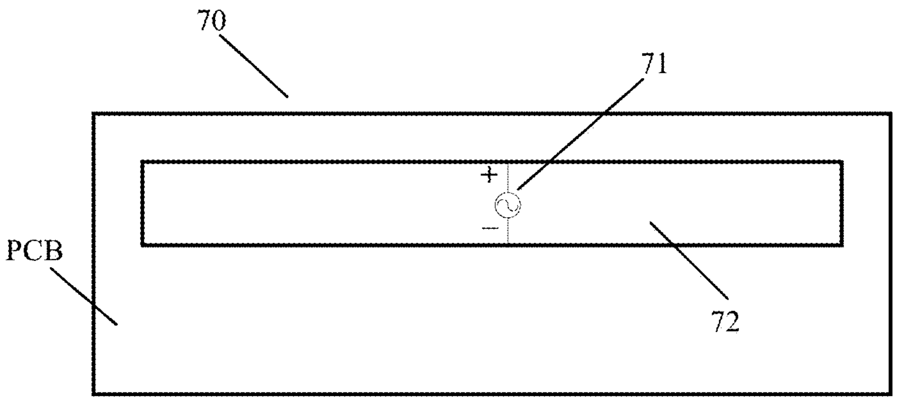
FIGS. 5A-5B are diagrams of a structure of a slot antenna in a differential-mode and distribution of a corresponding current, electric field, and magnetic current according to this application.
Figure 5B:
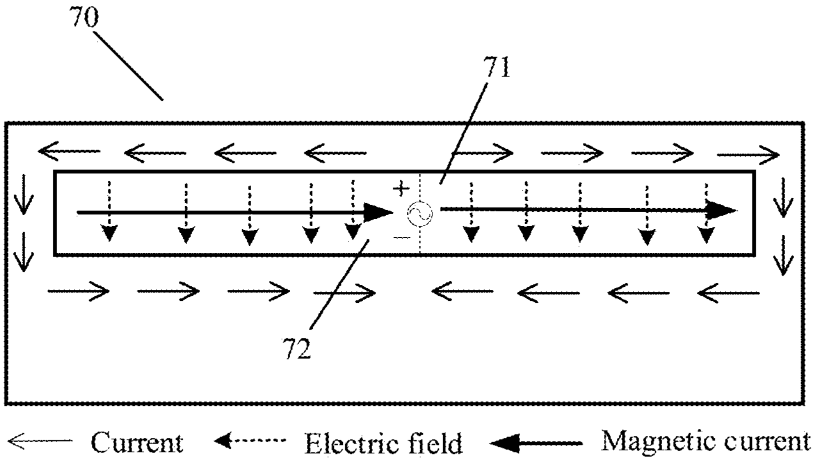

First, this application relates to four antenna modes as described with reference to FIG. 2A to FIG. 5B. FIGS. 2A-2B are diagrams of a structure of a wire antenna in a common-mode and distribution of a corresponding current and electric field according to this application. FIGS. 3A-3B are diagrams of a structure of another wire antenna in a differential-mode and distribution of a corresponding current and electric field according to this application. FIGS. 4A-4B are diagrams of a structure of a slot antenna in a common-mode and distribution of a corresponding current, electric field, and magnetic current according to this application. FIGS. 5A-5B are diagrams of a structure of another slot antenna in a differential-mode and distribution of a corresponding current, electric field, and magnetic current according to this application.

1. Common Mode (CM) of a Wire Antenna

Herein, FIG. 2A shows a case in which a radiator of a wire antenna 40 is grounded (for example, connected to a ground plane, or may be a PCB) through a feeder line 42. The wire antenna 40 is connected to a feeder unit (not shown in the figure) at a middle position 41, and uses symmetrical feed. The feeder unit may be connected to the middle position 41 of the wire antenna 40 through the feeder line 42. It should be understood that, the symmetrical feed may be understood as that one end of the feeder unit is connected to the radiator and the other end is grounded. A connection point (feed point) between the feeder unit and the radiator is located in a center of the radiator, and the center of the radiator may be, for example, a midpoint of an integrated structure, or a midpoint of an electrical length (or an area within a specific range near the midpoint).

The middle position 41 of the wire antenna 40, for example, the middle position 41, may be a geometric center of the wire antenna, or the midpoint of the electrical length of the radiator. For example, a connection between the feeder line 42 and the wire antenna 40 covers the middle position 41.

Herein, FIG. 2B shows distribution of a current and an electric field of the wire antenna 40. As shown in FIG. 2B, the current is symmetrically distributed on both sides of the middle position 41, for example, distributed in opposite directions. The electric field is distributed in a same direction on both sides of the middle position 41. As shown in FIG. 2B, the current at the feeder line 42 is distributed in a same direction. Because the current is distributed in the same direction at the feeder line 42, the feed shown in FIG. 2A may be referred to as CM feed of the wire antenna. Because the current is symmetrically distributed on both sides of the connection between the radiator and the feeder line 42, the wire antenna mode shown in FIG. 2B may be referred to as a CM mode of the wire antenna (or may also be referred to as a CM mode for short. For example, for a wire antenna, the CM mode means a CM mode of the wire antenna). The current and the electric field shown in FIG. 2B may be referred to as a current and an electric field of the CM mode of the wire antenna.

The current and the electric field of the CM mode of the wire antenna are generated by two branches (for example, two horizontal branches) on both sides of the middle position 41 of the wire antenna 40 as antennas operating in a quarter-wavelength mode. The current is strong at the middle position 41 of the wire antenna 40 and weak at both ends of the wire antenna 40. The electric field is weak at the middle position 41 of the wire antenna 40 and strong at both ends of the wire antenna 40.

2. Differential Mode (DM) of a Wire Antenna

Herein, FIG. 3A shows a case in which two radiators of a wire antenna 50 are grounded (for example, connected to a ground plane, or may be a PCB) through a feeder line 52. The wire antenna 50 is connected to a feeder unit at a middle position 51 between the two radiators and uses anti-symmetrical feed (anti-symmetrical feed). One end of the feeder unit is connected to one radiator through the feeder line 52, and the other end of the feeder unit is connected to the other radiator through the feeder line 52. The middle position 51 may be a geometric center of the wire antenna, or a gap between the radiators.

It should be understood that, "central anti-symmetrical feed" mentioned in this application may be understood as that positive and negative poles of the feeder unit are respectively connected to two connection points near the midpoint of the radiator. Signals output from the positive and negative poles of the feeder unit have a same amplitude but opposite phases. For example, a phase difference is 180°±10°.

FIG. 3B shows distribution of a current and an electric field of the wire antenna 50. As shown in FIG. 3B, the current is asymmetrically distributed on both sides of the middle position 51 of the wire antenna 50, for example, distributed in a same direction. The electric field is distributed in opposite directions on both sides of the middle position 51. As shown in FIG. 3B, the current at the feeder line 52 is distributed in opposite directions. Because the current is distributed in the opposite directions at the feeder line 52, the feed shown in FIG. 3A may be referred to as DM feed of the wire antenna. Because the current is asymmetrically distributed (for example, distributed in a same direction) on both sides of the connection between the radiator and the feeder line 52, the wire antenna mode shown in FIG. 3B may be referred to as a DM mode of the wire antenna (or may also be referred to as a DM mode for short. For example, for a wire antenna, the DM mode means a DM mode of the wire antenna). The current and the electric field shown in FIG. 3B may be referred to as a current and an electric field of the DM mode of the wire antenna.

The current and the electric field of the DM mode of the wire antenna are generated by the entire wire antenna 50 as an antenna operating in a half-wavelength mode. The current is strong at the middle position 51 of the wire antenna 50 and weak at both ends of the wire antenna 50. The electric field is weak at the middle position 51 of the wire antenna 50 and strong at both ends of the wire antenna 50.

It should be understood that, the radiator of the wire antenna may be understood as a metal mechanical part that generates radiation, and there may be one radiator as shown in FIGS. 2A-2B, or may be two radiators as shown in FIGS. 3A-3B, and may be adjusted based on an actual design or production requirement. For example, for the CM mode of the wire antenna, two radiators as shown in FIGS. 3A-3B may also be used, both ends of the two radiators are oppositely disposed and a gap is spaced apart, and symmetrical feed is used for both ends that are close to each other. For example, an effect similar to that of the antenna structure shown in FIGS. 2A-2B may also be achieved by separately feeding a same feeding source signal into both ends of the two radiators that are close to each other. Correspondingly, for the DM mode of the wire antenna, one radiator as shown in FIGS. 2A-2B may also be used, two feed points are disposed at the middle position of the radiator, and anti-symmetrical feed is used. For example, an effect similar to that of the antenna structure shown in FIGS. 3A-3B may also be achieved if signals of a same amplitude but opposite phases are respectively fed at two symmetrical feed points on the radiator.

3. CM Mode of a Slot Antenna

A slot antenna 60 shown in FIG. 4A may be formed by a hollowed-out slot or gap 61 in a radiator of the slot antenna, or formed by a radiator of the slot antenna and a ground (for example, a ground plane, or may be a PCB) enclosing the slot or slot 61. The slot 61 may be formed by slotting on the ground plane. An opening 62 is disposed on one side of the slot 61, and the opening 62 may be specifically disposed in a middle position on the side. The middle position of the side of the slot 61 may be, for example, a geometric midpoint of the slot antenna, or a midpoint of an electrical length of the radiator. For example, an area in which the opening 62 is opened on the radiator covers the middle position of the side. A feeder unit may be connected at the opening 62, and anti-symmetrical feed is used. It should be understood that, the anti-symmetrical feed may be understood as that positive and negative poles of the feeder unit are respectively connected to both ends of the radiator. Signals output from the positive and negative poles of the feeder unit have a same amplitude but opposite phases. For example, a phase difference is 180°±10°.

FIG. 4B shows distribution of a current, an electric field, and a magnetic current of the slot antenna 60. As shown in FIG. 4B, the current is distributed in a same direction around the slot 61 on a conductor (for example, the ground plane and/or the radiator 60) around the slot 61, the electric field is distributed in opposite directions on both sides of the middle position of the slot 61, and the magnetic current is distributed in opposite directions on both sides of the middle position of the slot 61. As shown in FIG. 4B, the electric field is in a same direction at the opening 62 (for example, a feed position), and the magnetic current is in a same direction at the opening 62 (for example, the feed position). Because the magnetic current is in the same direction at the opening 62 (the feed position), the feed shown in FIG. 4A may be referred to as CM feed of the slot antenna. Because the current is asymmetrically distributed (for example, distributed in a same direction) on the radiator on both sides of the opening 62, or because the current is distributed in a same direction around the slot 61 on the conductor around the slot 61, the slot antenna mode shown in FIG. 4B may be referred to as a CM mode of the slot antenna (or may also be referred to as a CM mode for short. For example, for a slot antenna, the CM mode means a CM mode of the slot antenna). The electric field, the current, and the magnetic current distributed in FIG. 4B may be referred to as an electric field, a current, and a magnetic current of the CM mode of the slot antenna.

The current and the electric field of the CM mode of the slot antenna are generated by the slot antenna on both sides of the middle position of the slot antenna 60 as an antenna operating in a half-wavelength mode. The magnetic field is weak at the middle position of the slot antenna 60 and strong at both ends of the slot antenna 60. The electric field is strong at the middle position of the slot antenna 60 and weak at both ends of the slot antenna 60.

4. DM Mode of a Slot Antenna

A slot antenna 70 shown in FIG. 5A may be formed by a hollowed-out slot or a gap 72 in a radiator of the slot antenna, or formed by a radiator of the slot antenna and a ground (for example, a ground plane, or a PCB) enclosing the slot or slot 72. The slot 72 may be formed by slotting on the ground plane. A feeder unit is connected at a middle position 71 of the slot 72, and symmetrical feed is used. It should be understood that, the symmetrical feed may be understood as that one end of the feeder unit is connected to the radiator and the other end is grounded. A connection point (feed point) between the feeder unit and the radiator is located in a center of the radiator, and the center of the radiator may be, for example, a midpoint of an integrated structure, or a midpoint of an electrical length (or an area within a specific range near the midpoint). A middle position of one side edge of the slot 72 is connected to a positive pole of the feeder unit, and a middle position of the other side edge of the slot 72 is connected to a negative pole of the feeder unit. The middle position of the side edge of the slot 72 may be, for example, the middle position of the slot antenna 60/the middle position of the ground, for example, a geometric midpoint of the slot antenna, or a midpoint of an electrical length of the radiator. For example, a connection between the feeder unit and the radiator covers the middle position 51 of the side.

FIG. 5B shows distribution of a current, an electric field, and a magnetic current of the slot antenna 70. As shown in FIG. 5B, on a conductor (for example, the ground plane and/or the radiator 60) around the slot 72, the current is distributed around the slot 72 and is distributed in opposite directions on both sides of the middle position of the slot 72, the electric field is distributed in a same direction on both sides of the middle position 71, and the magnetic current is distributed in a same direction on both sides of the middle position 71. The magnetic current is distributed in opposite directions at the feeder unit (not shown). Because the magnetic current is distributed in the opposite directions at the feeder unit, the feed shown in FIG. 5A may be referred to as DM feed of the slot antenna. Because the current is symmetrically distributed (for example, distributed in opposite directions) on both sides of the connection between the feeder unit and the radiator, or because the current is symmetrically distributed (for example, distributed in opposite directions) around the gap 71, the slot antenna mode shown in FIG. 5B may be referred to as a DM mode of the slot antenna (or may also be referred to as a DM mode for short. For example, for a slot antenna, the DM mode means a DM mode of the slot antenna). The electric field, the current, and the magnetic current distributed in FIG. 5B may be referred to as an electric field, a current, and a magnetic current of the DM mode of the slot antenna.

The current and the electric field of the DM mode of the slot antenna are generated by the entire slot antenna 70 as an antenna operating in a wavelength mode. The current is weak at the middle position of the slot antenna 70 and strong at both ends of the slot antenna 70. The electric field is strong at the middle position of the slot antenna 70 and weak at both ends of the slot antenna 70.

In the field of antennas, an antenna operating in a CM mode and an antenna operating in a DM mode generally show high isolation. In addition, frequency bands of the antenna operating in the CM mode and the antenna operating in the DM mode are usually in single-mode resonance, and it is difficult to cover a plurality of frequency bands required for communication. In particular, space left by an electronic device for an antenna structure is increasingly decreased. For a multi-input multi-output (MIMO) system, a single antenna structure is required to implement coverage of the plurality of frequency bands. Therefore, an antenna with multi-mode resonance and high isolation is of high research and practical value.

It should be understood that, the radiator of the slot antenna may be understood as a metal mechanical part (for example, including a part of the ground) that generates radiation, and may include an opening as shown in FIGS. 4A-4B, or may be a complete loop as shown in FIGS. 5A-5B, and may be adjusted based on an actual design or production requirement. For example, for the CM mode of the slot antenna, the complete loop radiator as shown in FIGS. 5A-5B may also be used, two feed points are disposed at the middle position of the radiator on one side of the slot 61, and anti-symmetrical feed is used. For example, an effect similar to that of the antenna structure shown in FIGS. 4A-4B may also be achieved if signals of a same amplitude but opposite phases are respectively fed into both ends of an original opening position. Correspondingly, for the DM mode of the slot antenna, a radiator including an opening as shown in FIGS. 4A-4B may also be used, and symmetrical feed is used at both ends of the opening position. For example, an effect similar to that of the antenna structure shown in FIGS. 5A-5B may also be achieved by separately feeding a same feeding source signal into both ends of the radiator on both sides of the opening.

Because the above antenna structure may have two operating modes (the electric field is symmetrically distributed or anti-symmetrically distributed) in which the electric field is orthogonal (an inner product of the electric field is zero in the far field (integral quadrature)), the antenna structure has good isolation between the two operating modes, and may be used in MIMO antenna system in an electronic device.

Figure 6:
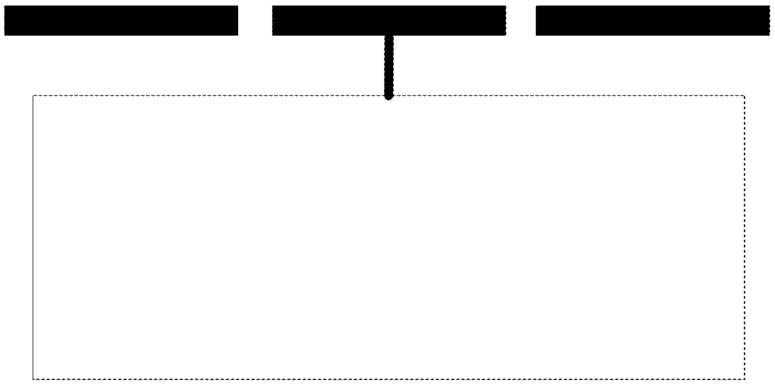
FIG. 6 is a diagram of an antenna structure according to an embodiment of this application.
Figure 7:
FIG. 7 is a diagram of an antenna structure according to an embodiment of this application.

FIG. 6 and FIG. 7 are diagrams of antenna structures according to an embodiment of this application.

As shown in FIG. 6 and FIG. 7, a gap is disposed on a radiator of the antenna structure. By opening the gap (the gap may be disposed at any position of the radiator, for example, the gap may be disposed between a feed point and an end of the radiator), with an increase in a quantity of gaps, an equivalent radiation aperture of the antenna structure may be increased, so that an electric field between the radiator and a ground plane may be distributed more evenly, a dielectric loss is reduced, and radiation efficiency is improved. In an embodiment, the gap structure may be equivalent to a capacitor connected in series in the radiator, and the antenna structures shown in FIG. 6 and FIG. 7 may be referred to as metamaterial (metaline) structures.

In addition, for the wire antenna structure shown in FIG. 6 and the slot antenna structure shown in FIG. 7, when the structure of the slot antenna is asymmetric, both a CM mode and a DM mode of the antenna structure may be excited. For example, an asymmetrical feed manner or a radiator structure asymmetrical manner is used. For brevity of descriptions, only an example in which feed is performed in an offset feed manner and the CM mode and the DM mode of the antenna structure are simultaneously excited is used this application.

The “offset feed” mentioned in this application may be understood as side feed. In an embodiment, a connection point (feed point) between the feeder unit and the radiator deviates from a symmetrical center of the radiator (for example, a center point of the radiator). In an embodiment, a connection point (feed point) between the feeder unit and the radiator is located at an end of the radiator and in an area within a quarter electrical length range (excluding a quarter electrical length position) from an end point of the radiator, or may be an area within one-eighth of a first electrical length range from an end point of the radiator, where the electrical length may be an electrical length of the radiator.

FIGS. 8A-8B and FIGS. 9A-9B are diagrams of simulation results of the antenna structures shown in FIG. 6 and FIG. 7.

It should be understood that, to facilitate simulation separately performed on the CM mode and the DM mode generated by the antenna structure, simulation is performed on the antenna structures shown in FIG. 6 and FIG. 7 in a central symmetrical feed manner and a central anti-symmetrical feed manner, to obtain the simulation results shown in FIGS. 8A-8B and FIGS. 9A-9B.

Figure 8A:
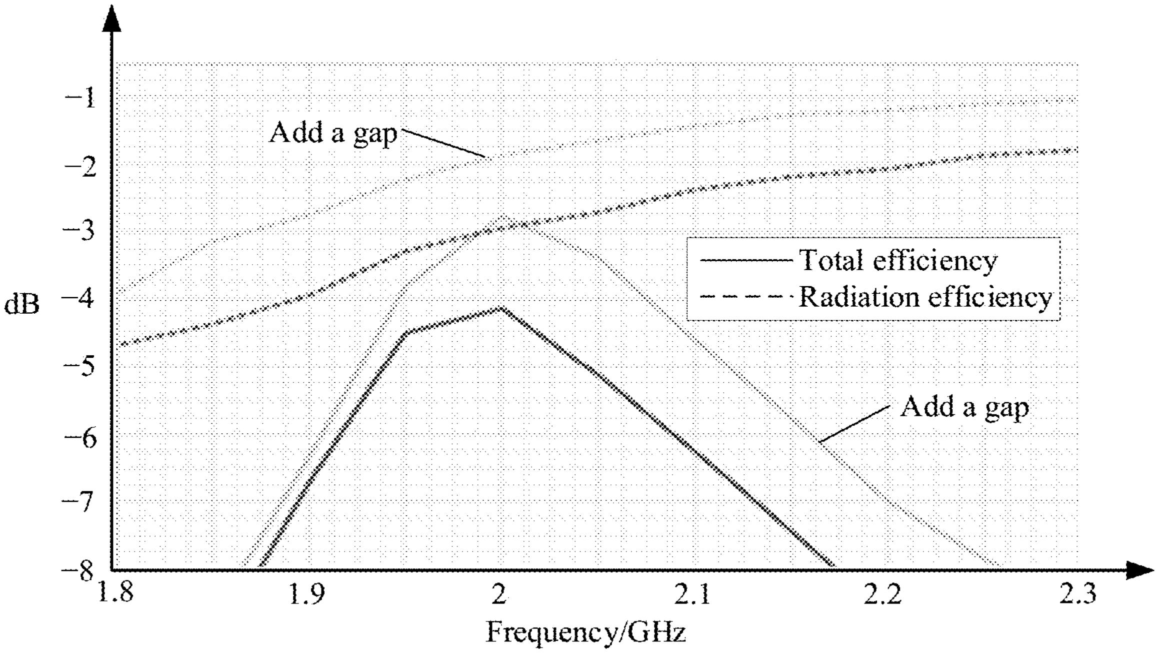
FIGS. 8A-8B are diagrams of a simulation result of the antenna structure shown in FIG. 6.
Figure 8B:
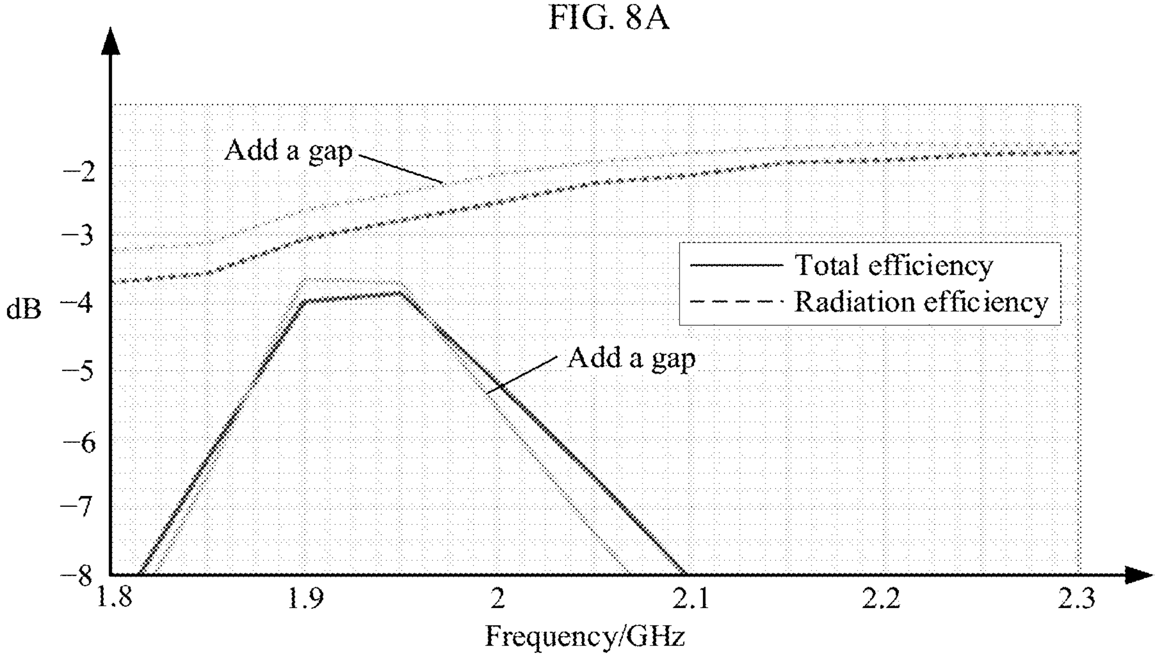

FIG. 8A is a diagram of simulation results of total efficiency and radiation efficiency of the wire antenna shown in FIG. 6 in the DM mode. After a gap is disposed on the radiator, in the mode (DM mode), the total efficiency and the radiation efficiency of the wire antenna are effectively improved. FIG. 8B is a diagram of simulation results of total efficiency and radiation efficiency of the wire antenna shown in FIG. 6 in the CM mode. After a gap is disposed on the radiator, in the mode (CM mode), the total efficiency and the radiation efficiency of the wire antenna are not effectively improved.

Figure 9A:
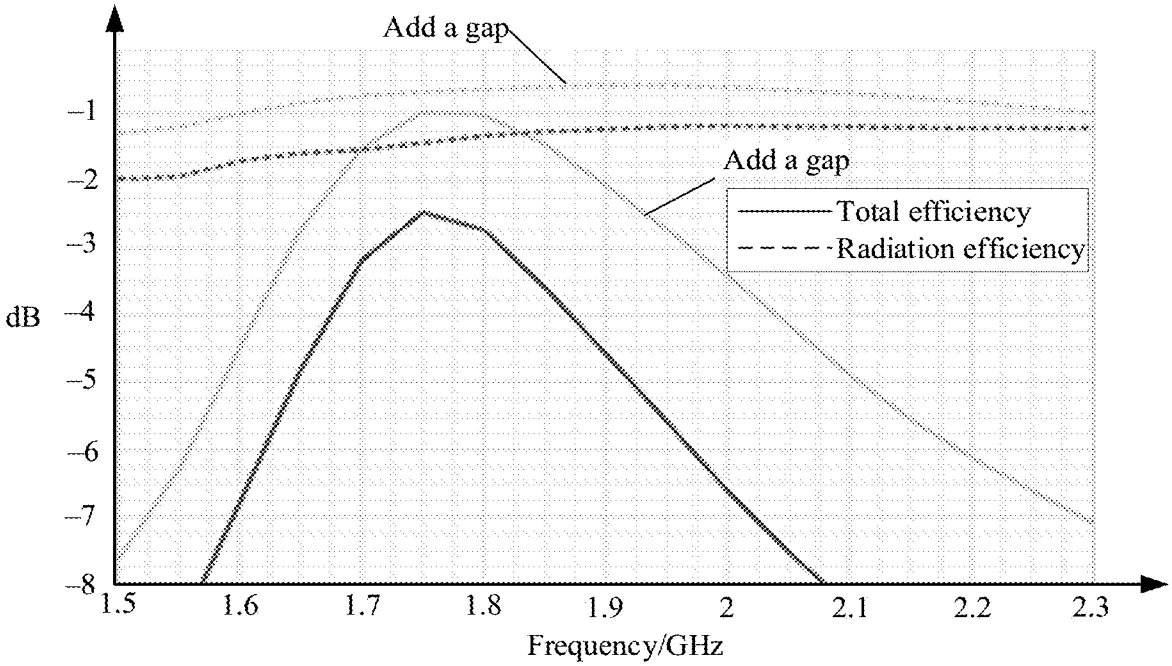
FIGS. 9A-9B are diagrams of a simulation result of the antenna structure shown in (a) in FIG. 7.
Figure 9B:
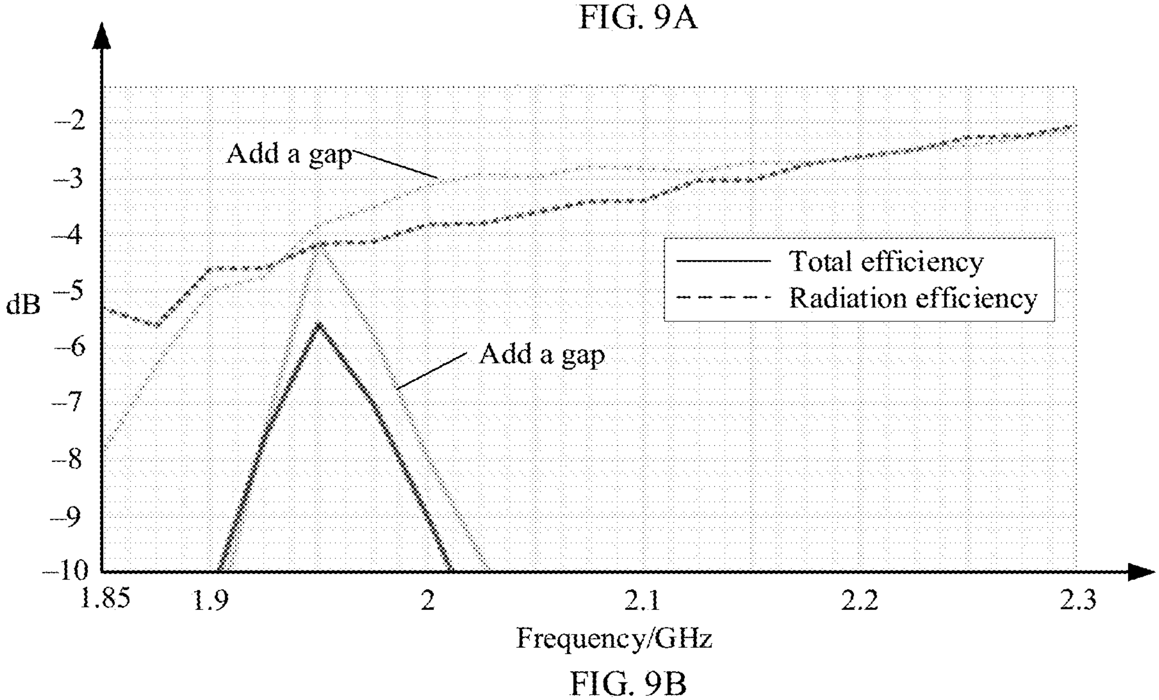

FIG. 9A is a diagram of simulation results of total efficiency and radiation efficiency of the slot antenna shown in FIG. 7 in the CM mode. After a gap is disposed on the radiator, in the mode (CM mode), the total efficiency and the radiation efficiency of the slot antenna are effectively improved. FIG. 9B is a diagram of simulation results of total efficiency and radiation efficiency of the slot antenna shown in FIG. 7 in the DM mode. After a gap is disposed on the radiator, in the mode (DM mode), the total efficiency and the radiation efficiency of the slot antenna are not effectively improved.

Therefore, a length of the radiator of the antenna structure is increased by opening the gap on the radiator, and a dielectric loss is reduced. In this way, efficiency of the DM mode of the wire antenna and efficiency of the CM mode of the slot antenna may be improved, but efficiency of the CM mode of the wire antenna and efficiency of the DM mode of the slot antenna are not greatly affected.

An embodiment of this application provides an electronic device, including a radiator and a ground plane. With the use of inductors disposed between the radiator and the ground plane, an electric field between the radiator and the ground plane is distributed more evenly, to reduce a conductor loss, and effectively improve radiation efficiency of an antenna structure.

Figure 10:
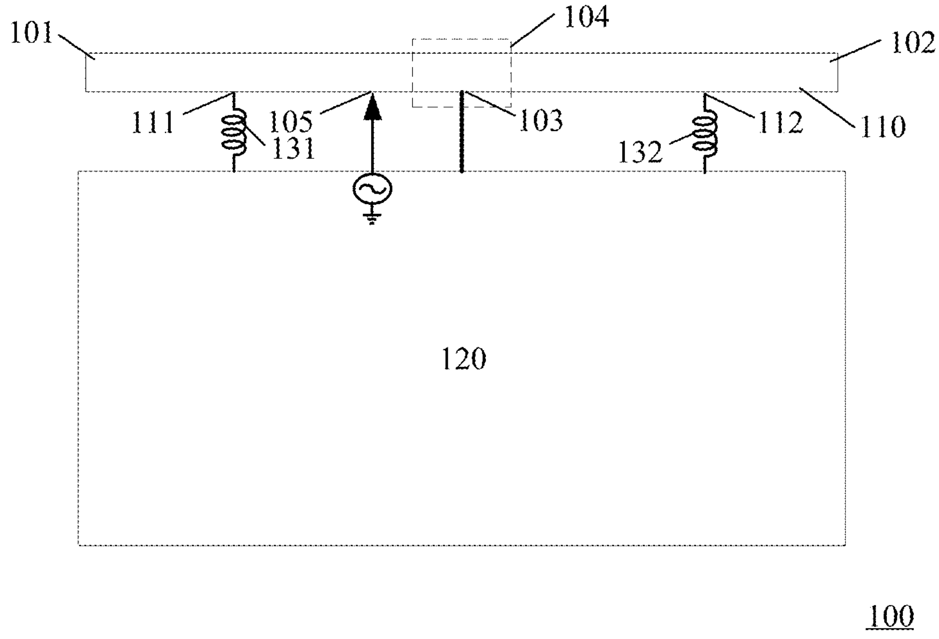
FIG. 10 is a diagram of an antenna structure 100 according to an embodiment of this application.

FIG. 10 is a diagram of an antenna structure 100 according to an embodiment of this application. The antenna structure 100 may be applied to the electronic device shown in FIG. 1.

As shown in FIG. 10, the antenna structure 100 may include a radiator 110, a ground plane 120, a first inductor 131, and a second inductor 132.

The radiator 110 includes a first end 101, a second end 102 (where the first end 101 and the second end 102 are open ends, and the radiator 110 is not connected to another conductor at the first end 101 and the second end 102), a ground point 103, a first connection point 111, and a second connection point 112, the ground point 103, the first connection point 111, and the second connection point 112 are located between the first end 101 and the second end 102. The ground point 103 may be disposed in a central area 104 of the radiator 110. The radiator 110 is grounded at the ground point 103 through the ground plane 120. Inductance values of the first inductor 131 and the second inductor 132 are both less than a first threshold. A length of the radiator 110 is greater than three quarters of a first wavelength, a part of the radiator from the first end 101 to the second end 102 is configured to generate a first resonance, and the first wavelength is a medium of the first resonance. The first inductor 131 is electrically connected between the first connection point 111 and the ground plane 120, and the second inductor 132 is electrically connected between the second connection point 112 and the ground plane 120. A distance between the first connection point 111 and the first end 101 is less than a quarter of the first wavelength, and the second connection point 112 is located between the first connection point 111 and the second end 102.

It should be understood that, the central area 104 of the radiator 110 may be understood as an area within 5 mm from a center of the radiator 110, and the center of the radiator 110 may be a center (geometric center) of a physical length of the radiator 110 or a center of an electrical length of the radiator 110.

In an embodiment, the radiator 110 may further include a feed point 105. The feed point 105 is configured to feed an electrical signal to the antenna structure 100, so that the antenna structure 100 generates radiation.

It should be understood that, in the technical solutions provided in this embodiment of this application, the inductors disposed between the radiator and the ground plane may be used, so that when the electrical signal is fed at the feed point, because the first inductor 131 and the second inductor 132 are electrically connected between the radiator 110 and the ground plane 120 at the first connection point 111 and the second connection point 112 respectively, a current on the radiator 110 is reversed in areas near the first connection point 111 and the second connection point 112. Correspondingly, a current on the ground plane 120 is reversed in an area near a connection between the first inductor 131 and the ground plane 120 and an area near a connection between the second inductor 132 and the ground plane 120. Current density on the radiator may be dispersed (strength of a single maximum current is reduced, so that the current is distributed more evenly). Therefore, a loss caused by the radiator and a conductor disposed around the radiator is reduced, to further improve efficiency of the antenna structure.

In addition, because the current on the radiator 110 is reversed in the areas near the first connection point 111 and the second connection point 112, the electric field cannot reach zero at the first connection point 111 and the second connection point 112, and the electric field generated by the radiator is continuous, is not reversed (does not include an electric field reverse area), and does not have zero. This increases a radiation aperture of the antenna structure, reduces a conductor loss, and improves the efficiency of the antenna structure. In one embodiment, the electric field generated by the radiator is in a same direction from the first end to the second end of the radiator.

In an embodiment, there is no switch disposed between the radiator 110 and the inductor (for example, there is no switch disposed between the first connection point 111 of the radiator 110 and the first inductor 131), or there is no switch disposed between the inductor and the ground plane 120 (for example, there is no switch between the first inductor 131 and the ground plane 120). In this embodiment of this application, the inductors (for example, the first inductor 131 and the second inductor 132) connected in series between the radiator 110 and the ground plane 120 are configured to disperse the current density on the radiator, to further reduce the loss caused by the radiator and the conductor disposed around the radiator. In one embodiment, the first inductor 131 and the second inductor 132 may affect a resonance frequency of the antenna structure to some extent, but are different from a tuning circuit that is mainly configured to adjust the resonance frequency of the antenna structure. In addition, there is no switch disposed at the inductor to switch a frequency band. The switch introduces an extra insertion loss, causing a loss of radiation performance of the antenna structure.

In an embodiment, the distance between the first connection point 111 and the first end 101 is less than a quarter of the first wavelength, so that the efficiency of the antenna structure may be further improved.

In one embodiment, the feed point 105 is located between the central area 104 and the first end 101 or between the central area 104 and the second end 102. An electrical signal may be fed into the antenna structure 100 in an offset feed manner, so that the antenna structure 100 may operate in both a CM mode and a DM mode, to extend an operating frequency band of the antenna structure 100.

It should be understood that, in this embodiment of this application, for brevity of descriptions, descriptions are provided only in an offset feed manner. In actual application, the CM mode and the DM mode of the antenna structure may be excited by using central symmetrical feed or central anti-symmetrical feed. This is not limited in this application, and may be adjusted based on an internal layout of the electronic device. The following embodiments may also be correspondingly understood.

In an embodiment, the inductance values of the first inductor 131 and the second inductor 132 may be designed based on a resonance frequency generated by the antenna structure 100. When a frequency of the first resonance is less than or equal to 1 GHz, the first threshold is 6 nH. When a frequency of the first resonance is greater than 1 GHz and less than or equal to 2.2 GHz, the first threshold is 4 nH. When a frequency of the first resonance is greater than 2.2 GHz and less than or equal to 3 GHz, the first threshold is 3 nH. When a frequency of the first resonance is greater than 3 GHz, the first threshold is 2 nH.

It should be understood that, the inductance values of the first inductor 131 and the second inductor 132 are designed based on different operating frequency bands of the antenna structure, so that the current on the radiator is distributed more evenly in the operating frequency band, and the conductor loss is reduced, to further improve the efficiency of the antenna structure.

Figure 11:
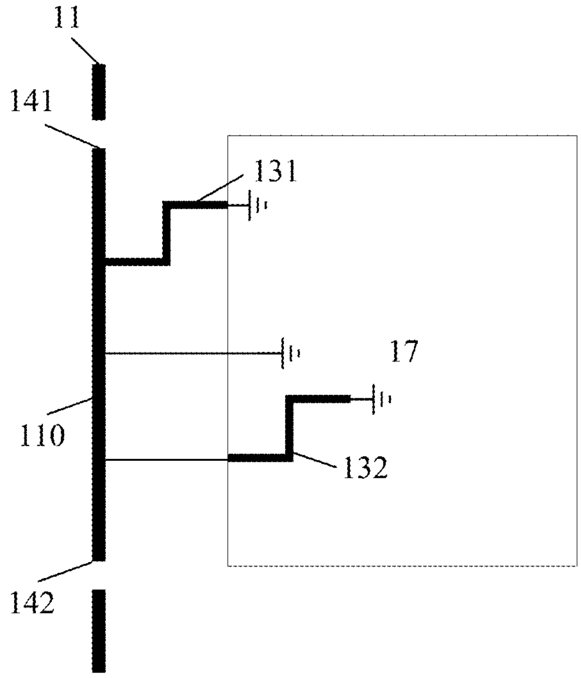
FIG. 11 is a diagram of an electronic device according to an embodiment of this application.

In an embodiment, the electronic device further includes a conductive frame 11, where the frame 11 has a first position 141 and a second position 142, and the frame 11 between the first position 141 and the second position 142 is used as the radiator 110, as shown in FIG. 11. It should be understood that, the first position 141 and the second position 142 may correspond to the first end 101 and the second end 102.

In an embodiment, gaps may be disposed at the first position 141 and the second position 142 of the frame 11, so that the first position 141 and the second position 142 are not connected to another part of the frame 11, and ends of the radiator at the first position 141 and the second position 142 are open ends. It should be understood that, the first position 141 and the second position 142 may be located on a same side of the frame 11, and the radiator 110 may be of a straight line type; or the first position 141 and the second position 142 may be located on two adjacent sides of the frame 11, and the radiator 110 may be of a polyline type, for example, an L-shaped type.

The inductors described in all embodiments of this application (the first inductor 131, the second inductor 132, or other inductors described below) may be a lumped component, a distributed component, or a combination of a lumped component and a distributed component. This is not limited in this application. In one embodiment, the first inductor 131 and/or the second inductor 132 may include a distributed component, for example, a conductive member extending inward on the frame; and/or a conductive member extending on a middle frame; and/or a conductive member extending on a PCB; and/or a metal wire on the PCB. In an embodiment, as shown in FIG. 11, the first inductor 131 may include a connecting rib disposed between the frame 11 and the middle frame/PCB 17 in the electronic device. In an embodiment, as shown in FIG. 11, the second inductor 132 may include a section of metal wire on the PCB 14.

In an embodiment, the first connection point 111 and the second connection point 112 are respectively disposed on both sides of the ground point 103. The first connection point 111 is located between the first end 101 and the ground point 103, and the second connection point 112 is located between the second end 102 and the ground point 103. In one embodiment, the distance between the first connection point 111 and the first end 101 is less than a quarter of the first wavelength. In one embodiment, a distance between the second connection point 112 and the second end 102 is less than a quarter of the first wavelength.

It should be understood that, the inductors are electrically connected to both sides of the ground point 103 respectively, so that the current on the radiator 110 on both sides of the ground point 103 is affected by ground inductors, and the current on the radiator 110 is distributed more evenly. In addition, the electric field generated by the radiator 110 on both sides of the ground point 103 may not include an electric field reverse area. This increases the radiation aperture of the antenna structure, reduces the conductor loss, and improves the efficiency of the antenna structure.

In an embodiment, the antenna structure 100 may further include at least one third inductor, electrically connected between at least one corresponding third connection point and the ground plane 120. The at least one third inductor and the at least one third connection point may be in one-to-one correspondence, and the at least one third connection point is located between the ground point 103 and the first connection point 111.

In an embodiment, the antenna structure 100 may further include at least one fourth inductor, electrically connected between at least one corresponding fourth connection point and the ground plane 120. The at least one fourth inductor and the at least one fourth connection point may be in one-to-one correspondence, and the at least one fourth connection point is located between the ground point 103 and the second connection point 112.

It should be understood that, a quantity of inductors that are electrically connected between the radiator 110 and the ground plane 120 is increased, so that current density distribution on the radiator is more evenly, to further reduce the loss caused by the radiator and the conductor disposed around the radiator. In addition, each position at which the radiator is connected to the inductor includes a current reverse area, so that the electric field cannot reach zero, and the electric field generated by the radiator is continuous and is not reversed (does not include an electric field reverse area). This increases the radiation aperture of the antenna structure, reduces the conductor loss, and improves the efficiency of the antenna structure. After a plurality of inductance values are set, an inductance threshold may need to be correspondingly increased. For example, when three or more inductors are electrically connected between the radiator 110 and the ground plane 120, and the frequency of the first resonance is less than or equal to 1 GHz, the first threshold is 12 nH. When the frequency of the first resonance is greater than 1 GHz and less than or equal to 2.2 GHz, the first threshold is 8 nH. When the frequency of the first resonance is greater than 2.2 GHz and less than or equal to 3 GHz, the first threshold is 6 nH. When the frequency of the first resonance is greater than 3 GHz, the first threshold is 4 nH.

In an embodiment, one or more gaps may be disposed on the radiator 110. It should be understood that, the inductor is disposed between the radiator 110 and the ground plane 120, to improve the efficiency of the antenna structure 100 in the CM mode, and the gap is disposed on the radiator 110, to improve the efficiency of the antenna structure 100 in the DM mode. In an embodiment, a gap structure disposed on the radiator 110 may be equivalent to a capacitor, so that the radiator 110 is equivalent to a metamaterial structure in which the capacitor is connected in series.

Figure 12:
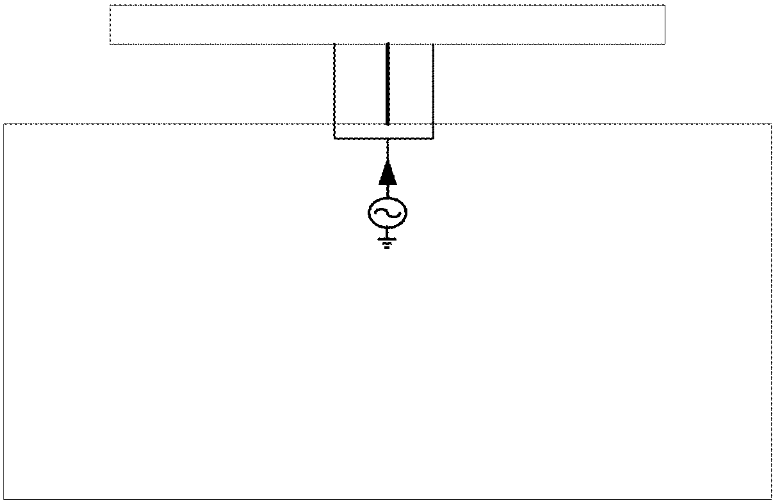
FIG. 12 is a diagram of an antenna structure according to an embodiment of this application.
Figure 13:
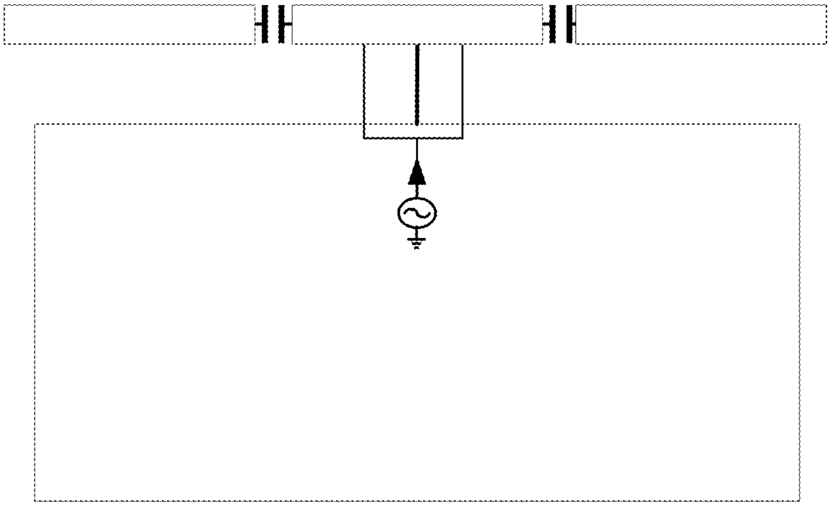
FIG. 13 is a diagram of an antenna structure according to an embodiment of this application.
Figure 14:
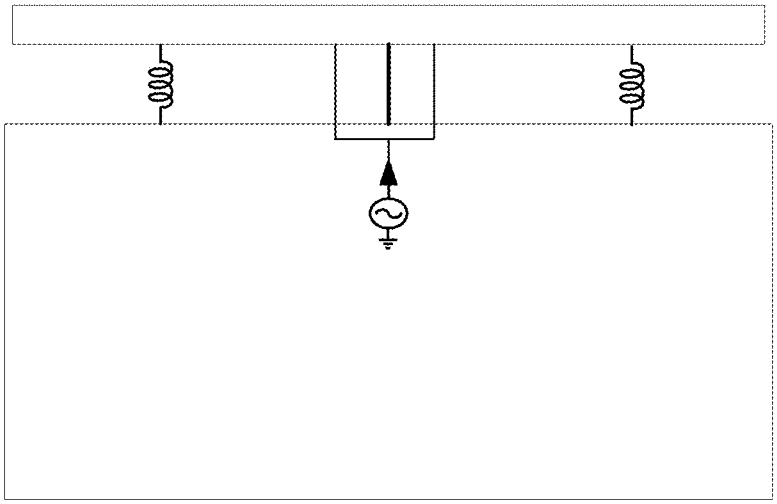
FIG. 14 is a diagram of an antenna structure according to an embodiment of this application.

FIG. 12 to FIG. 14 are diagrams of a group of antenna structures according to an embodiment of this application.

FIG. 12 to FIG. 14 are diagrams of different structures of a wire antenna. A difference between the antenna structure shown in FIG. 13 and the antenna structure shown in FIG. 12 lies in that two gaps are disposed on a radiator. For positions of the gaps (or capacitors), refer to the foregoing embodiment. A difference between the antenna structure shown in FIG. 14 and the antenna structure shown in FIG. 12 lies in that two inductors are disposed between the radiator and the ground plane. For positions of the inductors, refer to the foregoing embodiment.

As shown in FIG. 13, in an embodiment, the gap disposed on the radiator may be considered as an equivalent capacitor (for example, a distributed capacitor) disposed on the radiator. In an embodiment, a width of the gap is greater than or equal to 0.1 mm and less than or equal to 2 mm. In an embodiment, a capacitor (for example, a lumped capacitor) may be connected in series at both ends of the gap disposed on the radiator, to form a metamaterial structure in which the capacitor is connected in series. It should be understood that, for ease of intuitive display of comparison of antenna efficiency when the wire antenna operates in the CM mode, an example in which the antenna structure uses central symmetrical feed is used for description. In addition, an example in which the antenna structures shown in FIG. 12 to FIG. 14 operate in a half-wavelength mode in the CM mode, and operating frequency bands of the antenna structures include 1.9 GHz is used for description. To ensure that the antenna structures shown in FIG. 12 to FIG. 14 operate in a same frequency band, a length of the radiator in the antenna structures is adjusted. In the antenna structure shown in FIG. 12, the length of the radiator is 36 mm. In the antenna structure shown in FIG. 13, the length of the radiator is 60 mm, and an equivalent capacitance value of a distributed capacitor at both ends of the gap or a capacitance value of a lumped capacitor connected in series at both ends of the gap is 0.75 picofarads (pF). In the antenna structure shown in FIG. 14, the length of the radiator is 58 mm, and inductance values of inductors connected in series are both 2.7 nH.

Figure 15:
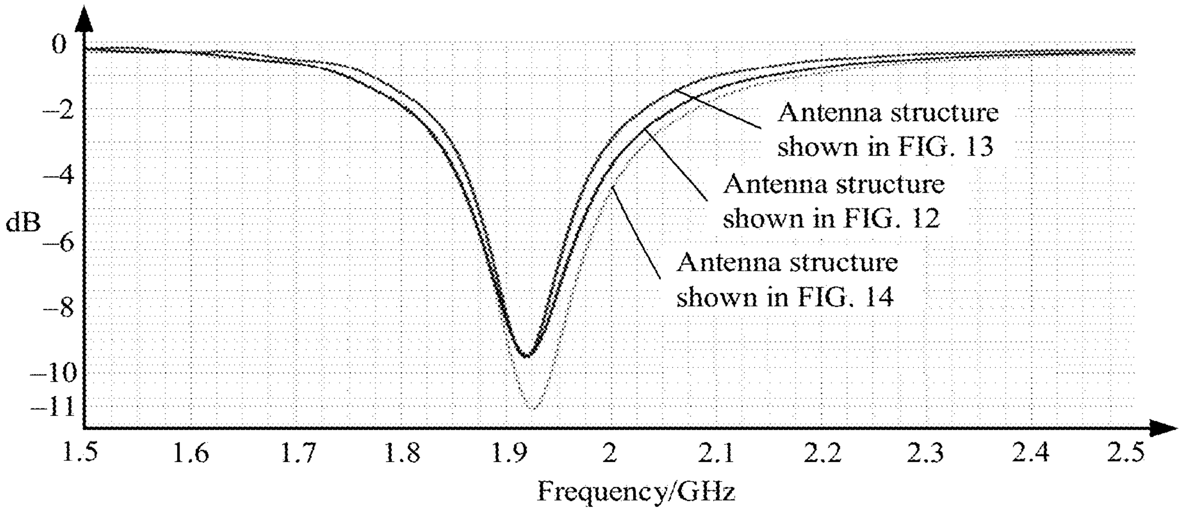
FIG. 15 is a diagram of S-parameters of the antenna structures shown in FIG. 12 to FIG. 14 according to an embodiment of this application.
Figure 16:
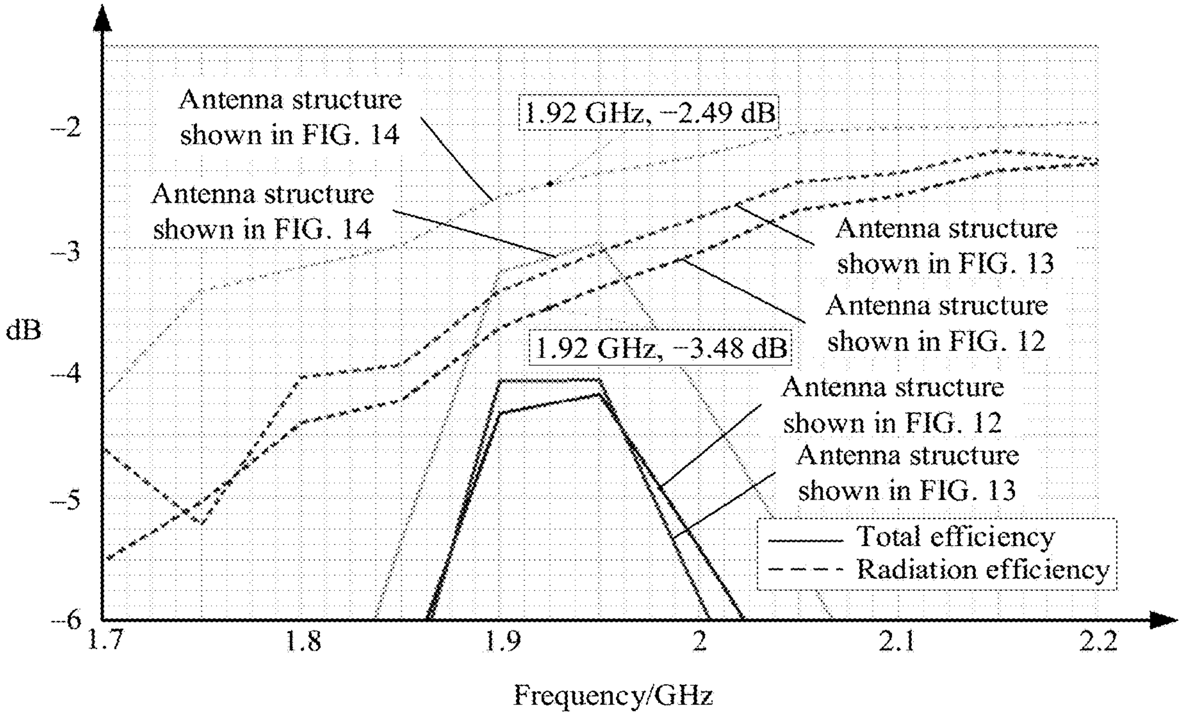
FIG. 16 is a diagram of simulation results of total efficiency and radiation efficiency of the antenna structures shown in FIG. 12 to FIG. 14 according to an embodiment of this application.

FIG. 15 and FIG. 16 are diagrams of simulation results of the antenna structures shown in FIG. 12 to FIG. 14. FIG. 15 is a diagram of S-parameters of the antenna structures shown in FIG. 12 to FIG. 14 according to an embodiment of this application. FIG. 16 is a diagram of simulation results of total efficiency and radiation efficiency of the antenna structures shown in FIG. 12 to FIG. 14 according to an embodiment of this application.

As shown in FIG. 15, S11<−4 dB is used as an example. The antenna structures shown in FIG. 12 to FIG. 14 operate in a CM mode, and operating frequency bands all include 1.87 GHz to 1.97 GHz. A bandwidth generated during resonance of the antenna structure shown in FIG. 13 is wider.

As shown in FIG. 16, within the foregoing frequency band, the efficiency (total efficiency and radiation efficiency) of the antenna structure shown in FIG. 13 is basically the same as that of the antenna structure shown in FIG. 12. In the antenna structure shown in FIG. 14, because the inductors disposed between the radiator and the ground plane are added, the total efficiency of the antenna structure is significantly improved compared with that of the antenna structure shown in FIG. 12. At 1.92 hertz (Hz), the total efficiency of the antenna structure is improved by about 1 dB, and the radiation efficiency is also improved by about 1 dB.

Figure 17A:
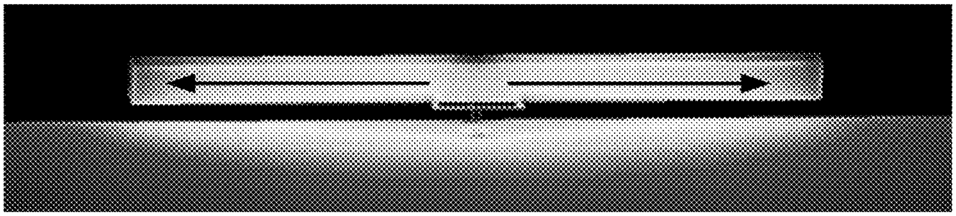
FIGS. 17A-17B are diagrams of a current and an electric field of the antenna structure shown in FIG. 12.
Figure 17B:
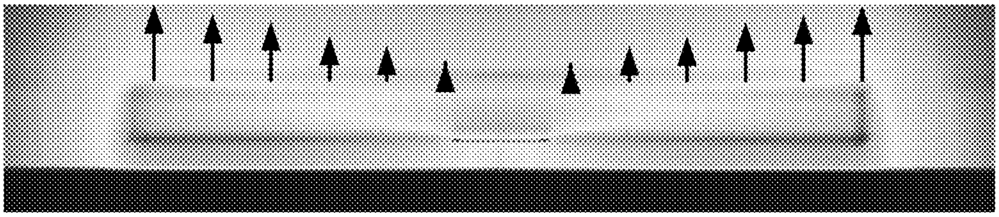
Figure 18A:
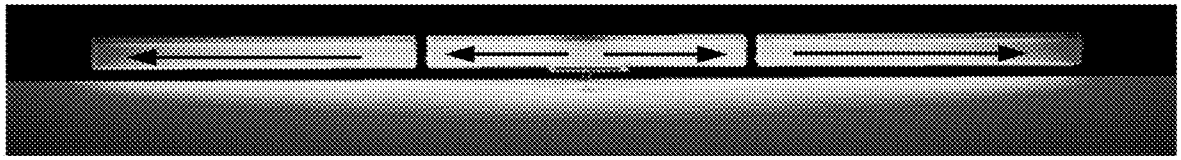
FIGS. 18A-18B are diagrams of a current and an electric field of the antenna structure shown in FIG. 13.
Figure 18B:
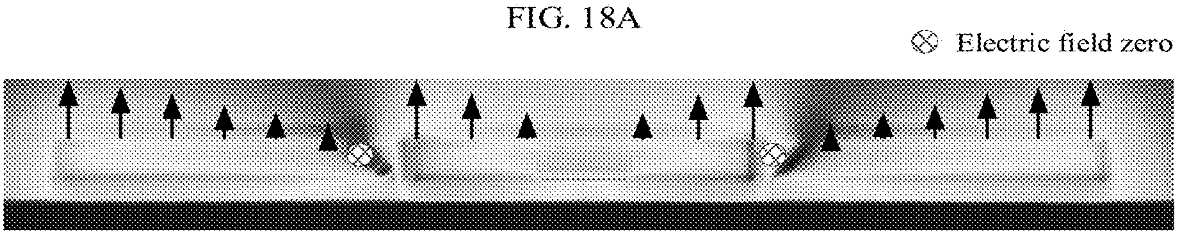
Figure 19A:
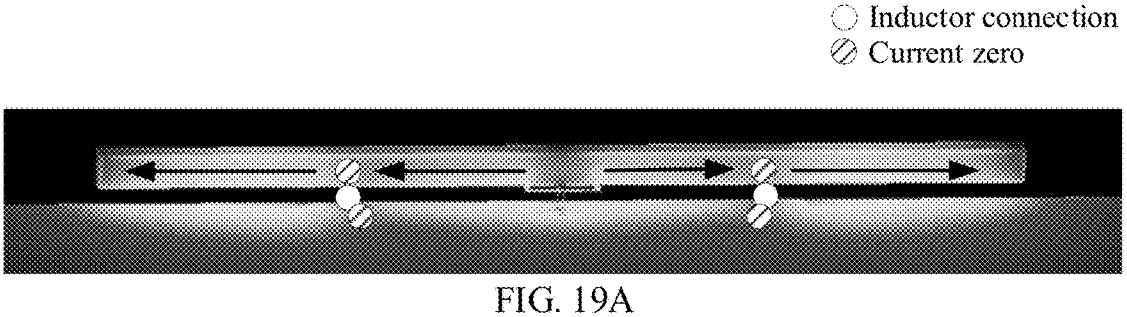
FIGS. 19A-19B are diagrams of a current and an electric field of the antenna structure shown in FIG. 14.
Figure 19B:
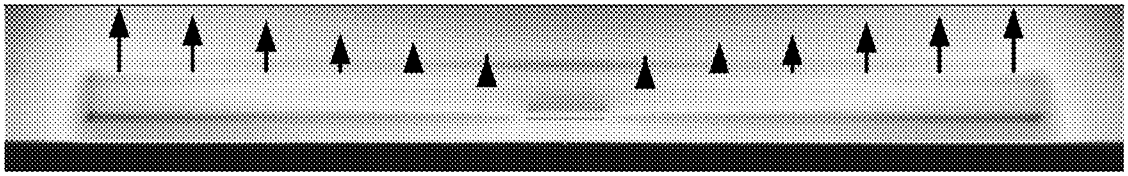

FIG. 17A to FIG. 19B are diagrams of currents and electric fields of the antenna structures shown in FIG. 12 to FIG. 14. FIGS. 17A-17B are diagrams of a current and an electric field of the antenna structure shown in FIG. 12. FIGS. 18A-18B are diagrams of a current and an electric field of the antenna structure shown in FIG. 13. FIGS. 19A-19B are diagrams of a current and an electric field of the antenna structure shown in FIG. 14.

As shown in FIG. 17A, the antenna structure operates in a half-wavelength mode in the CM mode, the current on the radiator during resonance does not have zero, and the current is concentrated in an area near a ground point. As shown in FIG. 17B, the electric field that is generated during resonance of the antenna structure and that is between the radiator and the ground plane is concentrated at both ends of the radiator.

As shown in FIG. 18A, the antenna structure operates in a half-wavelength mode in the CM mode, the current on the radiator during resonance does not have zero, and the current is concentrated in an area near a ground point. As shown in FIG. 18B, the electric field that is generated during resonance of the antenna structure and that is between the radiator and the ground plane is concentrated at both ends of the radiator and an area near each disposed gap.

As shown in FIG. 19A, the antenna structure operates in a half-wavelength mode in the CM mode, the current on the radiator during resonance has zero in an area (on the radiator and the ground plane) near a connected inductor, and current density is more dispersed than those in the simulation diagrams shown in FIGS. 17A-17B and FIGS. 18A-18B. As shown in FIG. 19B, because the current density is more dispersed, the electric field that is generated during resonance of the antenna structure and that is between the radiator and the ground plane is reduced compared with those in the simulation diagrams shown in FIGS. 17A-17B and FIGS. 18A-18B, so that a conductor loss may be reduced, to improve the efficiency of the antenna structure.

Figure 20:
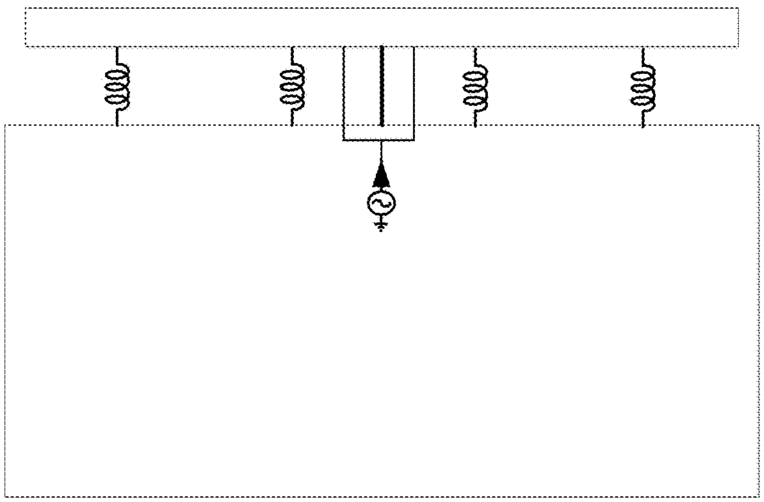
FIG. 20 is a diagram of another antenna structure according to an embodiment of this application.

FIG. 20 is a diagram of another antenna structure according to an embodiment of this application.

For the antenna structure shown in FIG. 20, for positions of inductors, refer to the foregoing embodiment. A difference between the antenna structure shown in FIG. 20 the antenna structure shown in FIG. 14 lies in that four inductors are disposed between the radiator and the ground plane.

For ease of intuitive display of comparison of antenna efficiency when the wire antenna operates in the CM mode, an example in which the antenna structure uses central symmetrical feed is used for description. To ensure that the antenna structures shown in FIG. 12, FIG. 14, and FIG. 20 operate in a same frequency band, a length of the radiator in the antenna structures is adjusted. In the antenna structure shown in FIG. 12, the length of the radiator is 35.6 mm (about half of the first wavelength). In the antenna structure shown in FIG. 14, the length of the radiator is 51.6 mm (about three-quarters of the first wavelength), inductance values of two inductors connected in series are both 2.7 nH, and the two inductors are respectively located on both sides of the ground point. In the antenna structure shown in FIG. 20, the length of the radiator is 67 mm (about the first wavelength). In the four inductors connected in series, inductance values of the inductors close to both sides of the ground point are both 5 nH, and inductance values of the inductors close to both ends of the radiator are both 5.5 nH. In addition, to ensure that resonance frequencies of the antenna structures shown in FIG. 14 and FIG. 20 are the same as the resonance frequency of the antenna structure shown in FIG. 12, an inductor of 1.5 nH is disposed between the ground point of the radiator of the antenna structure shown in FIG. 14 and the ground plane of the antenna structure shown in FIG. 14, and an inductor of 3 nH is disposed between the ground point of the radiator of the antenna structure shown in FIG. 20 and the ground plane of the antenna structure shown in FIG. 20.

Figure 21:
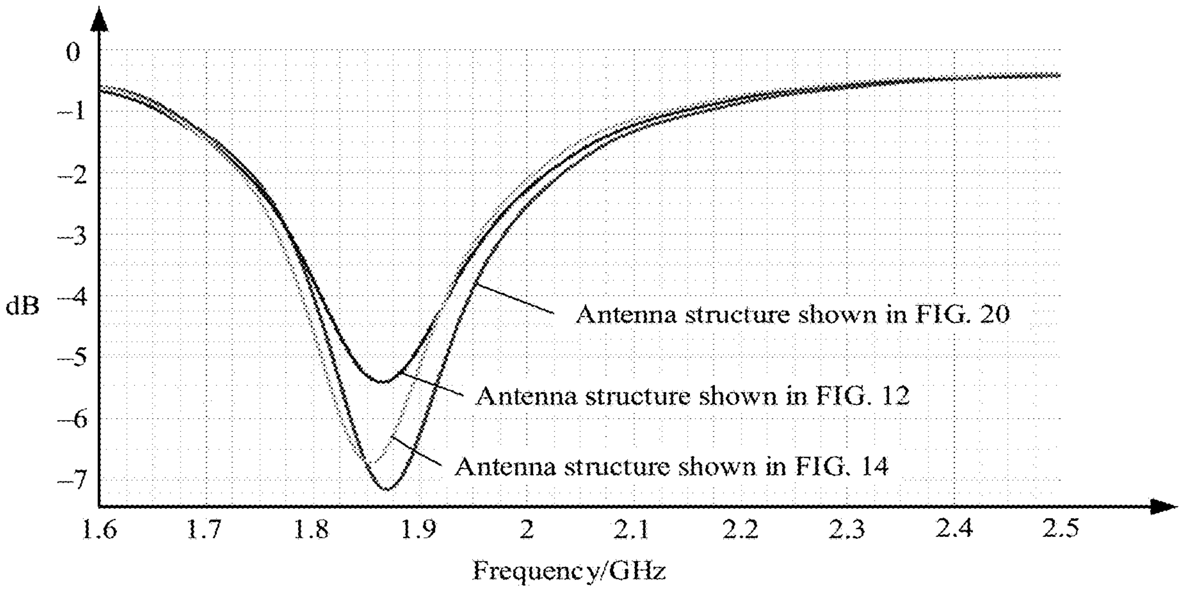
FIG. 21 is a diagram of S-parameters of the antenna structures shown in FIG. 12, FIG. 14, and FIG. 20 according to an embodiment of this application.
Figure 22:
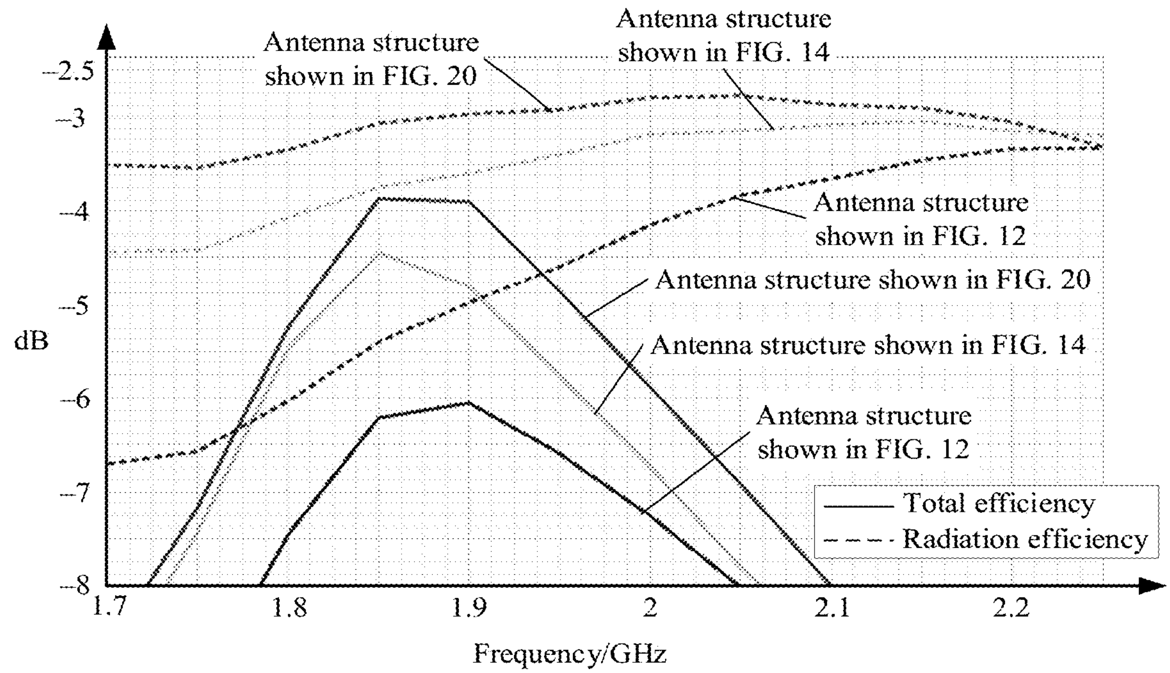
FIG. 22 is a diagram of simulation results of total efficiency and radiation efficiency of the antenna structures shown in FIG. 12, FIG. 14, and FIG. 20 with a radiator conductivity of an order of 105 according to an embodiment of this application.
Figure 23:
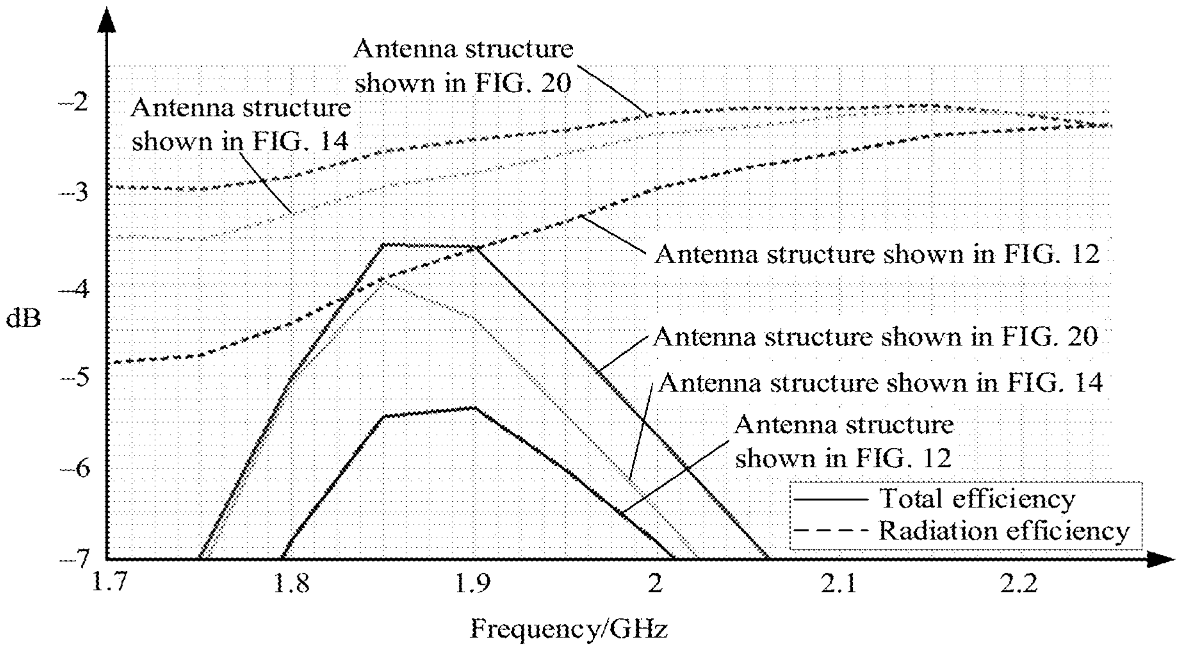
FIG. 23 is a diagram of simulation results of total efficiency and radiation efficiency of the antenna structures shown in FIG. 12, FIG. 14, and FIG. 20 with a radiator conductivity of an order of 106 according to an embodiment of this application.

FIG. 21 to FIG. 23 are diagrams of simulation results of the antenna structures shown in FIG. 12, FIG. 14, and FIG. 20. FIG. 21 is a diagram of S-parameters of the antenna structures shown in FIG. 12, FIG. 14, and FIG. 20 according to an embodiment of this application. FIG. 22 is a diagram of simulation results of total efficiency and radiation efficiency of the antenna structures shown in FIG. 12, FIG. 14, and FIG. 20 with a radiator conductivity of an order of 105 according to an embodiment of this application. FIG. 23 is a diagram of simulation results of total efficiency and radiation efficiency of the antenna structures shown in FIG. 12, FIG. 14, and FIG. 20 with a radiator conductivity of an order of 106 according to an embodiment of this application.

As shown in FIG. 21, S11<−4 dB is used as an example. The antenna structures shown in FIG. 12, FIG. 14, and FIG. 20 operate in a CM mode, and resonance frequency bands of the antenna structures are near 1.85 GHz. With an increase in a quantity of inductors disposed between the radiator and the ground plane, resonance bandwidths of the antenna structures are gradually broadened.

As shown in FIG. 22 and FIG. 23, with an increase in a quantity of inductors disposed between the radiator and the ground plane, the radiation efficiency and the total efficiency of the antenna structures are significantly increased.

When the radiator conductivity is in the order of 105, at 1.85 Hz, the radiation efficiency of the antenna structure shown in FIG. 20 is improved by about 2.3 dB compared with that of the antenna structure shown in FIG. 12, as shown in FIG. 22.

When the radiator conductivity is in the order of 106, at 1.85 Hz, the radiation efficiency of the antenna structure shown in FIG. 20 is improved by about 1.4 dB compared with that of the antenna structure shown in FIG. 12, as shown in FIG. 23.

It should be understood that, because of the inductors disposed between the radiator and the ground plane, the length of the radiator of the antenna structure is extended from a half wavelength (the antenna structure shown in FIG. 12) to a wavelength (the antenna structure shown in FIG. 20), so that a radiation aperture is increased, and a conductor loss may be reduced, as shown in Table 1. The conductor loss is a loss of radiation caused by a material (aluminum AL) of the radiator and a PCB on which the ground plane is located. The dielectric loss is a loss of radiation caused by plastic (ABS) and a glass cover (CG) disposed around the radiator.

TABLE 1

| | Radiation efficiency | Conductor loss (%) | | Dielectric loss (%) | |
|---|---|---|---|---|---|
| | (%) | PCB | AL | CG | ABS |
| Antenna structure shown in FIG. 12 | 40 | 2 | 17 | 9 | 31 |
| Antenna structure shown in FIG. 14 | 51 | 1 | 9 | 8 | 31 |
| Antenna structure shown in FIG. 20 | 56 | 1 | 5 | 8 | 31 |

As shown in Table 1, the inductors disposed between the radiator and the ground plane may reduce the conductor loss, but the dielectric loss is not obviously reduced. In addition, as shown in FIG. 22 and FIG. 23, after the radiator conductivity is reduced, efficiency of the antenna structure is improved more obviously.

Figure 24:
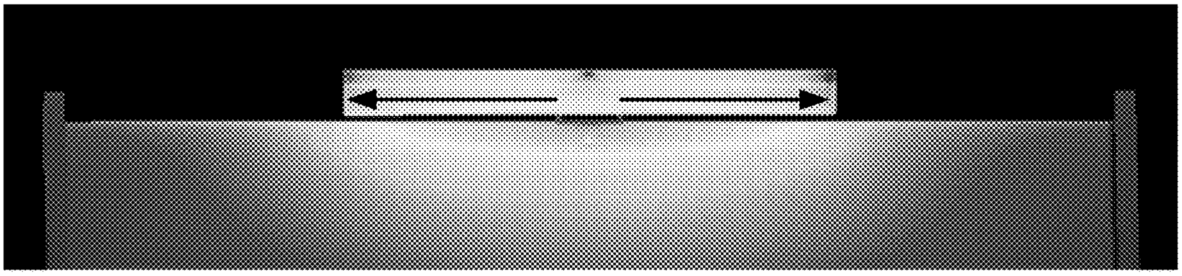
FIG. 24 is a diagram of current distribution of the antenna structure shown in FIG. 12.
Figure 25:
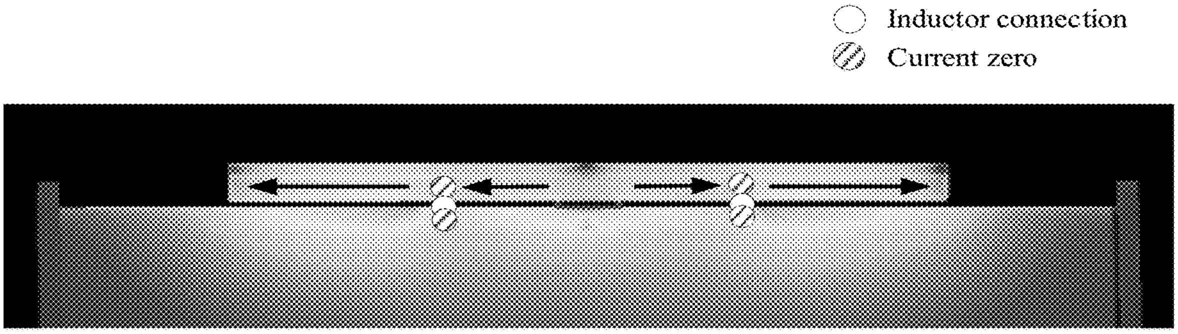
FIG. 25 is a diagram of current distribution of the antenna structure shown in FIG. 14.
Figure 26:
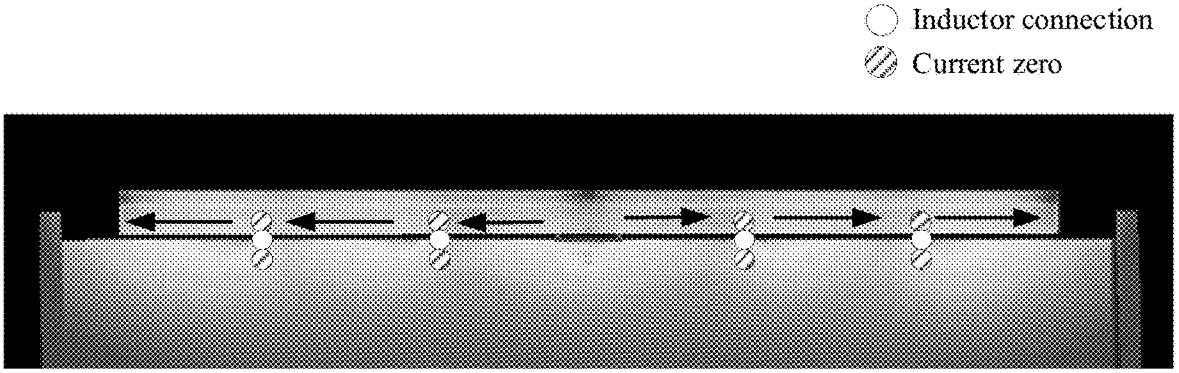
FIG. 26 is a diagram of current distribution of the antenna structure shown in FIG. 20.

FIG. 24 to FIG. 26 are respectively diagrams of current distribution when the antenna structures shown in FIG. 12, FIG. 14, and FIG. 20 operate in a same frequency band (for example, near 1.85 GHz).

As shown in FIG. 24 to FIG. 26, with an increase in a quantity of inductors electrically connected between the radiator and the ground plane, zero of the current on the radiator in an area near the connected inductor (on the radiator and the ground plane) during resonance increases, so that current density may be more dispersed, to reduce the conductor loss during radiation, and improve the efficiency of the antenna structure.

Figure 27:
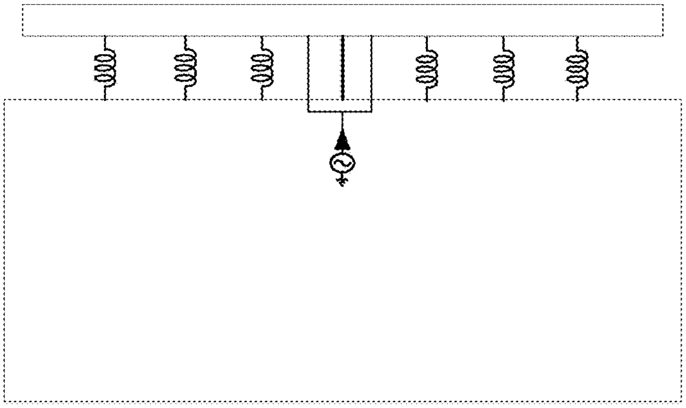
FIG. 27 is a diagram of another antenna structure according to an embodiment of this application.

FIG. 27 is a diagram of another antenna structure according to an embodiment of this application.

In the antenna structure shown in FIG. 27, for positions of inductors, refer to the foregoing embodiment. A difference between the antenna structure shown in FIG. 27 and the antenna structures shown in FIG. 14 and FIG. 20 lies in that three or more inductors, for example, six inductors, are disposed between the radiator and the ground plane.

Figure 28:
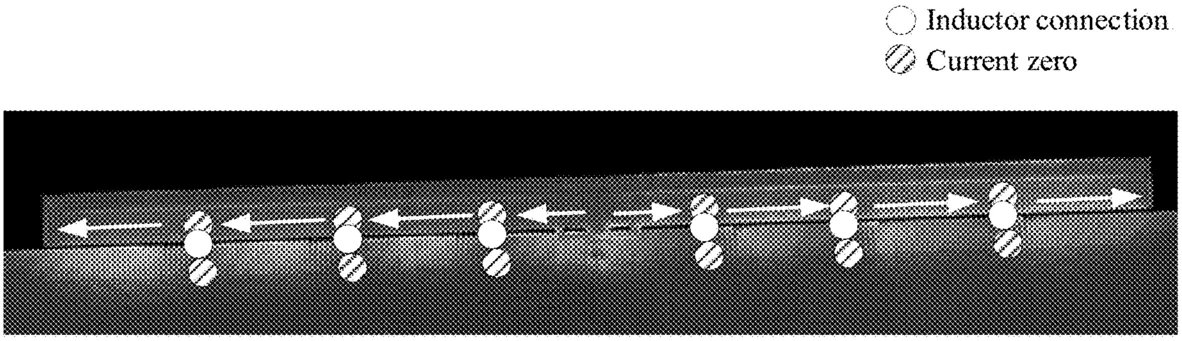
FIG. 28 is a diagram of current distribution of the antenna structure shown in FIG. 27.

It should be understood that, with an increase in a quantity of inductors disposed between the radiator and the ground plane, when the antenna structure generates radiation, the current is distributed more evenly, as shown in FIG. 28.

FIG. 29 to FIG. 32 are diagrams of a group of antenna structures according to an embodiment of this application.

FIG. 29 to FIG. 32 are diagrams of different structures of a wire antenna. A difference between the antenna structure shown in FIG. 30 and the antenna structure shown in FIG. 29 lies in that two gaps are disposed on the radiator. A difference between the antenna structure shown in FIG. 31 and the antenna structure shown in FIG. 30 lies in that two inductors are disposed between the radiator and the ground plane. A difference between the antenna structure shown in FIG. 32 and the antenna structure shown in FIG. 29 lies in that two gaps are disposed on the radiator, and two inductors are disposed between the radiator and the ground plane.

Figure 30:
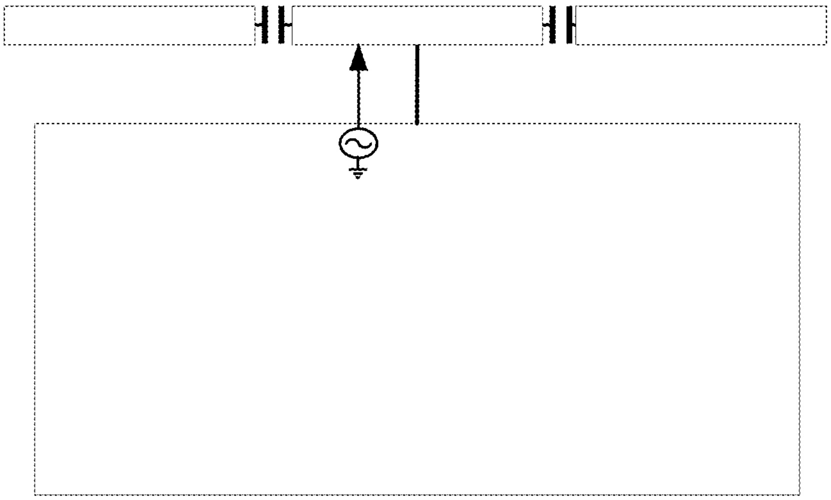
FIG. 30 is a diagram of an antenna structure according to an embodiment of this application.
Figure 32:
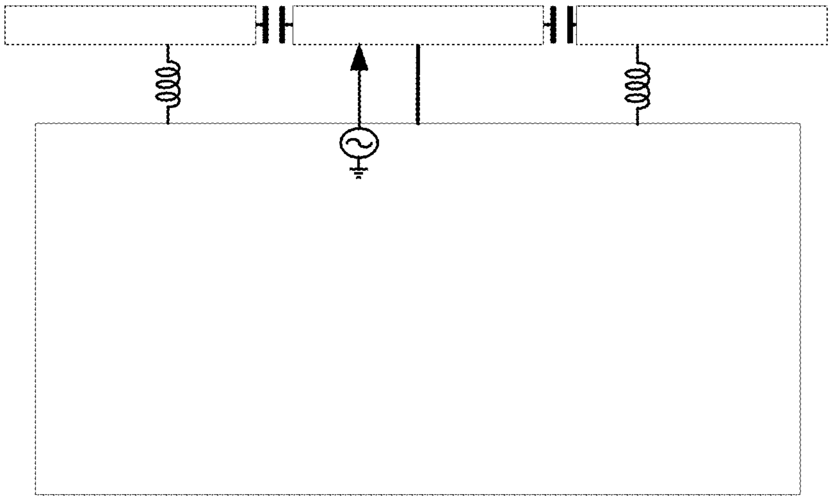
FIG. 32 is a diagram of an antenna structure according to an embodiment of this application.

As shown in FIG. 30 and FIG. 32, in an embodiment, the gap disposed on the radiator may be considered as an equivalent capacitor (for example, a distributed capacitor) disposed on the radiator. For positions of the gaps (or capacitors) and the inductor, refer to the foregoing embodiment. In an embodiment, a capacitor (for example, a lumped capacitor) may be connected in series at both ends of the gap disposed on the radiator, to form a metamaterial structure in which the capacitor is connected in series.

It should be understood that, for ease of intuitive display of comparison of antenna efficiency when the wire antenna operates in a CM mode and a DM mode, an example in which the antenna structure simultaneously excites the CM mode and the DM mode in an offset feed manner is used for description. In addition, an example in which the antenna structures shown in FIG. 29 to FIG. 32 operate in the CM mode and a half-wavelength mode in the DM, operating frequency bands corresponding to the CM mode include 1.95 GHz, and operating frequency bands corresponding to the DM mode include 2.25 GHz is used for description. To ensure that the antenna structures shown in FIG. 29 to FIG. 32 operate in a same frequency band, a length of the radiator in the antenna structures is adjusted. In the antenna structure shown in FIG. 29, the length of the radiator is 40 mm. In the antenna structure shown in FIG. 30, the length of the radiator is 54 mm. Because feed positions of the antenna structure are asymmetric, an equivalent capacitance value of a distributed capacitor close to a feed point or a capacitance value of a lumped capacitor close to the feed point is 1 pF, and an equivalent capacitance value of a distributed capacitor away from the feed point or a capacitance value of a lumped capacitor away from the feed point is 1.4 pF. In the antenna structure shown in FIG. 31, the length of the radiator is 50 mm, an inductance value of an inductor that is connected in series and that is close to the feed point is 1.5 nH, and an inductance value of an inductor that is connected in series and that is away from the feed point is 3.3 nH. In the antenna structure shown in FIG. 32, the length of the radiator is 60 mm. An equivalent capacitance value of a distributed capacitor at both ends of a gap close to a feed point or a capacitance value of a lumped capacitor at both ends of the gap close to the feed point is 1 pF, and an inductance value of an inductor close to the feed point is 2.5 nH. An equivalent capacitance value of a distributed capacitor at both ends of a gap away from the feed point or a capacitance value of a lumped capacitor at both ends of the gap away from the feed point is 1 pF, and an inductance value of an inductor away from the feed point is 4 nH.

Figure 33:
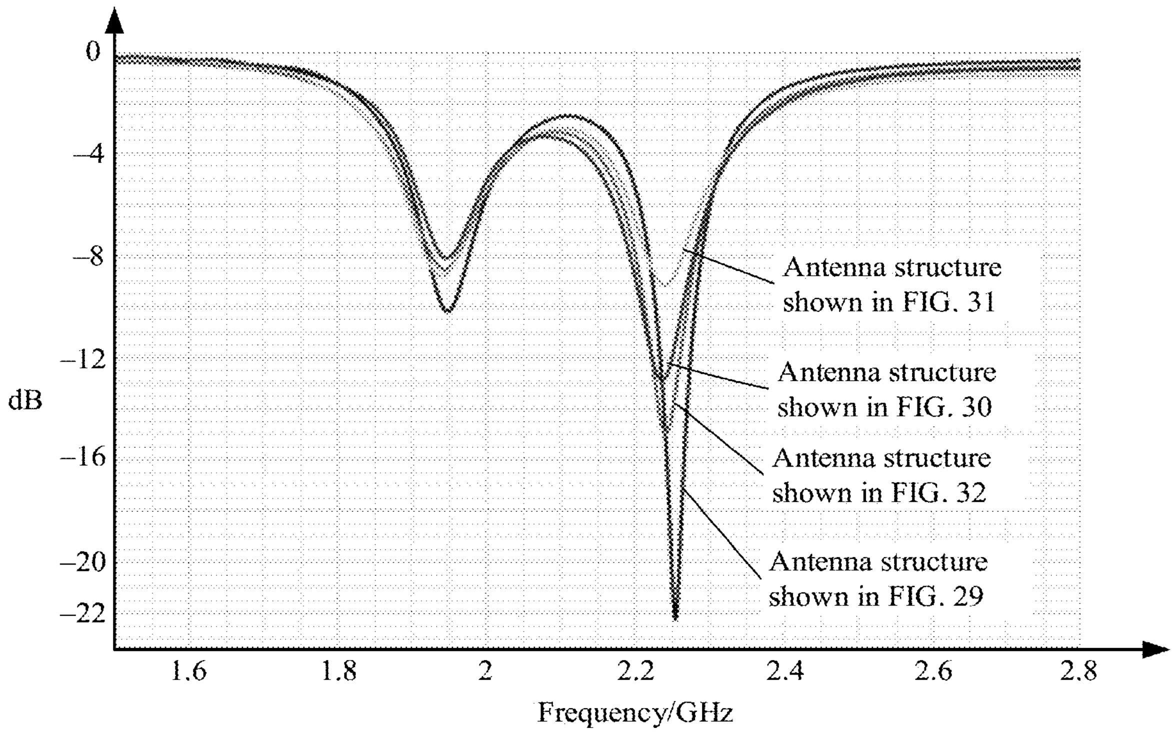
FIG. 33 is a diagram of S-parameters of the antenna structures shown in FIG. 29 to FIG. 32 according to an embodiment of this application.
Figure 34:
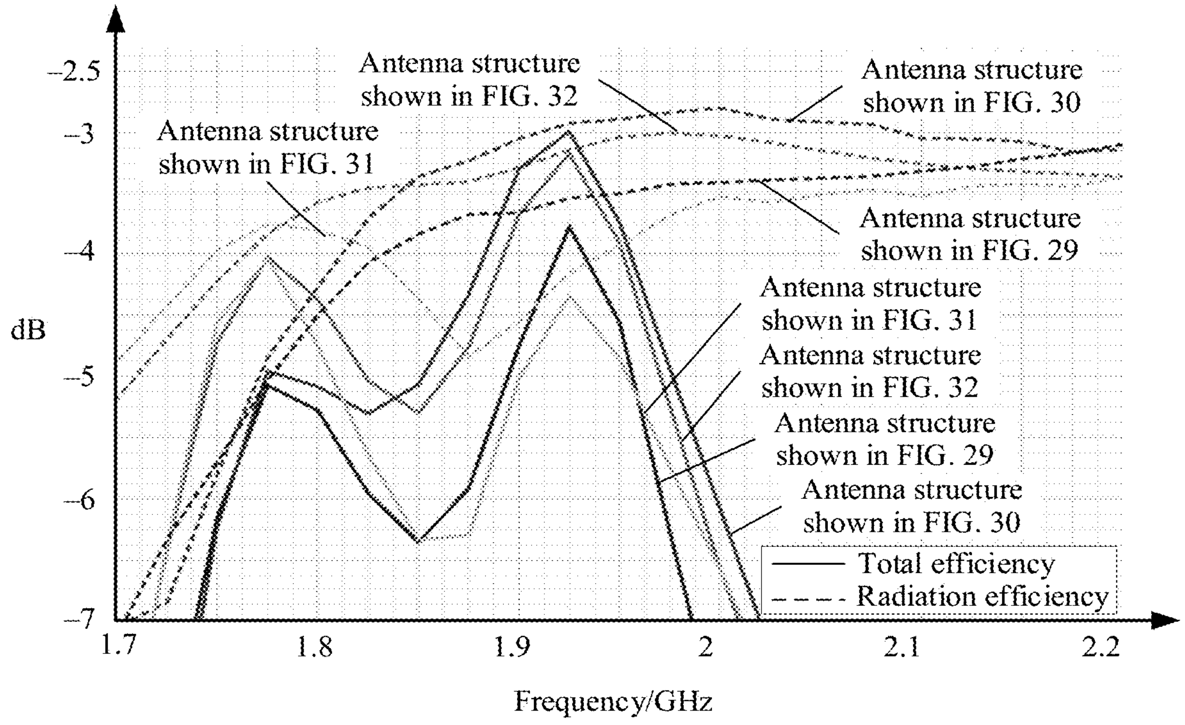
FIG. 34 is a diagram of simulation results of total efficiency and radiation efficiency of the antenna structures shown in FIG. 29 to FIG. 32 according to an embodiment of this application.

FIG. 33 and FIG. 34 are diagrams of simulation results of the antenna structures shown in FIG. 29 to FIG. 32. FIG. 33 is a diagram of S-parameters of the antenna structures shown in FIG. 29 to FIG. 32 according to an embodiment of this application. FIG. 34 is a diagram of simulation results of total efficiency and radiation efficiency of the antenna structures shown in FIG. 29 to FIG. 32 according to an embodiment of this application.

As shown in FIG. 33, S11<−4 dB is used as an example. The antenna structures shown in FIG. 29 to FIG. 32 operate in a CM mode and a DM mode, and operating frequency bands separately include 1.9 GHz to 2 GHz (CM mode) and 2.2 GHz to 2.3 GHz (DM mode). A bandwidth generated during resonance of the antenna structure shown in FIG. 32 is wider.

Figure 29:
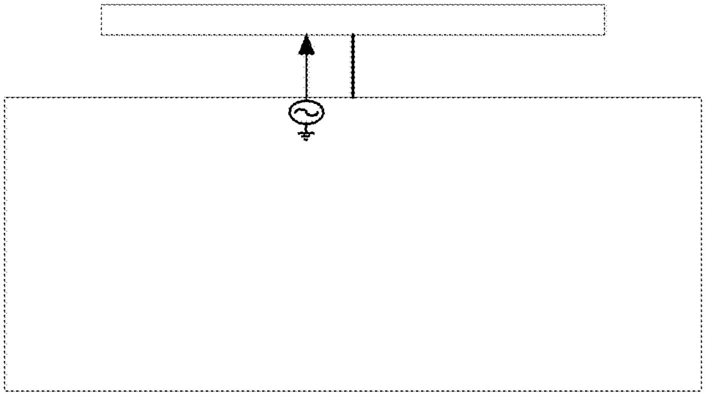
FIG. 29 is a diagram of an antenna structure according to an embodiment of this application.
Figure 31:
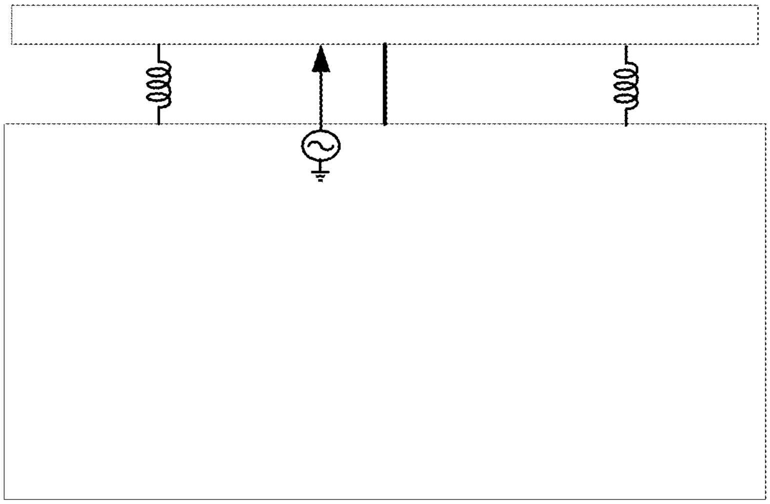
FIG. 31 is a diagram of an antenna structure according to an embodiment of this application.

As shown in FIG. 34, within the foregoing frequency band, compared with efficiency (total efficiency and radiation efficiency) of the antenna structure shown in FIG. 29, the antenna structure shown in FIG. 30 may improve the efficiency in the DM mode (2.2 GHz to 2.3 GHz), and the antenna structure shown in FIG. 31 may improve the efficiency in the CM mode (1.9 GHz to 2 GHz). Features of the antenna structure shown in FIG. 30 and the antenna structure shown in FIG. 31 are combined in the antenna structure shown in FIG. 32. The gaps disposed on the radiator and inductors disposed between the radiator and the ground plane are used, so that the efficiency of the antenna structure may be improved in both the DM mode (2.2 GHz to 2.3 GHz) and the CM mode (1.9 GHz to 2 GHz).

SAR values of the antenna structures shown in FIG. 29 to FIG. 32 are shown in Table 2. An example in which input power is 24 decibel-milliwatts (dbm) is used for description.

TABLE 2

| Antenna structure | FIG. 29 | | FIG. 30 | | FIG. 31 | | FIG. 32 | |
|---|---|---|---|---|---|---|---|---|
| Frequency (GHz) | 1.95 | 2.25 | 1.95 | 2.25 | 1.95 | 2.25 | 1.95 | 2.25 |
| Bottom (5 mm) 10 g normalization | 1.221 | 3.497 | 1.379 | 3.091 | 1.064 | 3.768 | 0.972 | 3.038 |
| Rear (5 mm) 10 g normalization | 1.118 | 3.935 | 1.276 | 3.319 | 1.052 | 3.635 | 0.993 | 3.222 |

As shown in Table 2, compared with the antenna structure shown in FIG. 29, the antenna structure shown in FIG. 30 has a better SAR value at 2.25 GHz (DM mode), and the antenna structure shown in FIG. 31 has a better SAR value at 1.95 GHz (CM mode). Features of the antenna structure shown in FIG. 30 and the antenna structure shown in FIG. 31 are combined in the antenna structure shown in FIG. 32. Therefore, the antenna structure shown in FIG. 32 has good SAR values at both 1.95 GHz (CM mode) and 2.25 GHz (DM mode).

Figure 35:
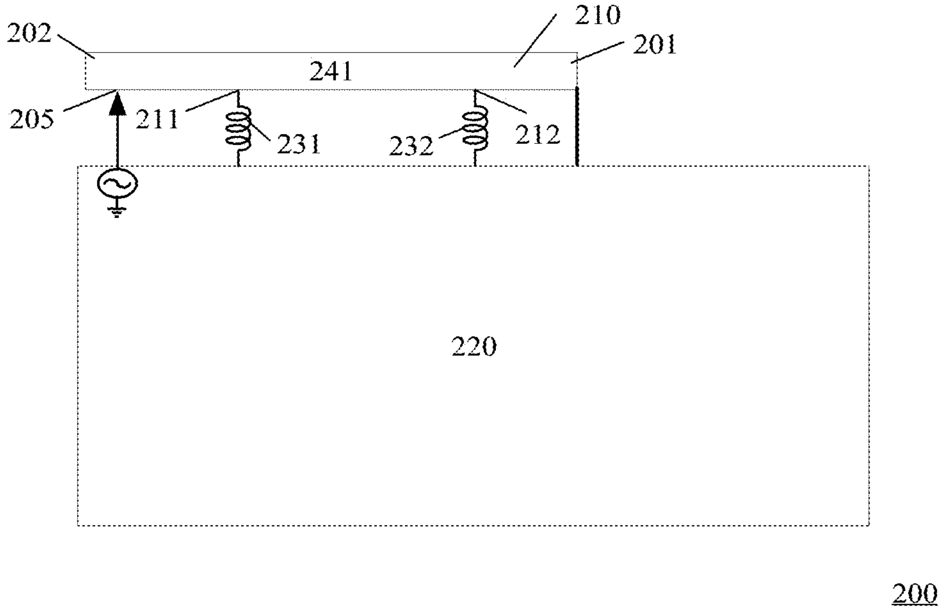
FIG. 35 is a diagram of an antenna structure 200 according to an embodiment of this application.

FIG. 35 is a diagram of an antenna structure 200 according to an embodiment of this application.

As shown in FIG. 35, the antenna structure 200 includes a radiator 210, a ground plane 220, a first inductor 231, and a feed point 205.

The radiator 210 includes a first part 241, and the first part 241 includes a first end 201, a second end 202 (the second end 202 is an open end, and the radiator 210 is not connected to another conductor at the second end 102), and a first connection point 211 located between the first end 201 and the second end 202. The radiator 210 is grounded at the first end 201 through the ground plane 220. The first inductor 231 is electrically connected between the first connection point 211 and the ground plane 220, and an inductance value of the first inductor 231 is less than a first threshold. A length of the first part 241 is greater than three-eighths of a first wavelength, the first part is configured to generate a first resonance, and the first wavelength is a medium wavelength of the first resonance. The first connection point 211 is disposed between the feed point 241 and the first end 201. A distance between the first connection point 211 and the second end 102 is less than or equal to a quarter of the first wavelength.

In one embodiment, the antenna structure 200 may include a second inductor 232. The second inductor 232 is electrically connected between a second connection point 212 and the ground plane 220, and the second connection point 212 is located between the first connection point 211 and the first end 201.

It should be understood that, the technical solutions provided in this embodiment of this application may be applied to an inverted-L antenna or an inverted-F antenna (the feed point 205 is close to the first end 201 (a ground end)). For brevity of descriptions, in this embodiment of this application, only an example in which the feed point 205 is close to the second end (the open end) and is used in a left-hand antenna is used for description. At least one inductor is disposed between the first part 241 and the ground plane 220, and a current on the first part 241 is reversed in an area near the first connection point 211, where a current reverse area includes the first connection point 211. Correspondingly, a current on the ground plane 220 is also reversed in an area near a connection between the first inductor 231 and the ground plane 220 and an area near a connection between the second inductor 232 and the ground plane 220. Current density on the radiator may be dispersed (strength of a single maximum current is reduced, so that the current is distributed evenly). Therefore, a loss caused by the radiator and a conductor disposed around the radiator is reduced, to further improve efficiency of the antenna structure. In addition, because the current on the first part 241 is reversed in the areas near the first connection point 211 and the second connection point 212, an electric field cannot reach zero at the first connection point 211 and the second connection point 212, and the electric field generated by the radiator is continuous, is not reversed (does not include an electric field reverse area), and does not have zero. This increases a radiation aperture of the antenna structure, reduces a conductor loss, and improves the efficiency of the antenna structure. In one embodiment, the electric field between the first part 241 of the radiator and the ground plane 220 is in a same direction.

In an embodiment, a length of the first part 241 is greater than half of the first wavelength, and a distance between the first connection point 211 and the second connection point 212 is less than half of the first wavelength, so that the current density on the radiator is dispersed, and the efficiency of the antenna structure is improved. In an embodiment, the distance between the first connection point 211 and the second connection point 212 may be less than a quarter of the first wavelength, so that the current density on the radiator is more dispersed, and the efficiency of the antenna structure is further improved.

Figure 36:
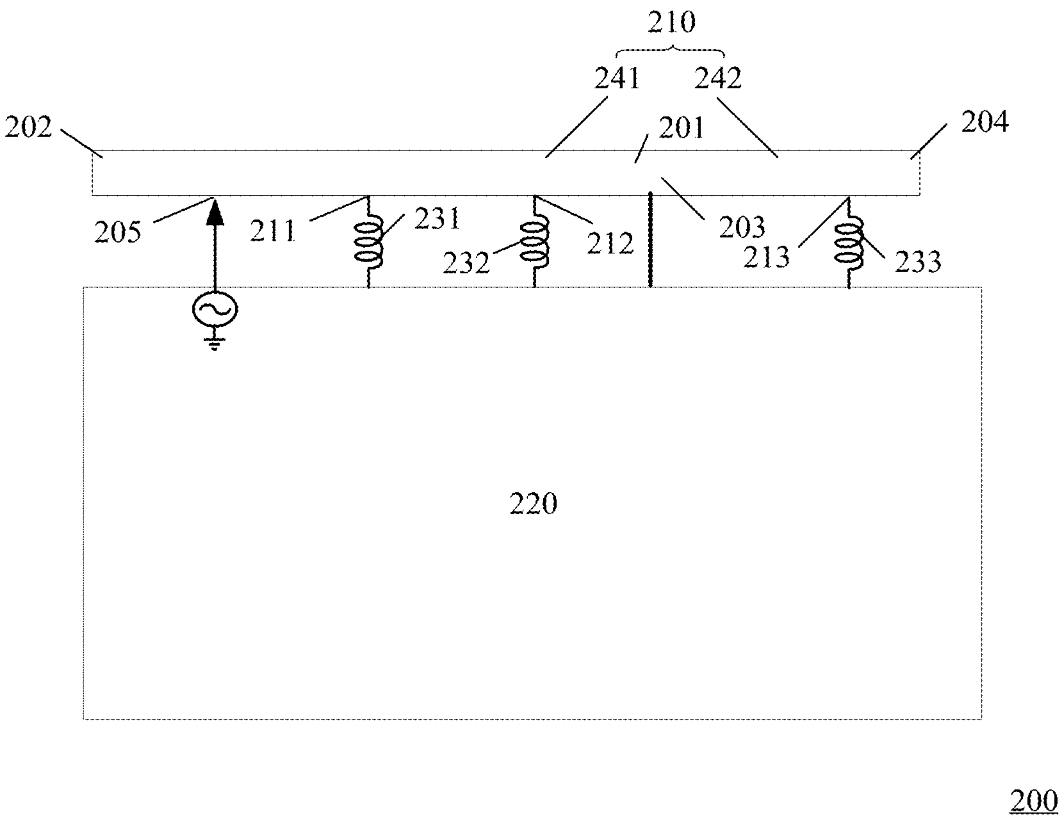
FIG. 36 is a diagram of another antenna structure 200 according to an embodiment of this application.

In one embodiment, the radiator 210 further includes a second part 242, as shown in FIG. 36. The second part 242 of the radiator 210 includes a third end 203, a fourth end 204, and a third connection point 213 located between the third end 203 and the fourth end 204. The first end 201 of the first part 241 is connected to the third end 203 of the second part 242 to form the continuous radiator 210 (where the radiator 210 is of an integrally formed structure, and the first part 241 of the radiator is continuous with the second part 242 at the ground position (the first end 201)). The antenna structure 200 further includes a third inductor 233, the third inductor 233 is electrically connected between the third connection point 213 and the ground plane 220, and an inductance value of the third inductor 233 is less than a second threshold. A length of the first part 241 is different from a length of the second part 242. The length of the second part 242 is greater than three eighths of a second wavelength, the second part is configured to generate a second resonance, and the second wavelength is a medium wavelength of the second resonance. A distance between the third connection point 213 and the fourth end 204 is less than or equal to a quarter of the second wavelength.

It should be understood that, the technical solutions provided in this embodiment of this application may be applied to an asymmetrical T-shaped antenna. The length of the first part 241 is different from the length of the second part 242 (for example, a difference between the length of the first part 241 and the length of the second part 242 is greater than 5 mm), so that the first part 241 and the second part 242 of the antenna structure 200 can separately operate in two different CM modes, and an operating frequency band of the antenna structure may be extended. In addition, an inductance value of the inductor disposed between the first part 241 and the ground plane 220 is determined based on the first resonance generated by the first part 241, and an inductance value of the inductor disposed between the second part 242 and the ground plane 220 is determined based on the second resonance generated by the second part 242.

In an embodiment, when a frequency of the first resonance is less than or equal to 1 GHz, the first threshold is 6 nH. When a frequency of the first resonance is greater than 1 GHz and less than or equal to 2.2 GHz, the first threshold is 4 nH. When a frequency of the first resonance is greater than 2.2 GHz and less than or equal to 3 GHz, the first threshold is 3 nH. When a frequency of the first resonance is greater than 3 GHz, the first threshold is 2 nH.

In an embodiment, when a frequency of the second resonance is less than or equal to 1 GHz, the second threshold is 6 nH. When a frequency of the second resonance is greater than 1 GHz and less than or equal to 2.2 GHz, the second threshold is 4 nH. When a frequency of the second resonance is greater than 2.2 GHz and less than or equal to 3 GHz, the second threshold is 3 nH. When a frequency of the second resonance is greater than 3 GHz, the second threshold is 2 nH.

It should be understood that, the inductance values of the first inductor 231, the second inductor 232, and the third inductor 233 are designed based on different operating frequency bands of the antenna structure, so that the current on the radiator is distributed more evenly in the operating frequency band, and the conductor loss is reduced, to further improve the efficiency of the antenna structure.

In an embodiment, the electronic device further includes a conductive frame, the frame has a first position, a second position, and a third position, and the first position is located between the second position and the third position. A frame between the first position and the second position may be used as the foregoing first part, and a frame between the first position and the third position may be used as the foregoing second part. It should be understood that, the first position may correspond to the first end, the second position may correspond to the second end, and the third position may correspond to the third end.

In an embodiment, gaps may be disposed at the third position and the second position on the frame, so that the third position and the second position are not connected to another part of the frame, and ends of the radiator at the third position and the second position are open ends.

For the antenna structures 200 shown in FIG. 35 and FIG. 36, the technical solutions shown in FIG. 10 may also be used. For example, at least one fourth inductor is disposed between a ground point and the first inductor 231, so that the current density distribution on the radiator is more evenly, to reduce the loss caused by the radiator and a medium disposed around the radiator. In addition, each position at which the radiator is connected to the inductor includes a current reverse area, so that the electric field cannot reach zero, and the electric field generated by the radiator is continuous and is not reversed (does not include an electric field reverse area). This increases the radiation aperture of the antenna structure, reduces the conductor loss, and improves the efficiency of the antenna structure.

It should be understood that, in the foregoing embodiment, an example in which two or three inductors are disposed between the radiator and the ground plane 220 is used for description. In the technical solutions provided in this embodiment of this application, three or more inductors may be disposed between the radiator and the ground plane 220, so that current density distribution on the radiator is more evenly, to reduce a loss caused by the radiator and a medium/conductor disposed around the radiator.

It should be understood that, in the foregoing embodiment, an example in which only two gaps are disposed on the radiator is used for description. In the technical solutions provided in this embodiment of this application, more than two gaps, for example, three or six gaps, may also be disposed on the radiator. For positions of the gaps (or capacitors) and the inductor, refer to the foregoing embodiment.

In an embodiment, more than two inductors may be disposed between the radiator and the ground plane shown in FIG. 36. Further, in an embodiment, more than two gaps may be further disposed on the radiator.

In an embodiment, a ground point directly electrically connected to the ground plane 220 may be disposed on the radiator of the T-shaped antenna, for example, the first end 201 of the first part 241 and/or the third end 203 of the second part 242 shown in FIG. 36. In one embodiment, the first end 201 of the first part 241 and the third end 203 of the second part 242 may be implemented by a same ground member (for example, a conductor extending inside the frame or coupled to the frame). In an embodiment, the ground point directly electrically connected to the ground plane 220 may not be disposed on the radiator of the T-shaped antenna. For example, the first end 201 of the first part 241 and/or the third end 203 of the second part 242 shown in FIG. 36 may be grounded by using the inductors. In an embodiment, the first end 201 of the first part 241 and the third end 203 of the second part 242 are grounded by using a same inductor.

It should be understood that, in the foregoing embodiment, an example in which the antenna structure is a symmetrical T-shaped antenna, an asymmetrical T-shaped antenna, and an inverted F-shaped antenna is used for description, and the technical solutions provided in embodiments of this application may also be applied to another type of wire antenna. For brevity of descriptions, in this embodiment of this application, only the three types of wire antennas are used as examples for description, and a type of the wire antenna is not limited.

FIG. 37 to FIG. 40 are diagrams of a group of antenna structures according to an embodiment of this application.

FIG. 37 to FIG. 40 are diagrams of different structures of an inverted L-shaped antenna. A difference between the antenna structure shown in FIG. 38 and the antenna structure shown in FIG. 37 lies in that a gap is disposed on the radiator. It should be understood that, a capacitor component connected in series in the gap shown in the figure is merely an example. In actual application, the gap may be filled with a medium, and a capacitance value of a capacitor equivalent to the gap is adjusted by using a parameter such as a dielectric constant of the medium or a width of the gap. In one embodiment, the width of the gap may be between 0.1 mm and 2 mm. A difference between the antenna structure shown in FIG. 39 and the antenna structure shown in FIG. 37 lies in that an inductor is electrically connected between the radiator and the ground plane. A difference between the antenna structure shown in FIG. 40 and the antenna structure shown in FIG. 37 lies in that a gap is disposed on the radiator, and an inductor is disposed between the radiator and the ground plane.

It should be understood that, to ensure that the antenna structures shown in FIG. 37 to FIG. 40 operate in a same frequency band (for example, near 1.85 GHz), a length of the radiator in the antenna structures is adjusted. In the antenna structure shown in FIG. 37, the length of the radiator is 18.4 mm, and a capacitor of 0.5 pF is connected in series at a feed point. In the antenna structure shown in FIG. 38, the length of the radiator is 33.4 mm, a capacitance value of a capacitor disposed in a gap (or a capacitance value equivalent to a gap) is 0.65 pF, and a capacitor of 1 pF is connected in series at a feed point. In the antenna structure shown in FIG. 39, the length of the radiator is 33.4 mm, an inductance value of an inductor connected in series between the radiator and the ground plane is 1.7 nH, and a capacitor of 0.5 pF is connected in series at a feed point. In the antenna structure shown in FIG. 40, the length of the radiator is 33.4 mm, a capacitance value of a capacitor disposed in a gap (or a capacitance value equivalent to a gap) is 1.1 pF, an inductance value of an inductor connected in series between the radiator and the ground plane is 3 nH, and a capacitor of 0.6 pF is connected in series at a feed point.

Figure 39:
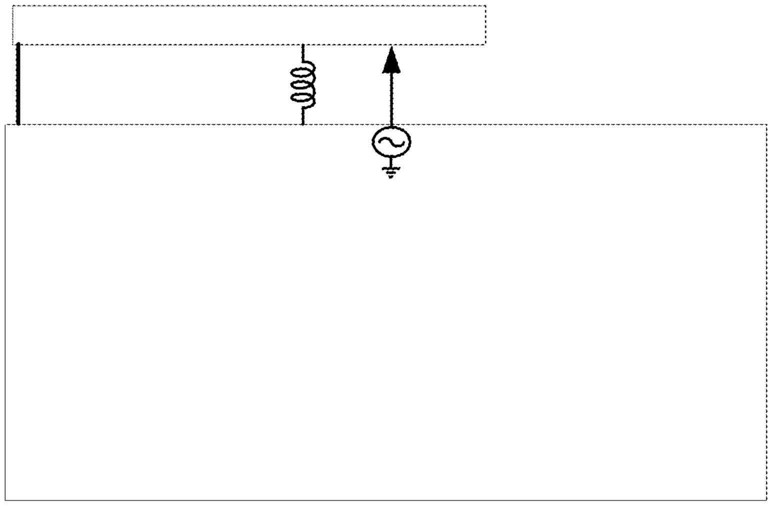
FIG. 39 is a diagram of an antenna structure according to an embodiment of this application.
Figure 40:
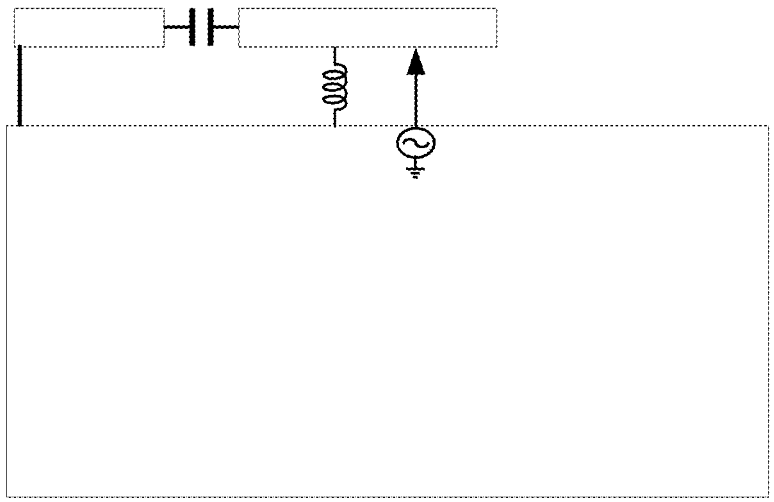
FIG. 40 is a diagram of an antenna structure according to an embodiment of this application.
Figure 41:
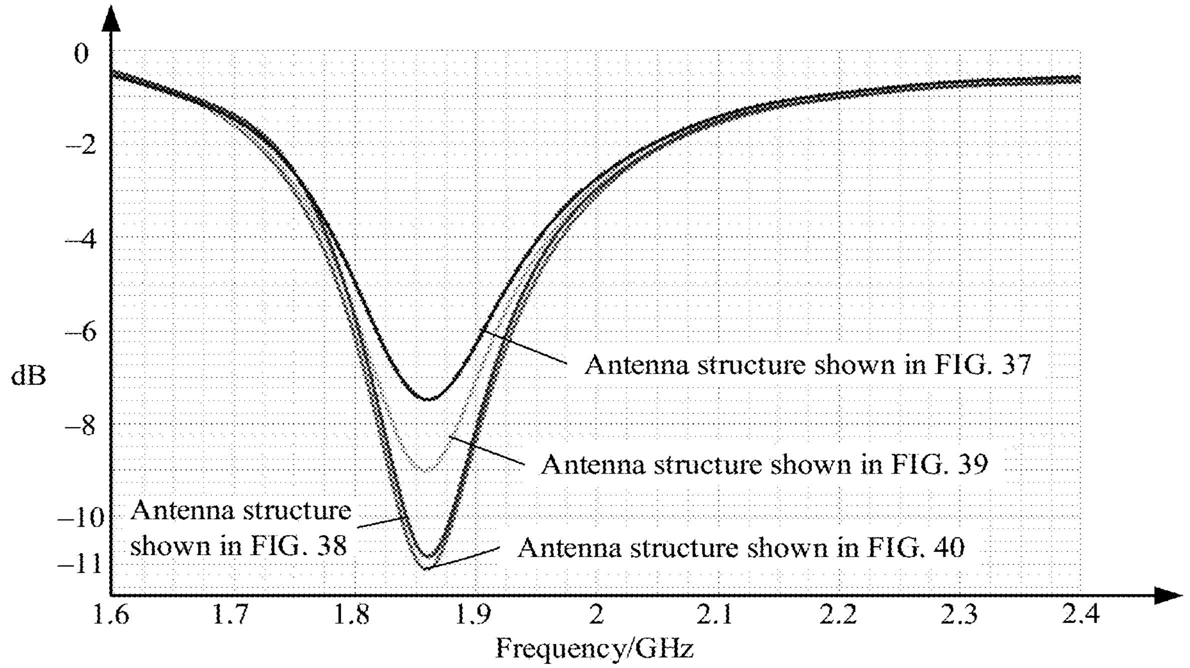
FIG. 41 is a diagram of S-parameters of the antenna structures shown in FIG. 37 to FIG. 40 according to an embodiment of this application.
Figure 42:
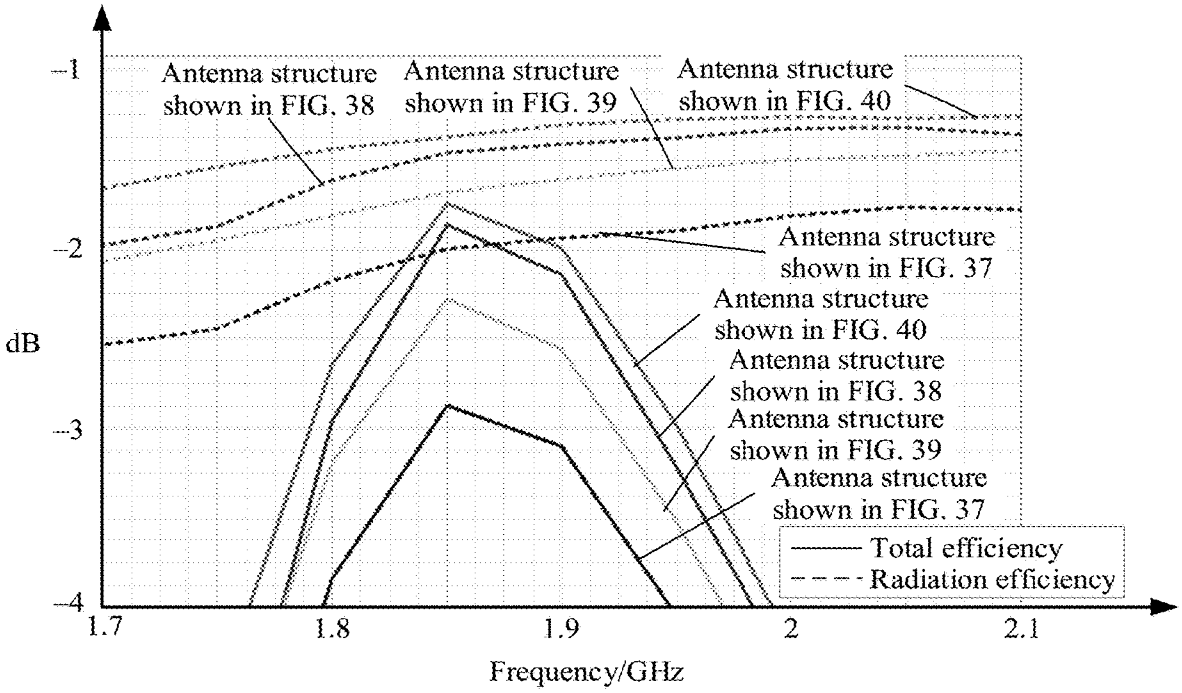
FIG. 42 is a diagram of simulation results of total efficiency and radiation efficiency of the antenna structures shown in FIG. 37 to FIG. 40 according to an embodiment of this application.

FIG. 41 and FIG. 42 are diagrams of simulation results of the antenna structures shown in FIG. 37 to FIG. 40. FIG. 41 is a diagram of S-parameters of the antenna structures shown in FIG. 37 to FIG. 40 according to an embodiment of this application. FIG. 42 is a diagram of simulation results of total efficiency and radiation efficiency of the antenna structures shown in FIG. 37 to FIG. 40 according to an embodiment of this application.

As shown in FIG. 41, S11<−4 dB is used as an example. The antenna structures shown in FIG. 37 to FIG. 40 operate in a CM mode, and operating frequency bands are all near 1.85 GHz. A bandwidth generated during resonance of the antenna structure shown in FIG. 40 is wider.

Figure 37:
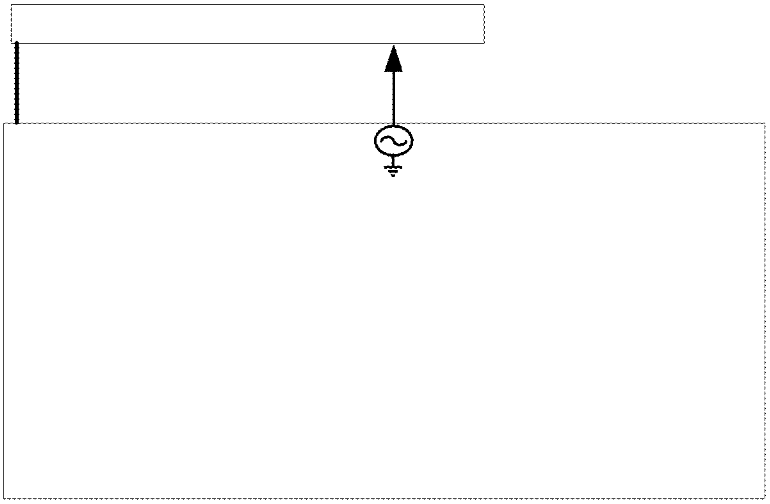
FIG. 37 is a diagram of an antenna structure according to an embodiment of this application.
Figure 38:
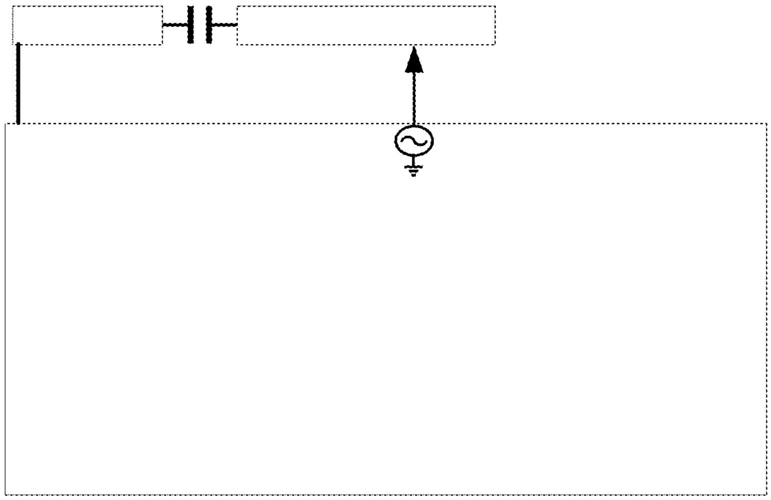
FIG. 38 is a diagram of an antenna structure according to an embodiment of this application.

As shown in FIG. 42, within the foregoing frequency band, the efficiency (total efficiency and radiation efficiency) of the antenna structures shown in FIG. 38 to FIG. 40 are improved compared with that of the antenna structure shown in FIG. 37. In the antenna structure shown in FIG. 40, because the inductors electrically connected between the radiator and the ground plane are added, and the gap is disposed on the radiator (or the capacitor is connected in series through the gap), total efficiency and radiation efficiency of the antenna structure are most significantly improved compared with those of the antenna structure shown in FIG. 37. At 1.85 Hz, the total efficiency is improved by about 1 dB, and the radiation efficiency is improved by about 0.6 dB.

FIG. 43A to FIG. 45B are respectively diagrams of distribution of a current and an electric field of the antenna structures shown in FIG. 38 to FIG. 40.

Figure 43A:
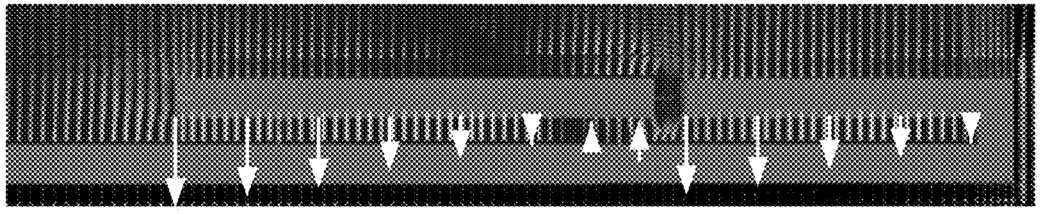
FIGS. 43A-43B are diagrams of distribution of a current and an electric field of the antenna structure shown in FIG. 38.

As shown in FIG. 43A, when the antenna structure generates resonance, because a gap is disposed on the radiator (or a capacitor is disposed in the gap), an electric field is reversed in an area near the position, so that the electric field cannot reach zero at the position. Distribution of the electric field in a standing wave form under a non-natural boundary is formed, so that the electric field is weakened, and a dielectric loss of the antenna structure is reduced, to improve the efficiency of the antenna structure.

Figure 43B:
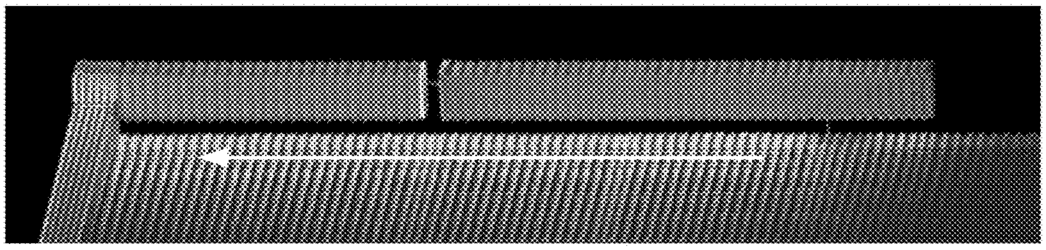

As shown in FIG. 43B, when the antenna structure generates resonance, a current does not change (a current close to a ground end is strong) and is still distributed corresponding to a quarter mode, current density does not change greatly, and a conductor loss is only slightly reduced.

Figure 44A:
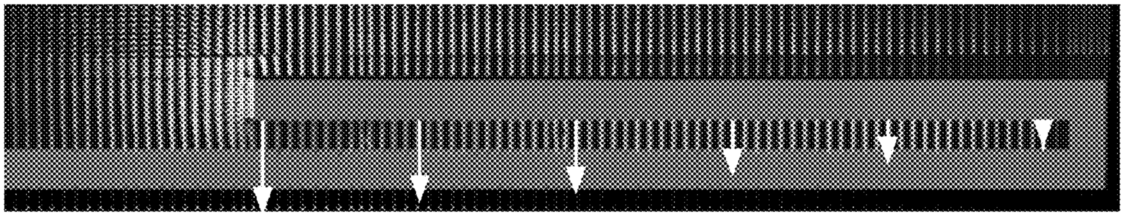
FIGS. 44A-44B are diagrams of distribution of a current and an electric field of the antenna structure shown in FIG. 39.

As shown in FIG. 44A, when the antenna structure generates resonance, an electric field does not change and is still distributed corresponding to a quarter mode, the electric field is not dispersed, and a dielectric loss does not change.

Figure 44B:
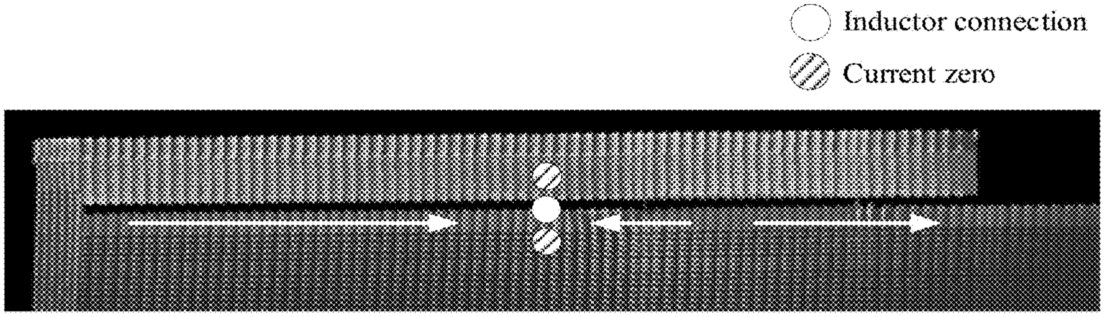

As shown in FIG. 44B, when the antenna structure generates resonance, because an inductor is disposed between the radiator and the ground plane, a current on the radiator is reversed in an area near a connection point, so that the electric field generated by the radiator is continuous and is not reversed (does not include an electric field reverse area), and does not have zero. This increases a radiation aperture of the antenna structure, reduces a conductor loss, and improves the efficiency of the antenna structure.

Figure 45A:
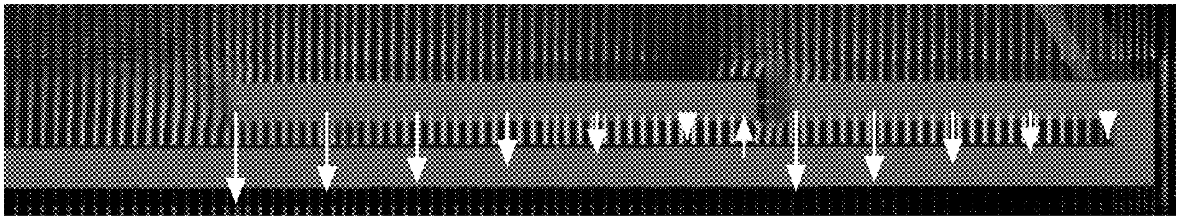
FIGS. 45A-45B are diagrams of distribution of a current and an electric field of the antenna structure shown in FIG. 40.
Figure 45B:
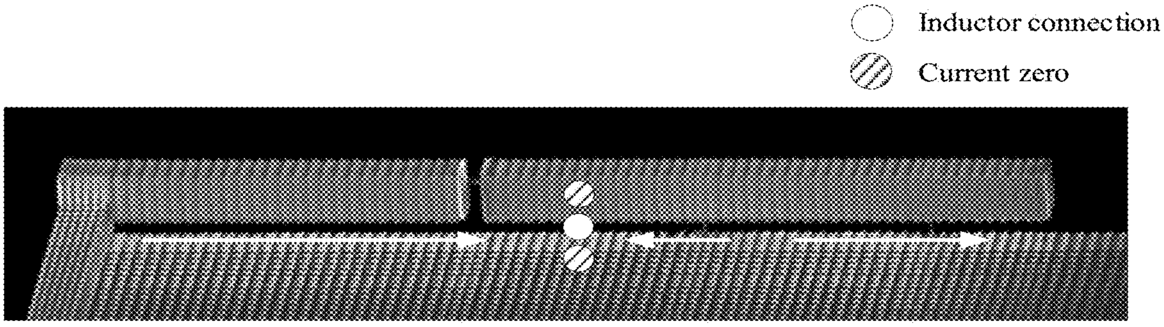

Because the antenna structure shown in FIG. 40 has features of the antenna structures shown in FIG. 38 and FIG. 39, the electric field and the current generated by the antenna structure change compared with those in the distribution corresponding to the quarter mode, as shown in FIGS. 45A-45B. Therefore, the conductor loss and the dielectric loss may be better reduced.

The conductor loss and the dielectric loss of the antenna structures shown in FIG. 37 to FIG. 40 are shown in Table 3.

TABLE 3

| | Radiation efficiency | Conductor loss (%) | | Dielectric loss (%) | |
|---|---|---|---|---|---|
| | (%) | PCB | AL | CG | ABS |
| Antenna structure shown in FIG. 37 | 63 | 2 | 13 | 5 | 17 |
| Antenna structure shown in FIG. 38 | 71 | 2 | 11 | 5 | 10 |
| Antenna structure shown in FIG. 39 | 68 | 1 | 9 | 5 | 17 |
| Antenna structure shown in FIG. 40 | 73 | 1 | 9 | 4 | 12 |

Figure 46:
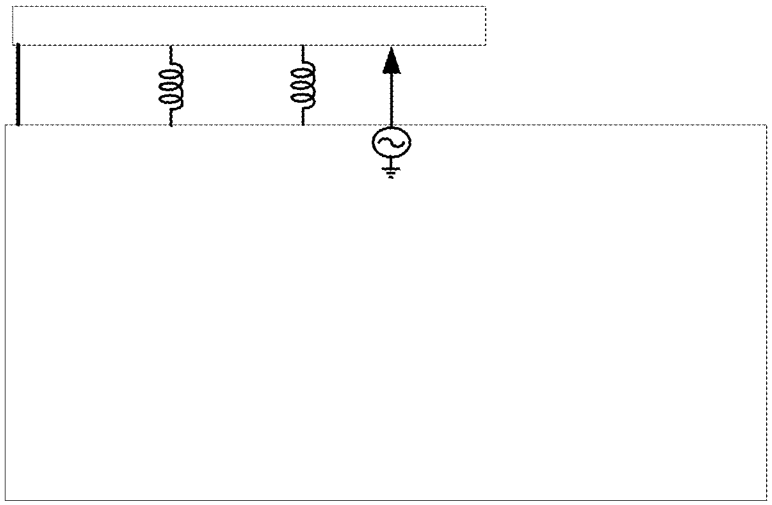
FIG. 46 is a diagram of another antenna structure according to an embodiment of this application.
Figure 47:
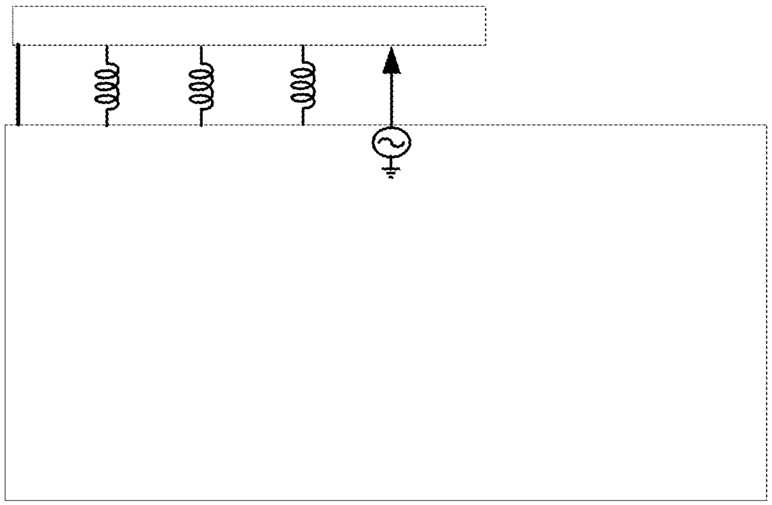
FIG. 47 is a diagram of another antenna structure according to an embodiment of this application.

FIG. 46 and FIG. 47 are diagrams of another antenna structure according to an embodiment of this application.

A difference between the antenna structures shown in FIG. 46 and FIG. 47 and the antenna structures shown in FIG. 37 and FIG. 39 lies in that a quantity of inductors electrically connected between a radiator and a ground plane is different.

To ensure that the antenna structures shown in FIG. 37, FIG. 39, FIG. 46, and FIG. 47 operate in a same frequency band, a length of the radiator in the antenna structures is adjusted. In the antenna structure shown in FIG. 37, the length of the radiator is 18.4 mm. In the antenna structure shown in FIG. 39, the length of the radiator is 33.4 mm, and an inductance value of an inductor connected in series is 1.5 nH. In the antenna structure shown in FIG. 46, the length of the radiator is 43.4 mm. In two inductors connected in series, an inductance value of an inductor close to a ground end (the first end) is 3 nH, and an inductance value of an inductor away from the ground end (the first end) is 3.5 nH. In the antenna structure shown in FIG. 47, the length of the radiator is 53.4 mm. In three inductors connected in series, inductance values of the inductors are 3 nH, 3 nH, and 3.8 nH in sequence from a ground end (the first end) to a feed point direction.

Figure 48:
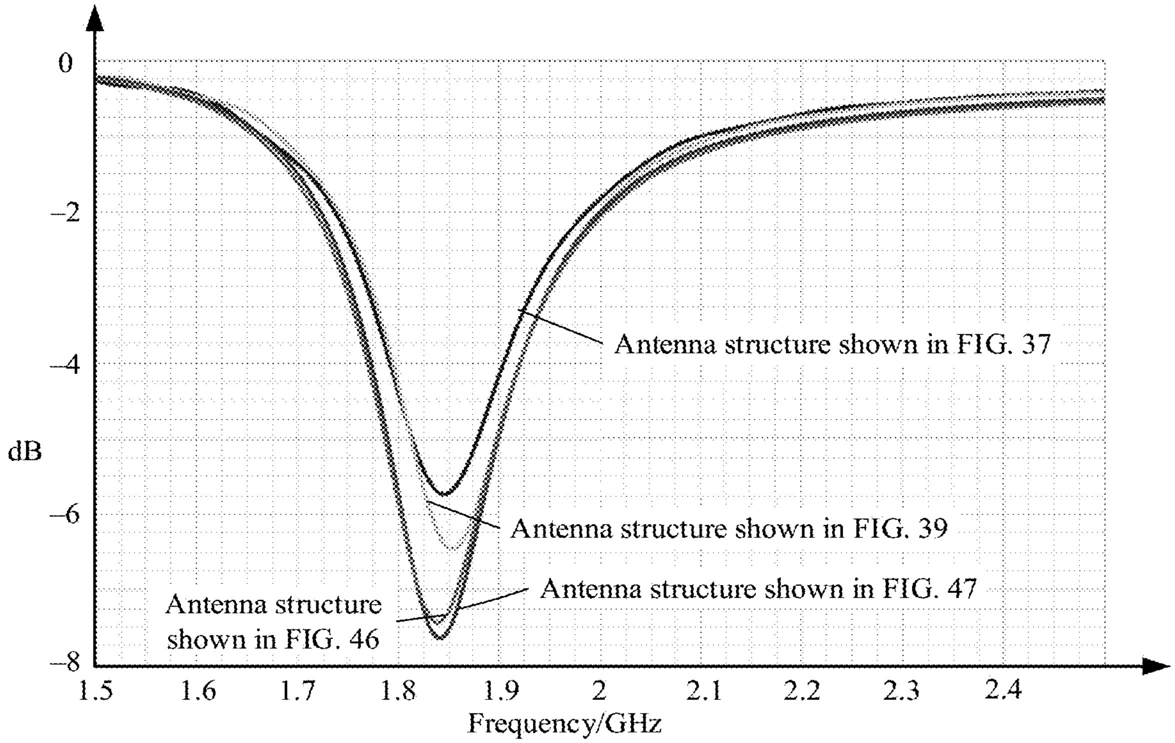
FIG. 48 is a diagram of S-parameters of the antenna structures shown in FIG. 37, FIG. 39, FIG. 46, and FIG. 47 according to an embodiment of this application.
Figure 49:
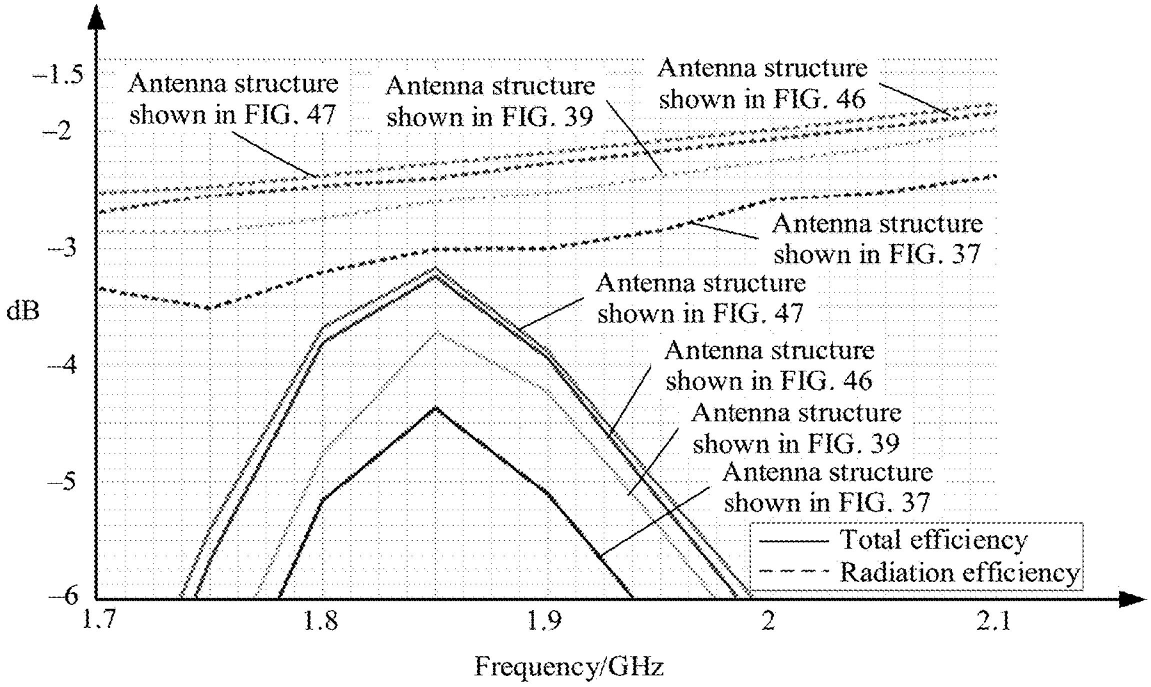
FIG. 49 is a diagram of simulation results of total efficiency and radiation efficiency of the antenna structures shown in FIG. 37, FIG. 39, FIG. 46, and FIG. 47 according to an embodiment of this application.
Figure 50:
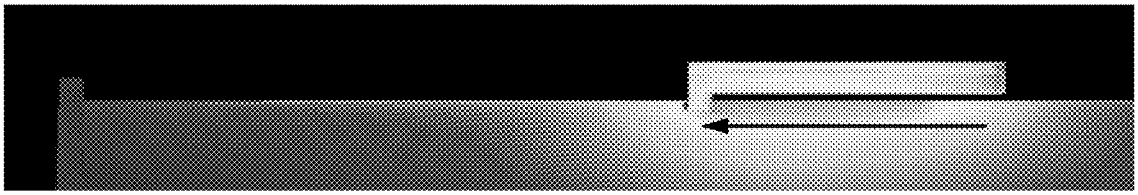
FIG. 50 is a diagram of current distribution of the antenna structure shown in FIG. 37.
Figure 51:
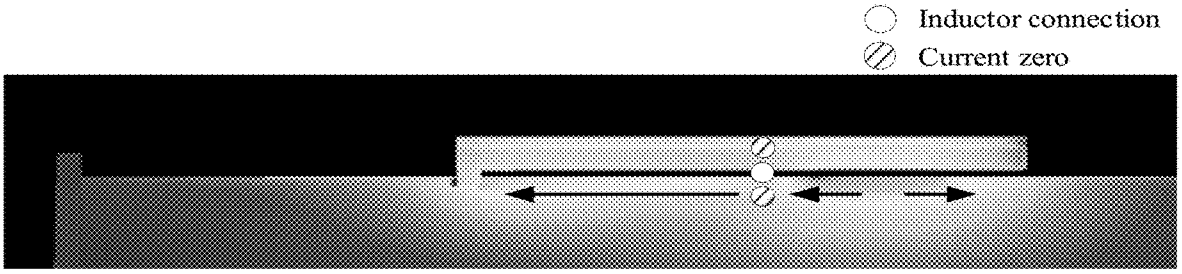
FIG. 51 is a diagram of current distribution of the antenna structure shown in FIG. 39.
Figure 52:
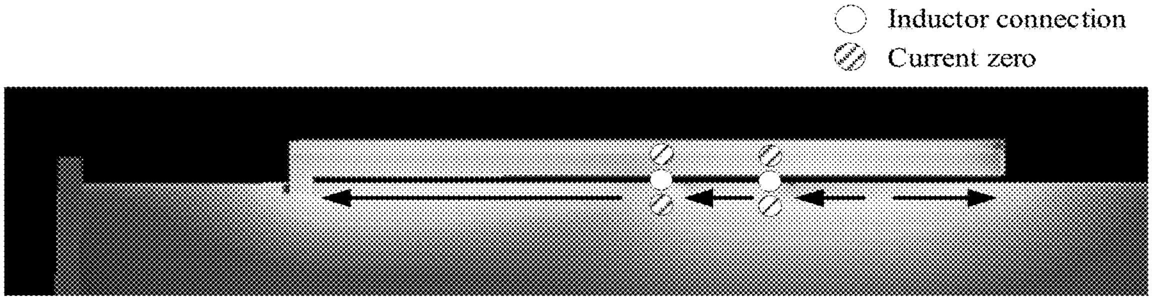
FIG. 52 is a diagram of current distribution of the antenna structure shown in FIG. 46.
Figure 53:
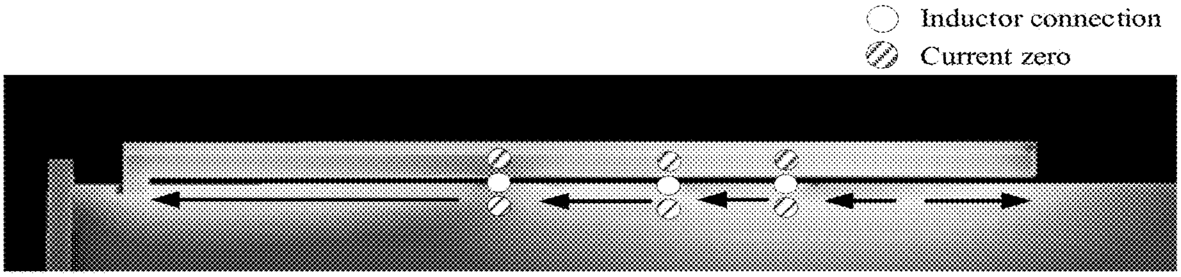
FIG. 53 is a diagram of current distribution of the antenna structure shown in FIG. 47.

FIG. 48 to FIG. 53 are diagrams of simulation results of the antenna structures shown in FIG. 37, FIG. 39, FIG. 46, and FIG. 47. FIG. 48 is a diagram of S-parameters of the antenna structures shown in FIG. 37, FIG. 39, FIG. 46, and FIG. 47 according to an embodiment of this application. FIG. 49 is a diagram of simulation results of total efficiency and radiation efficiency of the antenna structures shown in FIG. 37, FIG. 39, FIG. 46, and FIG. 47 according to an embodiment of this application. FIG. 50 is a diagram of current distribution of the antenna structure shown in FIG. 37. FIG. 51 is a diagram of current distribution of the antenna structure shown in FIG. 39. FIG. 52 is a diagram of current distribution of the antenna structure shown in FIG. 46. FIG. 53 is a diagram of current distribution of the antenna structure shown in FIG. 47.

As shown in FIG. 48, S11<−4 dB is used as an example. A resonance frequency band of the antenna structures shown in FIG. 37, FIG. 39, FIG. 46, and FIG. 47 is near 1.85 GHz. With an increase in a quantity of inductors disposed between the radiator and the ground plane, resonance bandwidths of the antenna structures are gradually broadened.

As shown in FIG. 49, with an increase in a quantity of inductors disposed between the radiator and the ground plane, the radiation efficiency and the total efficiency of the antenna structures are significantly increased.

As shown in FIG. 50 to FIG. 53, with an increase in a quantity of inductors disposed between the radiator and the ground plane, when the antenna structure generates radiation, the current is distributed more evenly.

It should be understood that, because of the inductors disposed between the radiator and the ground plane, the length of the radiator of the antenna structure is extended from 18.4 mm (the antenna structure shown in FIGS. 37) to 53.4 mm (the antenna structure shown in FIG. 47), so that a radiation aperture is increased, and a conductor loss may be reduced, as shown in Table 4.

TABLE 4

| | Radiation efficiency | Conductor loss (%) | | Dielectric loss (%) | |
|---|---|---|---|---|---|
| | (%) | PCB | AL | CG | ABS |
| Antenna structure shown in FIG. 37 | 50 | 2 | 17 | 7 | 24 |
| Antenna structure shown in FIG. 39 | 55 | 1 | 13 | 7 | 24 |
| Antenna structure shown in FIG. 46 | 58 | 1 | 8 | 7 | 26 |
| Antenna structure shown in FIG. 47 | 59 | 1 | 8 | 7 | 25 |

As shown in Table 4, the inductors disposed between the radiator and the ground plane may reduce the conductor loss, but the dielectric loss is not obviously reduced.

Figure 54:
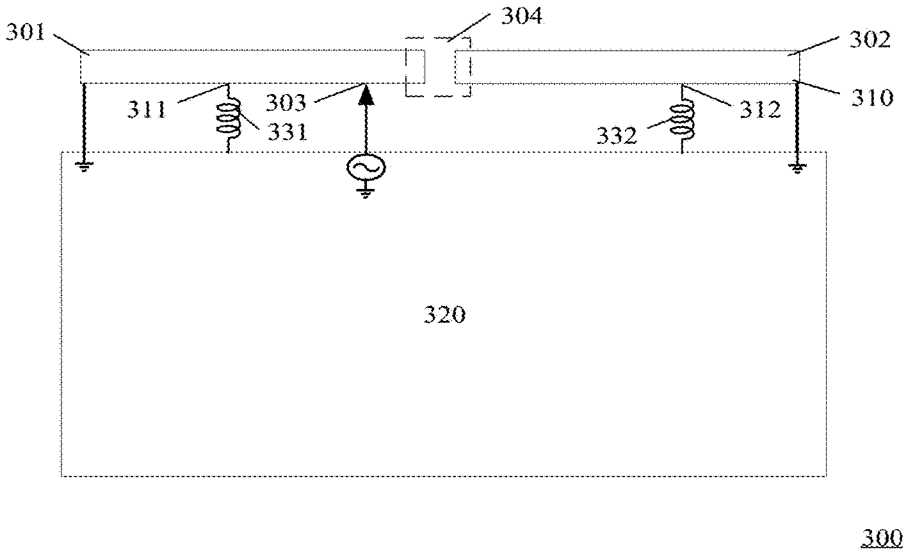
FIG. 54 is a diagram of an antenna structure 300 according to an embodiment of this application.

FIG. 54 is a diagram of an antenna structure 300 according to an embodiment of this application.

As shown in FIG. 54, the antenna structure 300 may include a radiator 310, a ground plane 320, a first inductor 331, and a second inductor 332.

The radiator 310 includes a first end 301, a second end 302, and a first connection point 311 and a second connection point 312 that are located between the first end 301 and the second end 302. The radiator 310 is grounded at the first end 301 and the second end 302 through the ground plane 320. Inductance values of the first inductor 331 and the second inductor 332 are both less than a first threshold. A length of the radiator 310 is greater than three quarters of a first wavelength, a part of the radiator from the first end 301 to the second end 302 is configured to generate a first resonance, and the first wavelength is a medium wavelength of the first resonance. The first inductor 331 is electrically connected between the first connection point 311 and the ground plane 320, and the second inductor 332 is electrically connected between the second connection point 312 and the ground plane 320. A distance between the first connection point 311 and a center of the radiator 310 is less than one-eighth of the first wavelength, and the second connection point 312 is located between the first connection point 311 and the second end 302.

It should be understood that, the center of the radiator 310 may be understood as a midpoint of a physical length of the radiator 310, or may be understood as a midpoint of an electrical length of the radiator 310. When a gap is disposed in a central area of the radiator 210, the center of the radiator 310 may also be understood as a midpoint of a physical length that falls on the gap.

In an embodiment, the radiator 310 may further include a feed point 303. The feed point 303 is configured to feed an electrical signal to the antenna structure 300, so that the antenna structure 300 generates radiation.

It should be understood that, in the technical solutions provided in this embodiment of this application, the inductors electrically connected between the radiator and the ground plane may be used, so that when the electrical signal is fed at the feed point, because the first inductor 331 and the second inductor 332 are electrically connected between the radiator 310 and the ground plane 320 at the first connection point 311 and the second connection point 312 respectively, a current on the radiator 320 is reversed in areas near the first connection point 311 and the second connection point 312. In one embodiment, a current reverse area includes the first connection point 311 and the second connection point 312. Correspondingly, a current on the ground plane 320 is also reversed at a connection between the first inductor 331 and the ground plane 320 and a connection between the second inductor 332 and the ground plane 320. In one embodiment, a current reverse area on the ground plane includes the connection between the first inductor 331 and the ground plane 320 and the connection between the second inductor 332 and the ground plane 320. Current density on the radiator may be dispersed (strength of a single maximum current is reduced, so that the current is distributed more evenly). Therefore, a loss caused by the radiator and a medium disposed around the radiator is reduced, to further improve the efficiency of the antenna structure.

In addition, because the current on the radiator 320 is reversed in the areas near the first connection point 311 and the second connection point 312, the electric field cannot reach zero at the first connection point 311 and the second connection point 312, and the electric field generated by the radiator is continuous and is not reversed (does not include an electric field reverse area) and does not have zero. This increases a radiation aperture of the antenna structure, reduces the conductor loss, and improves the efficiency of the antenna structure. In an embodiment, an electric field is in a same direction between the radiator 320 between the first end 301 and the second end 302 and the ground plane 320.

In one embodiment, the feed point 303 is located between the center of the radiator 310 and the first end 301 or between the center of the radiator 310 and the second end 302. An electrical signal may be fed into the antenna structure 300 in an offset feed manner, so that the antenna structure 300 may operate in both a CM mode and a DM mode, to extend an operating frequency band of the antenna structure 300.

It should be understood that, in this embodiment of this application, for brevity of descriptions, descriptions are provided only in an offset feed manner. In actual application, the DM mode and the CM mode of the antenna structure may be excited by using central symmetrical feed or central anti-symmetrical feed. This is not limited in this application, and may be adjusted based on an internal layout of the electronic device. The following embodiments may also be correspondingly understood.

In an embodiment, inductance values of the first inductor 331 and the second inductor 332 may be adjusted based on a resonance frequency generated by the antenna structure 300. When a frequency of the first resonance is less than or equal to 1 GHz, the first threshold is 6 nH. When a frequency of the first resonance is greater than 1 GHz and less than or equal to 2.2 GHz, the first threshold is 4 nH. When a frequency of the first resonance is greater than 2.2 GHz and less than or equal to 3 GHz, the first threshold is 3 nH. When a frequency of the first resonance is greater than 3 GHz, the first threshold is 2 nH.

It should be understood that, the inductance values of the first inductor 331 and the second inductor 332 are designed based on different operating frequency bands of the antenna structure, so that the current on the radiator is distributed more evenly in the operating frequency band, and a conductor loss is reduced, to further improve the efficiency of the antenna structure.

In an embodiment, the electronic device further includes a conductive frame, the frame has a first position and a second position, and a frame between the first position and the second position is used as the radiator 310. The frame at the first position and the second position is continuous with a remaining part of the frame, and no insulation gap is disposed on the frame at the first position and the second position.

In an embodiment, the first connection point 311 and the second connection point 312 are respectively disposed on both sides of the center of the radiator 310. The first connection point 311 is located between the first end 301 and the center of the radiator 310, and the second connection point 312 is located between the second end 302 and the center of the radiator 310. A distance between the second connection point 312 and the center of the radiator 310 is less than one-eighth of the first wavelength.

It should be understood that, inductors are electrically connected to both sides of the center of the radiator 310, so that the current on the radiator 310 on both sides of the center of the radiator 310 is affected by ground inductors, and the current on the radiator 310 is distributed more evenly. In addition, the electric field generated by the radiator 310 on both sides of the center may not include an electric field reverse area. This increases a radiation aperture of the antenna structure, reduces a conductor loss, and improves the efficiency of the antenna structure.

In an embodiment, the antenna structure 300 may further include at least one third inductor, electrically connected between at least one corresponding third connection point and the ground plane 320. The at least one third inductor and the at least one third connection point may be in one-to-one correspondence, and the at least one third connection point is located between the first end 301 and the first connection point 311 of the radiator 310.

In an embodiment, the antenna structure 100 may further include at least one fourth inductor, electrically connected between at least one corresponding fourth connection point and the ground plane 320. The at least one fourth inductor and the at least one fourth connection point may be in one-to-one correspondence, and the at least one fourth connection point is located between the second end 302 and the second connection point 312 of the radiator 310.

It should be understood that, a quantity of inductors disposed between the radiator 310 and the ground plane 320 is increased, so that current density distribution on the radiator is more evenly, to further reduce the loss caused by the radiator and the conductor disposed around the radiator. In addition, each position at which the radiator is connected to the inductor includes a current reverse area, so that the electric field cannot reach zero, and the electric field generated by the radiator is continuous and is not reversed (does not include an electric field reverse area). This increases the radiation aperture of the antenna structure, reduces the conductor loss, and improves the efficiency of the antenna structure.

In an embodiment, one or more gaps 304 may be disposed on the radiator 310. For positions of the gaps (or capacitors), refer to the foregoing embodiment. A gap structure disposed on the radiator 310 may be equivalent to a capacitor, so that the radiator 310 is equivalent to a metamaterial structure in which the capacitor is connected in series. It should be understood that, the inductor is disposed between the radiator 310 and the ground plane 320, to improve the efficiency of the antenna structure 300 in the DM mode, and the gap is disposed on the radiator 310, to improve the efficiency of the antenna structure 300 in the CM mode. In addition, the center of the radiator 310 may fall outside the radiator. For example, when lengths of the radiator 310 on both sides of the gap 304 are the same or roughly the same, the center of the radiator 310 is located in the gap.

Figure 55:
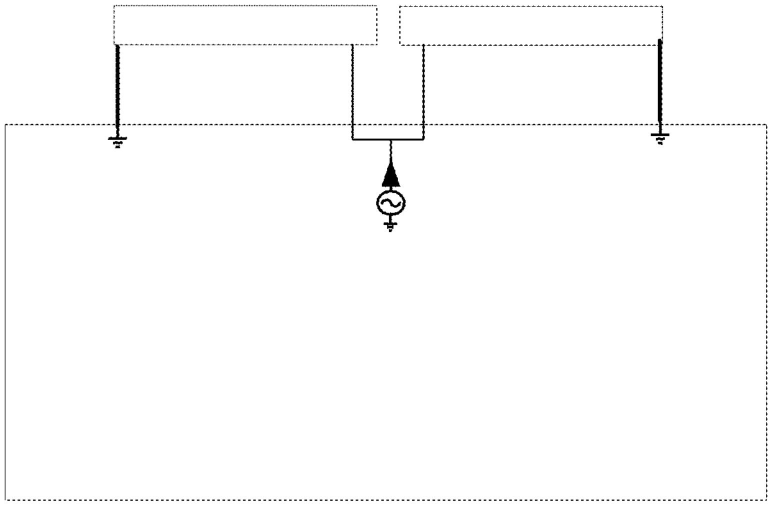
FIG. 55 is a diagram of an antenna structure according to an embodiment of this application.
Figure 56:
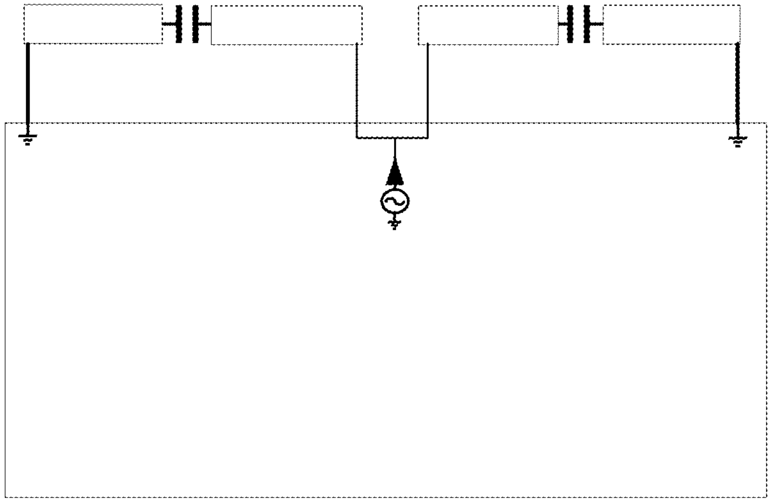
FIG. 56 is a diagram of an antenna structure according to an embodiment of this application.
Figure 57:
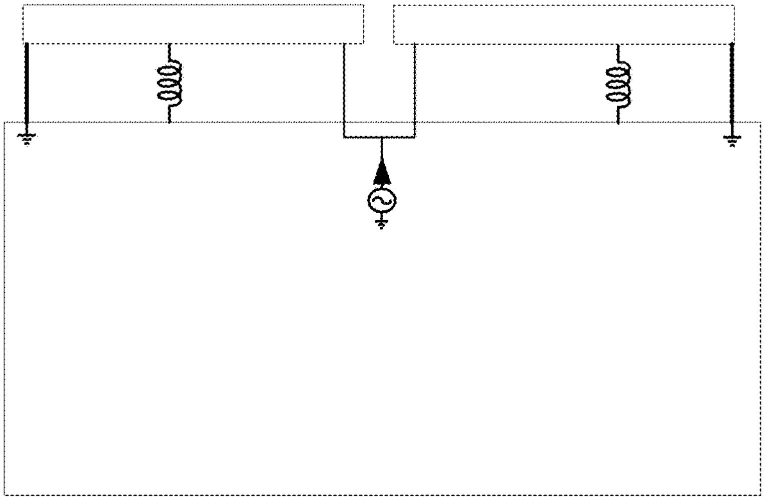
FIG. 57 is a diagram of an antenna structure according to an embodiment of this application.

FIG. 55 to FIG. 57 are diagrams of a group of antenna structures according to an embodiment of this application.

FIG. 55 to FIG. 57 are diagrams of different structures of a slot antenna. The antenna structure shown in FIG. 55 is a slot antenna with an opening. A difference between the antenna structure shown in FIG. 56 and the antenna structure shown in FIG. 55 lies in that two gaps are added to the radiator. A difference between the antenna structure shown in FIG. 57 and the antenna structure shown in FIG. 55 lies in that two inductors are disposed between the radiator and the ground plane. It should be understood that, on the basis of the antenna structure shown in FIG. 57, a quantity of inductors may be further increased. For example, more than two inductors, for example, six inductors, are disposed between the radiator and the ground plane.

As shown in FIG. 56, in an embodiment, the gap disposed on the radiator may be considered as an equivalent capacitor (for example, a distributed capacitor) disposed on the radiator. In an embodiment, a capacitor (for example, a lumped capacitor) may be connected in series at both ends of the gap disposed on the radiator, to form a metamaterial structure in which the capacitor is connected in series.

It should be understood that, for ease of intuitive display of comparison of antenna efficiency when the slot antenna operates in the DM mode, an example in which the antenna structure uses central symmetrical feed is used for description. In addition, an example in which the antenna structures shown in FIG. 55 to FIG. 57 operate in a half-wavelength mode in the DM mode, and operating frequency bands of the antenna structures include 2.3 GHz is used for description. To ensure that the antenna structures shown in FIG. 55 to FIG. 57 operate in a same frequency band, a length of the radiator in the antenna structures is adjusted. In the antenna structure shown in FIG. 55, the length of the radiator is 34 mm. In the antenna structure shown in FIG. 56, the length of the radiator is 64 mm, and an equivalent capacitance value of a distributed capacitor at both ends of the added gap or a capacitance value of a lumped capacitor connected in series at both ends of the added gap is 0.1 pF. In the antenna structure shown in FIG. 57, the length of the radiator is 64 mm, and inductance values of inductors connected in series are both 2.3 nH.

Figure 58:
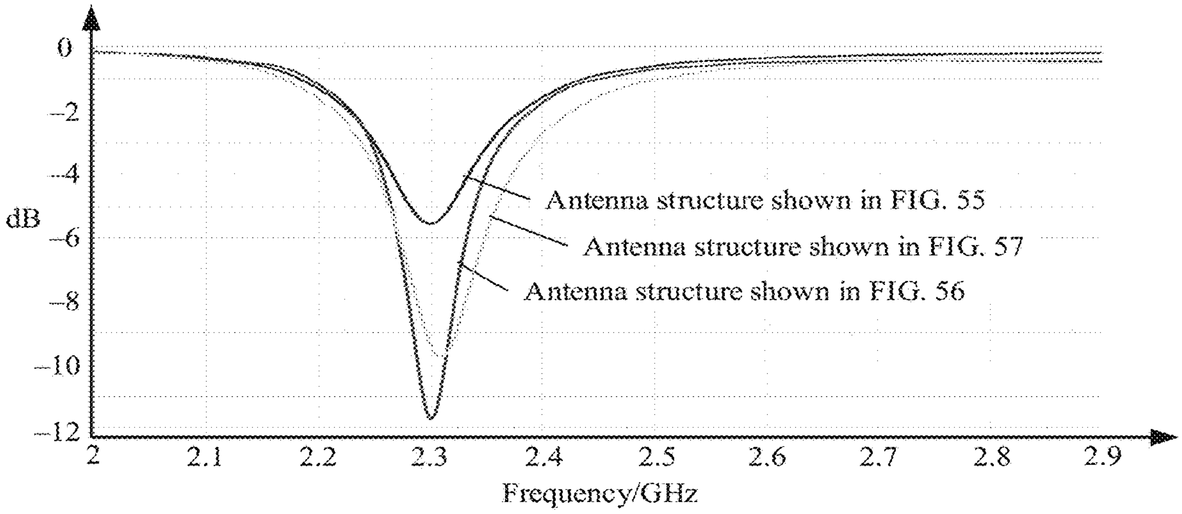
FIG. 58 is a diagram of S-parameters of the antenna structures shown in FIG. 55 to FIG. 57 according to an embodiment of this application.
Figure 59:
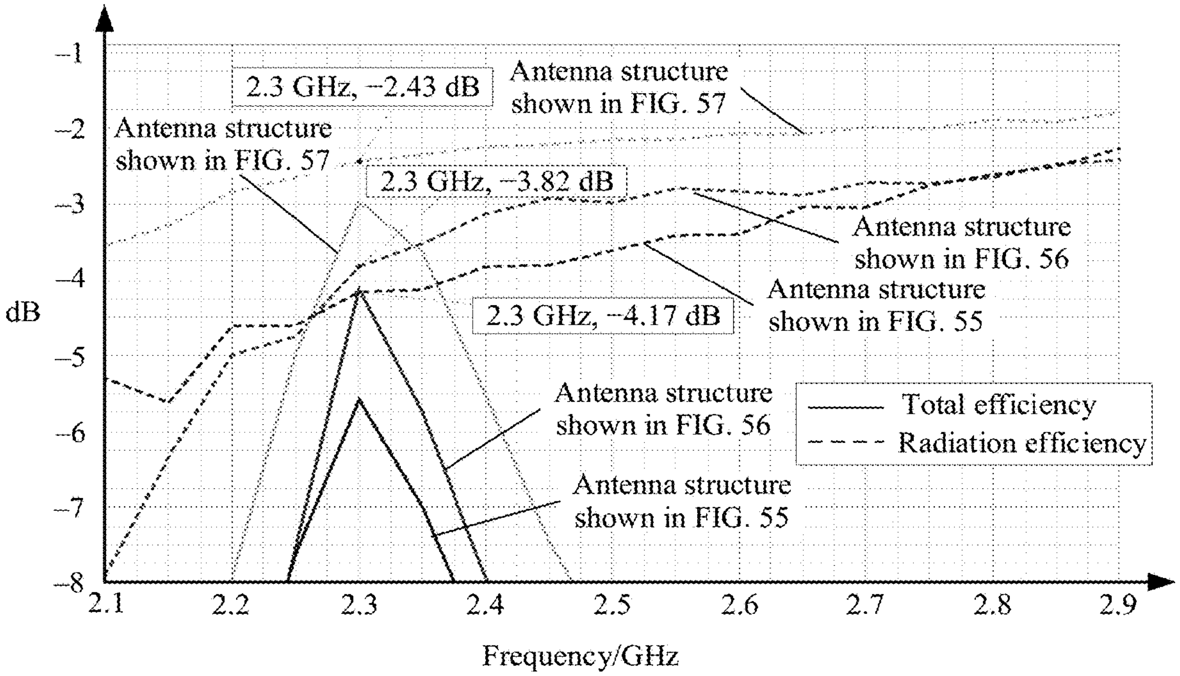
FIG. 59 is a diagram of simulation results of total efficiency and radiation efficiency of the antenna structures shown in FIG. 55 to FIG. 57 according to an embodiment of this application.

FIG. 58 and FIG. 59 are diagrams of simulation results of the antenna structures shown in FIG. 55 to FIG. 57. FIG. 58 is a diagram of S-parameters of the antenna structures shown in FIG. 55 to FIG. 57 according to an embodiment of this application. FIG. 59 is a diagram of simulation results of total efficiency and radiation efficiency of the antenna structures shown in FIG. 55 to FIG. 57 according to an embodiment of this application.

As shown in FIG. 58, S11<−4 dB is used as an example. The antenna structures shown in FIG. 55 to FIG. 57 operate in a DM mode, and operating frequency bands all include 2.25 GHz to 2.35 GHz. A bandwidth generated during resonance of the antenna structure shown in FIG. 57 is wider.

As shown in FIG. 59, within the foregoing frequency band, the efficiency (total efficiency and radiation efficiency) of the antenna structure shown in FIG. 56 is basically the same as that of the antenna structure shown in FIG. 55. In the antenna structure shown in FIG. 57, because the inductors disposed between the radiator and the ground plane are added, the total efficiency of the antenna structure is significantly improved compared with that of the antenna structure shown in FIG. 55. At 2.3 Hz, the total efficiency of the antenna structure is improved by about 1.8 dB, and the radiation efficiency is also improved by about 2.4 dB.

Figure 60A:
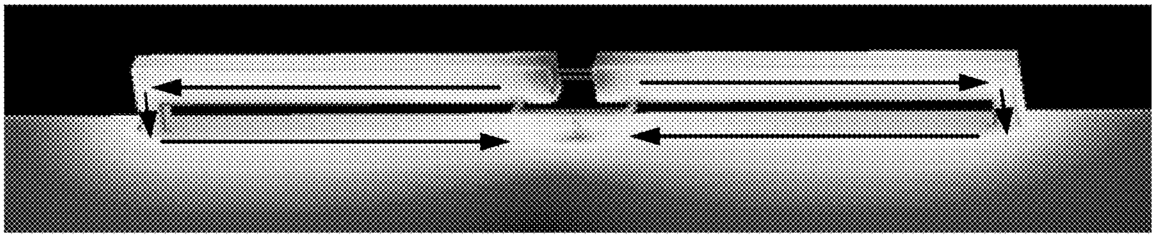
FIGS. 60A-60B are diagrams of a current and an electric field of the antenna structure shown in FIG. 55.
Figure 60B:
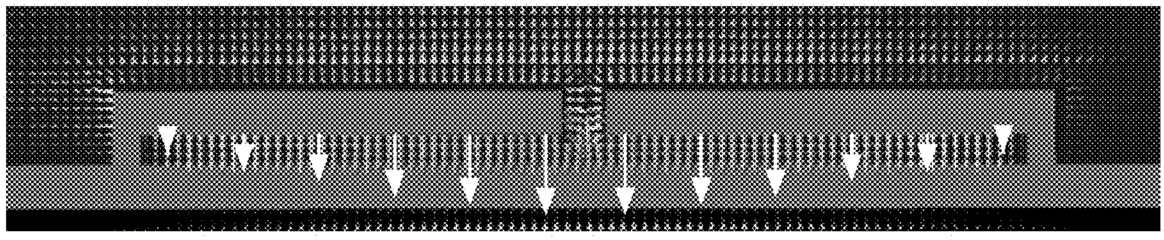
Figure 61A:
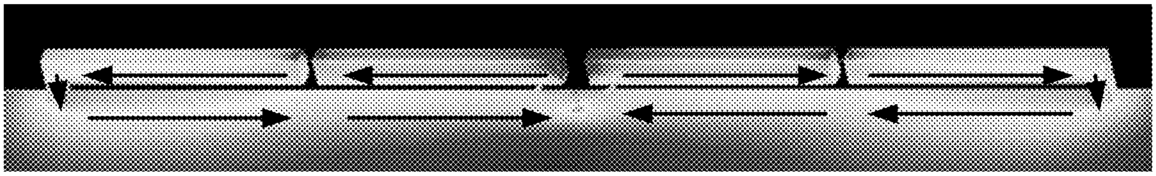
FIGS. 61A-61B are diagrams of a current and an electric field of the antenna structure shown in FIG. 56.
Figure 61B:
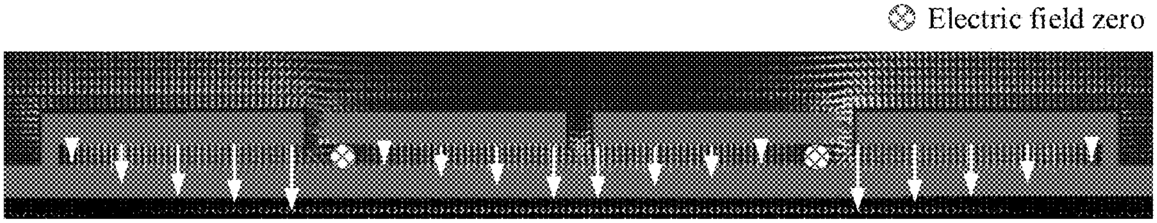
Figure 62A:
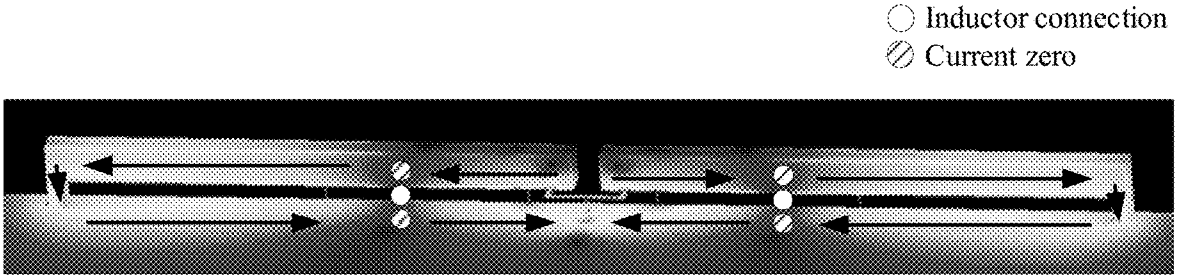
FIGS. 62A-62B are diagrams of a current and an electric field of the antenna structure shown in FIG. 57.
Figure 62B:
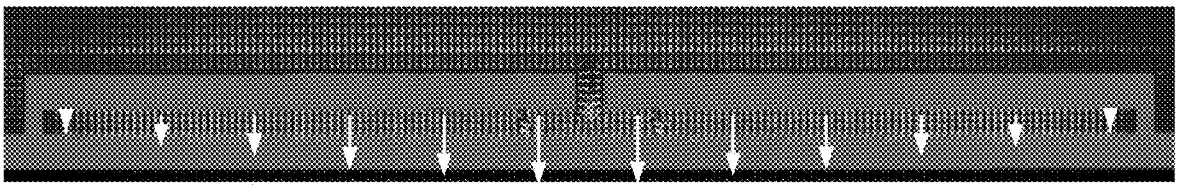

FIG. 60A to FIG. 62B are diagrams of currents and electric fields of the antenna structures shown in FIG. 55 to FIG. 57. FIGS. 60A-60B are diagrams of a current and an electric field of the antenna structure shown in FIG. 55. FIGS. 61A-61B are diagrams of a current and an electric field of the antenna structure shown in FIG. 56. FIGS. 62A-62B are diagrams of a current and an electric field of the antenna structure shown in FIG. 57.

As shown in FIG. 60A, the antenna structure operates in a half-wavelength mode in the DM mode, and the current on the radiator during resonance are concentrated at ground positions at both ends. As shown in FIG. 60B, the electric field that is generated during resonance of the antenna structure and that is between the radiator and the ground plane is concentrated at a central symmetrical feed position.

As shown in FIG. 61A, the antenna structure operates in a half-wavelength mode in the DM mode, and the current on the radiator during resonance are concentrated in an area near a ground point. As shown in FIG. 61B, the electric field that is generated during resonance of the antenna structure and that is between the radiator and the ground plane is concentrated in an area near a gap that is added to the radiator.

As shown in FIG. 62A, the antenna structure operates in a half-wavelength mode in the DM mode, the current on the radiator during resonance has zero at a connected inductor, and current density is more dispersed than those in the simulation diagrams shown in FIGS. 60A-60B and FIGS. 61A-61B. As shown in FIG. 62B, because current density is more dispersed, the electric field that is generated during resonance of the antenna structure and that is between the radiator and the ground plane is reduced compared with those in the simulation diagrams shown in FIGS. 60A-60B and FIGS. 61A-61B, so that a conductor loss may be reduced, to improve the efficiency of the antenna structure.

Figure 63:
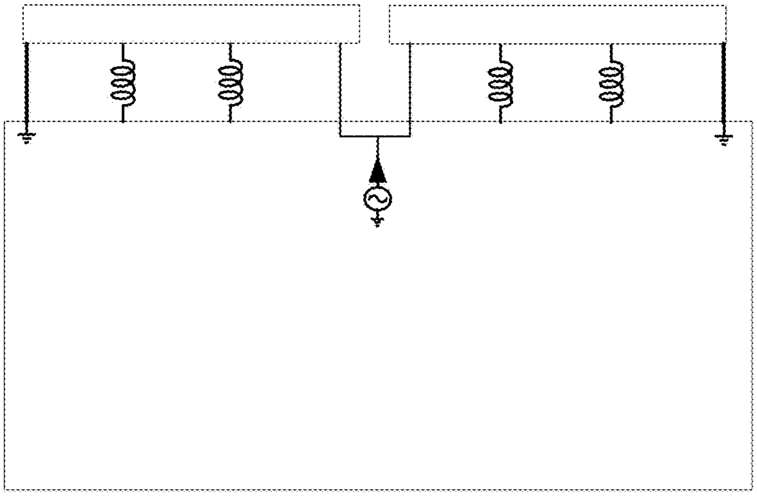
FIG. 63 is a diagram of another antenna structure according to an embodiment of this application.

FIG. 63 is a diagram of another antenna structure according to an embodiment of this application.

A difference between the antenna structure shown in FIG. 63 and the antenna structure shown in FIG. 57 lies in that four inductors are disposed between the radiator and the ground plane.

For ease of intuitive display of comparison of antenna efficiency when the gap antenna operates in the DM mode, an example in which the antenna structure uses a central symmetrical feed is used for description. To ensure that the antenna structures shown in FIG. 55, FIG. 57, and FIG. 63 operate in a same frequency band, a length of the radiator in the antenna structures is adjusted. In the antenna structure shown in FIG. 55, the length of the radiator is 35.6 mm (about half of the first wavelength). In the antenna structure shown in FIG. 57, the length of the radiator is 51.6 mm (about three-quarters of the first wavelength), inductance values of two inductors connected in series are both 5.5 nH, and the two inductors are respectively located on both sides of the ground point. In the antenna structure shown in FIG. 63, the length of the radiator is 67.6 mm (about the first wavelength). In four inductors connected in series, inductance values of the inductors close to the ground point are both 5.5 nH, and inductance values of the inductors close to the gap are both 5.8 nH. To further increase the length of the radiator, expand a radiation aperture, and reduce an inductance value in the antenna structure shown in FIG. 63, the length of the radiator is 79 mm, and inductance values of the four inductors connected in series are all 4 nH.

Figure 64:
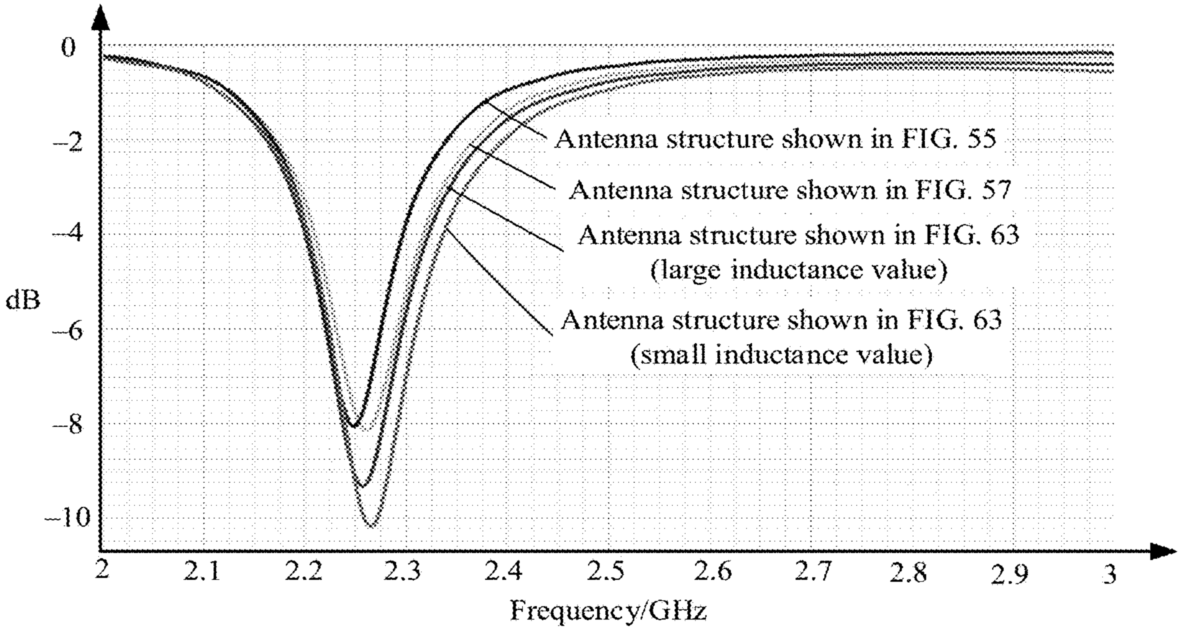
FIG. 64 is a diagram of S-parameters of the antenna structures shown in FIG. 55, FIG. 57, and FIG. 63 according to an embodiment of this application.
Figure 65:
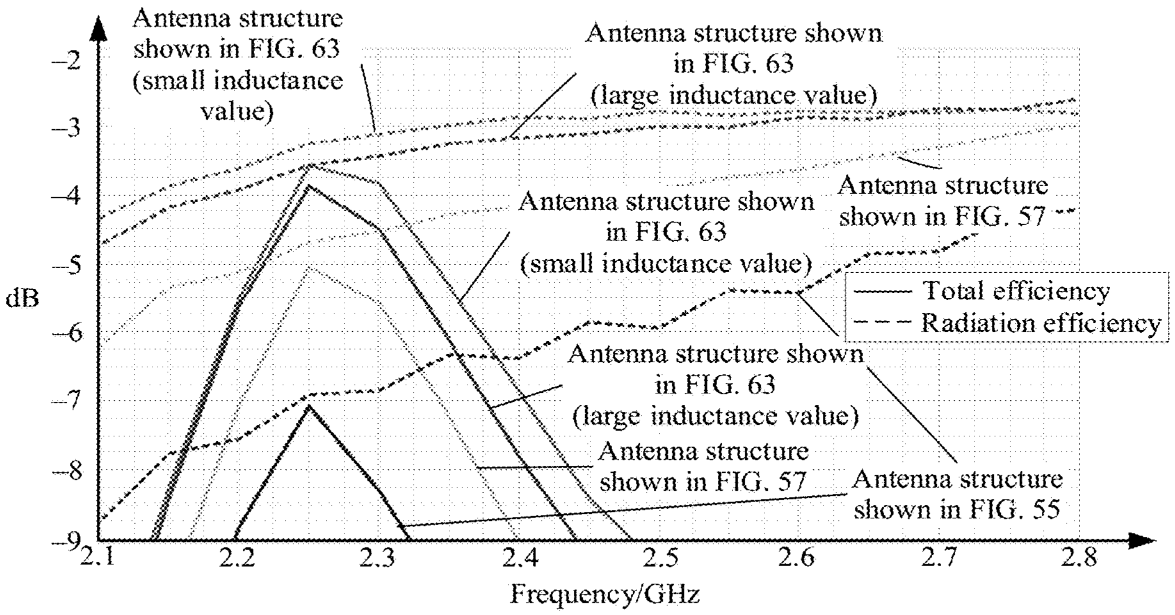
FIG. 65 is a diagram of simulation results of total efficiency and radiation efficiency of the antenna structures shown in FIG. 55, FIG. 57, and FIG. 63 with a radiator conductivity of an order of 105 according to an embodiment of this application.
Figure 66:
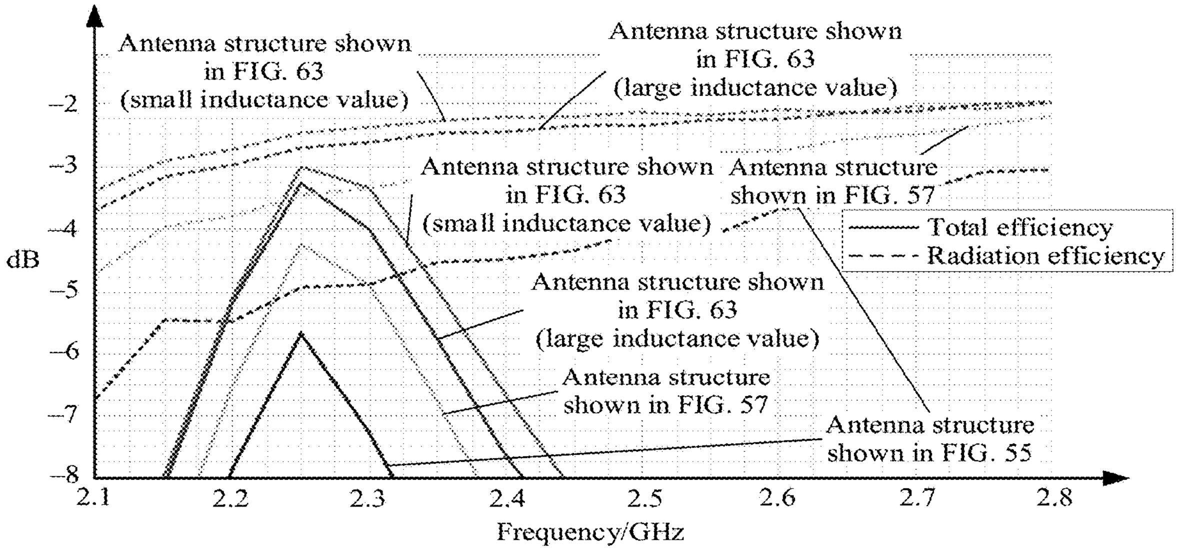
FIG. 66 is a diagram of simulation results of total efficiency and radiation efficiency of the antenna structures shown in FIG. 55, FIG. 57, and FIG. 63 with a radiator conductivity of an order of 106 according to an embodiment of this application.

FIG. 64 to FIG. 66 are diagrams of simulation results of the antenna structures shown in FIG. 55, FIG. 57, and FIG. 63. FIG. 64 is a diagram of S-parameters of the antenna structures shown in FIG. 55, FIG. 57, and FIG. 63 according to an embodiment of this application. FIG. 65 is a diagram of simulation results of total efficiency and radiation efficiency of the antenna structures shown in FIG. 55, FIG. 57, and FIG. 63 with a radiator conductivity of an order of 105 according to an embodiment of this application. FIG. 66 is a diagram of simulation results of total efficiency and radiation efficiency of the antenna structures shown in FIG. 55, FIG. 57, and FIG. 63 with a radiator conductivity of an order of 106 according to an embodiment of this application.

As shown in FIG. 64, S11<−4 dB is used as an example. The antenna structures shown in FIG. 55, FIG. 57, and FIG. 63 operate in a DM mode, and resonance frequency bands of the antenna structures are near 2.25 GHz. With an increase in a quantity of inductors disposed between the radiator and the ground plane, resonance bandwidths of the antenna structures are gradually broadened. When a quantity of inductors disposed between the radiator and the ground plane is the same, an inductance value of the inductor decreases, and a resonance bandwidth is gradually broadened.

As shown in FIG. 65 and FIG. 66, with an increase in a quantity of inductors disposed between the radiator and the ground plane, the radiation efficiency and the total efficiency of the antenna structures are significantly increased. When a quantity of inductors disposed between the radiator and the ground plane is the same, an inductance value of the inductor decreases, and radiation efficiency and total efficiency of the antenna structures are significantly increased.

When the radiator conductivity is in the order of 105, at 2.25 Hz, the radiation efficiency of the antenna structure shown in FIG. 63 (an antenna structure corresponding to a small inductance value) is improved by about 3.6 dB compared with that of the antenna structure shown in FIG. 55, as shown in FIG. 65.

When the radiator conductivity is in the order of 106, at 2.25 Hz, the radiation efficiency of the antenna structure shown in FIG. 63 (an antenna structure corresponding to a small inductance value) is improved by about 2.4 dB compared with that of the antenna structure shown in FIG. 55, as shown in FIG. 66.

It should be understood that, because of the inductors disposed between the radiator and the ground plane, the length of the radiator of the antenna structure is extended from 35.6 mm (the antenna structure shown in FIGS. 55) to 67.6 mm (the antenna structure shown in FIG. 63), so that a radiation aperture is increased, and a conductor loss may be reduced, as shown in Table 5. When a quantity of inductors disposed between the radiator and the ground plane is the same, an inductance value of the inductor decreases, the length of the radiator of the antenna structure may be further extended to 79 mm, a radiation aperture may be increased, and efficiency of the antenna structure may be further improved.

TABLE 5

| | Radiation efficiency | Conductor loss (%) | | Dielectric loss (%) | |
|---|---|---|---|---|---|
| | (%) | PCB | AL | CG | ABS |
| Antenna structure shown in FIG. 55 | 32 | 4 | 24 | 5 | 35 |
| Antenna structure shown in FIG. 57 | 45 | 2 | 14 | 6 | 33 |
| Antenna structure shown in FIG. 63 (Large inductance value) | 54 | 2 | 9 | 5 | 30 |
| Antenna structure shown in FIG. 63 (Small inductance value) | 57 | 1 | 9 | 5 | 28 |

As shown in Table 5, the inductors disposed between the radiator and the ground plane may reduce the conductor loss, but the dielectric loss is not obviously reduced. In addition, as shown in FIG. 64 and FIG. 66, after the radiator conductivity is reduced, efficiency of the antenna structure is improved more obviously.

Figure 67:
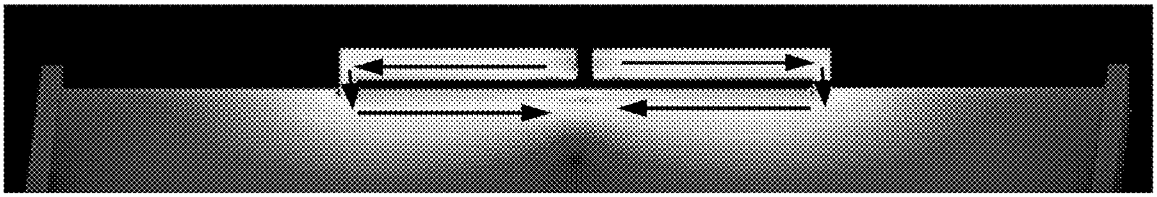
FIG. 67 is a diagram of current distribution of the antenna structure shown in FIG. 55.
Figure 68:
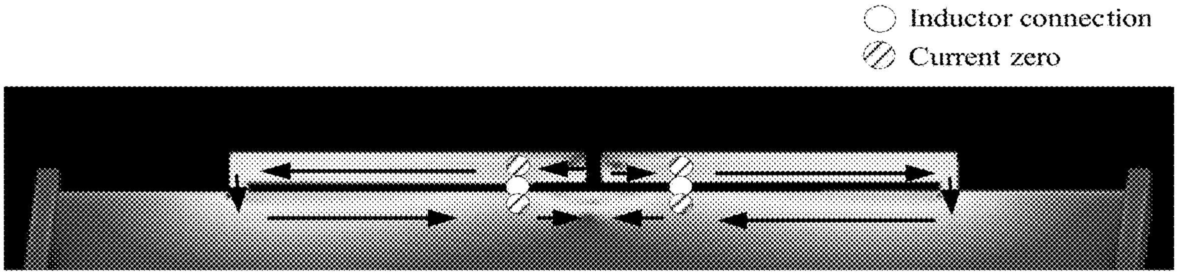
FIG. 68 is a diagram of current distribution of the antenna structure shown in FIG. 57.
Figure 69:
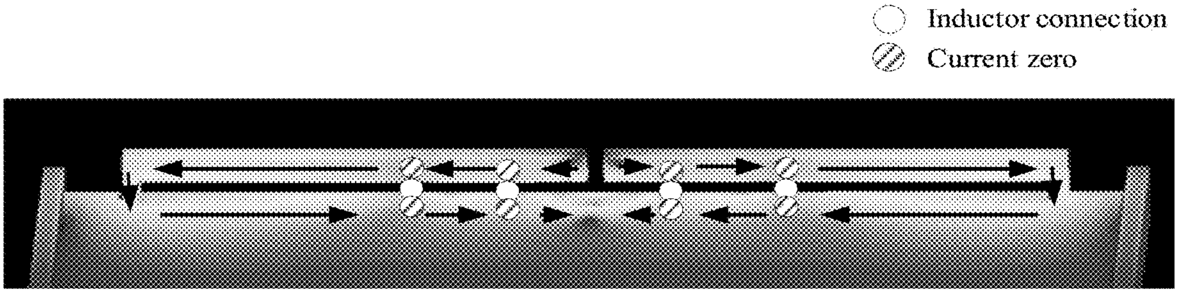
FIG. 69 is a diagram of current distribution corresponding to the antenna structure shown in FIG. 63 when an inductance value is large.
Figure 70:
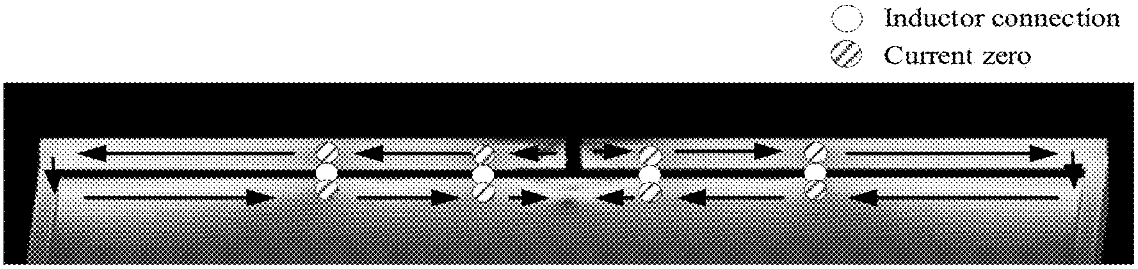
FIG. 70 is a diagram of current distribution corresponding to the antenna structure shown in FIG. 63 when an inductance value is small.

FIG. 67 to FIG. 70 are respectively diagrams of current distribution of the antenna structures shown in FIG. 55, FIG. 57, and FIG. 63. FIG. 67 is a diagram of current distribution of the antenna structure shown in FIG. 55. FIG. 68 is a diagram of current distribution of the antenna structure shown in FIG. 57. FIG. 69 is a diagram of current distribution corresponding to the antenna structure shown in FIG. 63 when an inductance value is large. FIG. 70 is a diagram of current distribution corresponding to the antenna structure shown in FIG. 63 when an inductance value is small.

As shown in FIG. 67 to FIG. 69, with an increase in a quantity of inductors disposed between the radiator and the ground plane, zero of the current on the radiator in an area near the connected inductor during resonance increases, so that current density may be more dispersed, to reduce the conductor loss during radiation, and improve efficiency of the antenna structure.

As shown in FIG. 69 and FIG. 70, when a quantity of inductors disposed between the radiator and the ground plane is the same, an inductance value of the inductor decreases, so that current density may be further dispersed, and a conductor loss is reduced.

FIG. 71 to FIG. 74 are diagrams of a group of antenna structures according to an embodiment of this application.

FIG. 71 to FIG. 74 are diagrams of different structures of a slot antenna. A difference between the slot antenna and the slot antenna shown in FIG. 54 lies in a feed manner. The antenna structure shown in FIG. 54 excites a CM mode of the slot antenna in a central feed manner, and the inductors electrically connected between the radiator and the ground plane are used to improve efficiency. However, the antenna structures shown in FIG. 71 to FIG. 74 excite both a CM mode and a DM mode in an offset feed manner, and the efficiency is improved by using inductors electrically connected between the radiator and the ground plane and a gap disposed on the radiator.

Figure 71:
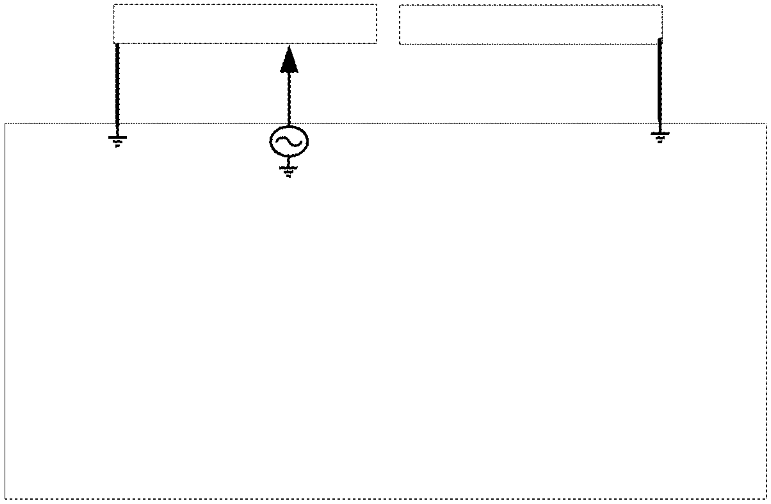
FIG. 71 is a diagram of an antenna structure according to an embodiment of this application.

The antenna structure shown in FIG. 71 is a slot antenna with an opening (or a gap, a broken seam, or the like). A difference between the antenna structure shown in FIG. 72 and the antenna structure shown in FIG. 71 lies in that two gaps are added to the radiator in FIG. 71. A difference between the antenna structure shown in FIG. 73 and the antenna structure shown in FIG. 71 lies in that two or more inductors, for example, three inductors, are disposed between the radiator and the ground plane. A difference between the antenna structure shown in FIG. 74 and the antenna structure shown in FIG. 71 lies in that two gaps are added to the radiator, and two inductors are disposed between the radiator and the ground plane.

It should be understood that, in the foregoing embodiment, an example in which two or three inductors are disposed between the radiator and the ground plane 220 is used for description. In the technical solutions provided in this embodiment of this application, three or more inductors may be disposed between the radiator and the ground plane 220, so that current density distribution on the radiator is more evenly, to reduce a loss caused by the radiator and a medium/conductor disposed around the radiator.

It should be understood that, in the foregoing embodiment, an example in which two or three gaps are disposed on the radiator is used for description. In the technical solutions provided in this embodiment of this application, more than two gaps, for example, three or six gaps, may be disposed on the radiator.

In an embodiment, more than two inductors may be disposed between the radiator and the ground plane. Further, in an embodiment, more than two gaps may be further disposed on the radiator.

Figure 74:
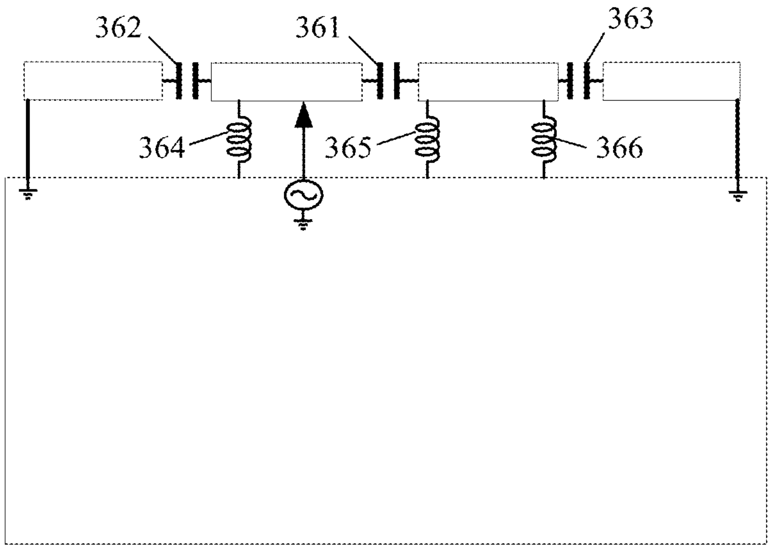
FIG. 74 is a diagram of an antenna structure according to an embodiment of this application.

As shown in FIG. 71 and FIG. 74, in an embodiment, the gap disposed on the radiator may be considered as an equivalent capacitor (for example, a distributed capacitor) disposed on the radiator. In an embodiment, a capacitor (for example, a lumped capacitor) may be connected in series at both ends of the gap disposed on the radiator, to form a metamaterial structure in which the capacitor is connected in series.

It should be understood that, for ease of intuitive display of comparison of antenna efficiency when the slot antenna operates in the CM mode and the DM mode, an example in which the antenna structure simultaneously excites the CM mode and the DM mode in an offset feed manner is used for description. In addition, an example in which the antenna structures shown in FIG. 71 to FIG. 74 operate in the CM mode and a half wavelength mode in the DM, operating frequency bands corresponding to the CM mode include 1.75 GHz, and operating frequency bands corresponding to the DM mode include 2.2 GHz is used for description. To ensure that the antenna structures shown in FIG. 71 to FIG. 74 operate in a same frequency band, a length of the radiator in the antenna structures is adjusted. In the antenna structure shown in FIG. 71, the length of the radiator is 34 mm. In the antenna structure shown in FIG. 72, the length of the radiator is 64 mm, an equivalent capacitance value of a distributed capacitor 341 or a capacitance value of a lumped capacitor 341 is 0.5 pF, an equivalent capacitance value of a distributed capacitor 342 or a capacitance value of a lumped capacitor 342 is 0.65 pF, and an equivalent capacitance value of a distributed capacitor 343 or a capacitance value of a lumped capacitor 343 is 0.15 pF. In the antenna structure shown in FIG. 73, the length of the radiator is 64 mm, an equivalent capacitance value of a distributed capacitor 351 or a capacitance value of a lumped capacitor 351 is 0.1 pF, an inductance value of an inductor 352 is 3.5 nH, an inductance value of an inductor 353 is 6.5 nH, and an inductance value of an inductor 354 is 10 nH. In the antenna structure shown in FIG. 74, the length of the radiator is 70 mm, an equivalent capacitance value of a distributed capacitor 361 or a capacitance value of a lumped capacitor 361 is 0.6 pF, an equivalent capacitance value of a distributed capacitor 362 or a capacitance value of a lumped capacitor 362 is 0.55 pF, an equivalent capacitance value of a distributed capacitor 363 or a capacitance value of a lumped capacitor 363 is 0.35 pF, an inductance value of an inductor 364 is 3.5 nH, an inductance value of an inductor 365 is 4.5 nH, and an inductance value of an inductor 366 is 10 nH.

Figure 75:
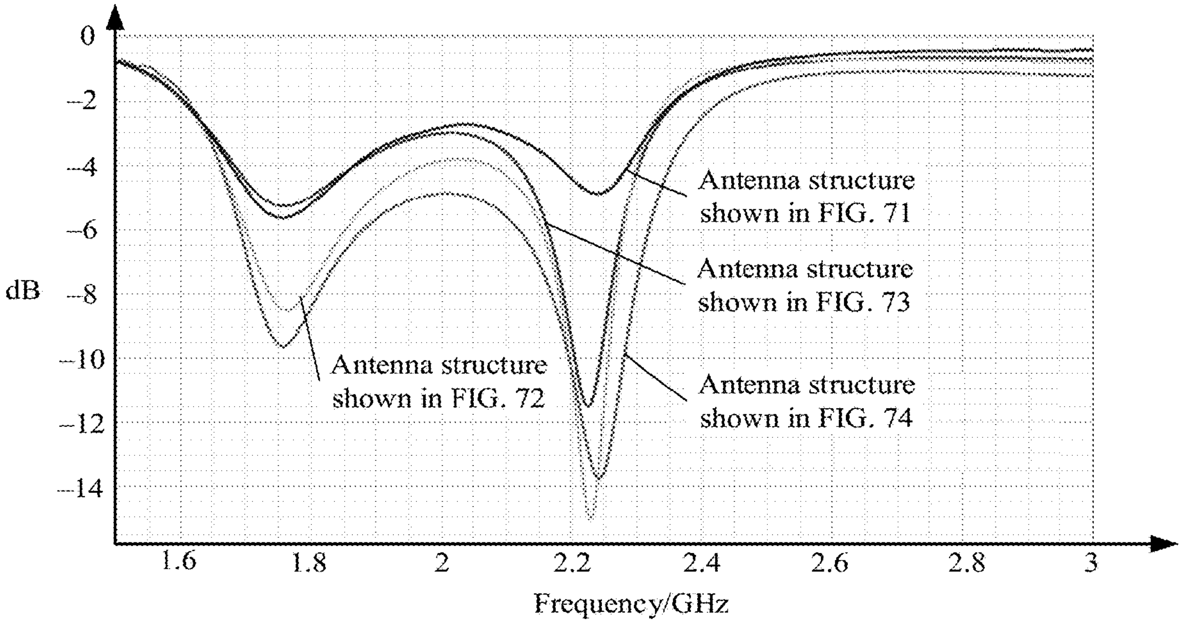
FIG. 75 is a diagram of S-parameters of the antenna structures shown in FIG. 71 to FIG. 74 according to an embodiment of this application.
Figure 76:
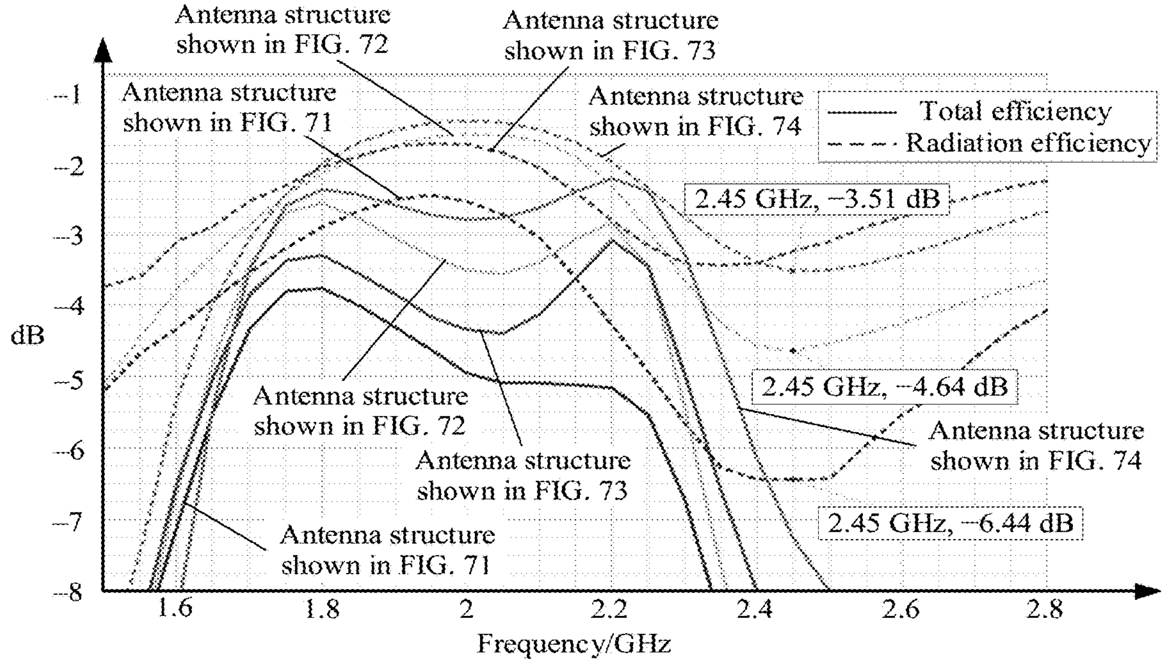
FIG. 76 is a diagram of simulation results of total efficiency and radiation efficiency of the antenna structures shown in FIG. 71 to FIG. 74 according to an embodiment of this application.

FIG. 75 and FIG. 76 are diagrams of simulation results of the antenna structures shown in FIG. 71 to FIG. 74. FIG. 75 is a diagram of S-parameters of the antenna structures shown in FIG. 71 to FIG. 74 according to an embodiment of this application. FIG. 76 is a diagram of simulation results of total efficiency and radiation efficiency of the antenna structures shown in FIG. 71 to FIG. 74 according to an embodiment of this application.

As shown in FIG. 75, S11<−4 dB is used as an example. The antenna structures shown in FIG. 71 to FIG. 74 operate in a CM mode and a DM mode, and operating frequency bands separately include 1.68 GHz to 1.85 GHz (CM mode) and 2.15 GHz to 2.3 GHz (DM mode). A bandwidth generated during resonance of the antenna structure shown in FIG. 74 is wider.

Figure 72:
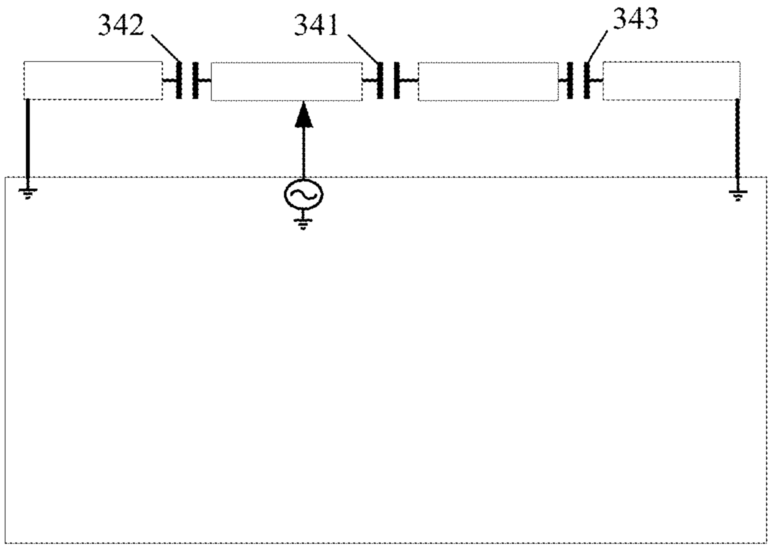
FIG. 72 is a diagram of an antenna structure according to an embodiment of this application.
Figure 73:
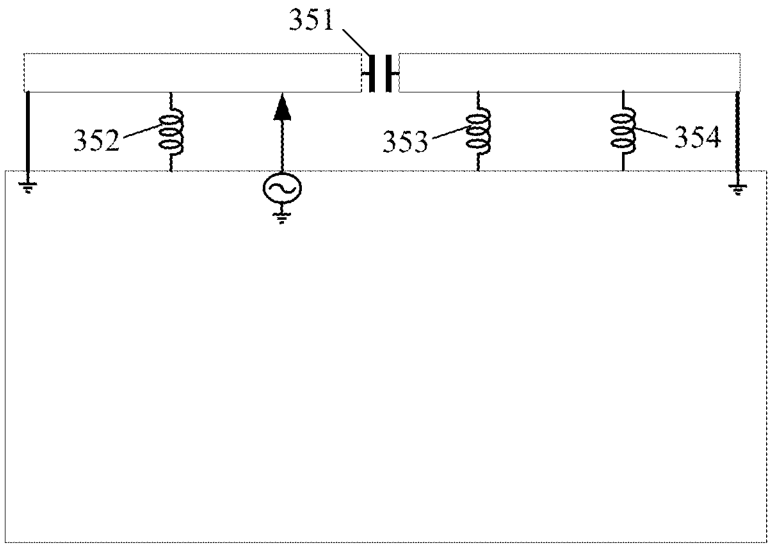
FIG. 73 is a diagram of an antenna structure according to an embodiment of this application.

As shown in FIG. 76, within the foregoing frequency band, compared with the efficiency (total efficiency and radiation efficiency) of the antenna structure shown in FIG. 71, the antenna structure shown in FIG. 72 may improve the efficiency in the CM mode (1.68 GHz to 1.85 GHz), and the antenna structure shown in FIG. 73 may improve the efficiency in the DM mode (2.15 GHz to 2.3 GHz). Features of the antenna structure shown in FIG. 72 and the antenna structure shown in FIG. 73 are combined in the antenna structure shown in FIG. 74. The capacitors disposed on the radiator and the inductors disposed between the radiator and the ground plane are used, so that the efficiency of the antenna structure may be improved in both the CM mode (1.68 GHz to 1.85 GHz) and the DM mode (2.15 GHz to 2.3 GHz). For example, the total efficiency (at 2.45 GHz) of the antenna structure may be improved by more than 3 dB by increasing a quantity of inductors disposed between the radiator and the ground plane.

SAR values of the antenna structures shown in FIG. 71 to FIG. 74 are shown in Table 6. An example in which input power is 24 dbm is used for description.

TABLE 6

| Antenna structure | FIG. 71 | | FIG. 72 | | FIG. 73 | | FIG. 74 | |
|---|---|---|---|---|---|---|---|---|
| Frequency (GHz) | 1.75 | 2.2 | 1.75 | 2.2 | 1.75 | 2.2 | 1.75 | 2.2 |
| Bottom (5 mm) 10 g normalization | 1.894 | 2.496 | 1.285 | 0.979 | 1.685 | 1.13 | 1.266 | 1.107 |
| Rear (5 mm) 10 g normalization | 1.617 | 1.956 | 1.129 | 0.719 | 1.456 | 0.833 | 0.993 | 0.788 |

As shown in Table 6, compared with the antenna structure shown in FIG. 71, the antenna structure shown in FIG. 72 has good SAR values at both 1.75 GHz (CM mode) and 2.2 GHz (DM mode), and the antenna structure shown in FIG. 73 has better SAR values at both 1.75 GHz (CM mode) and 2.2 GHz (DM mode). Features of the antenna structure shown in FIG. 72 and the antenna structure shown in FIG. 73 are combined in the antenna structure shown in FIG. 74. Therefore, the antenna structure shown in FIG. 72 has good SAR values at both 1.75 GHz (CM mode) and 2.2 GHz (DM mode).

Figure 77A:
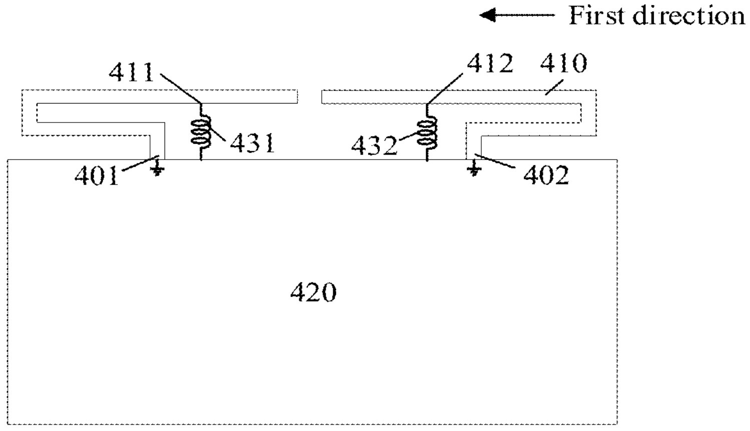
FIGS. 77A-77C are diagrams of an antenna structure 400 according to an embodiment of this application.
Figure 77B:
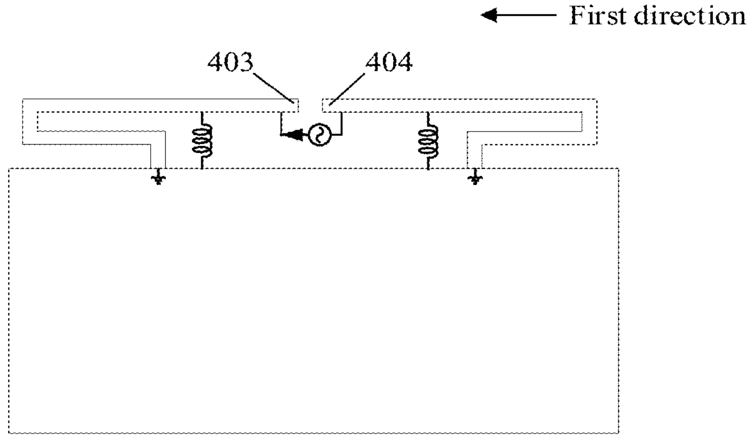
Figure 77C:
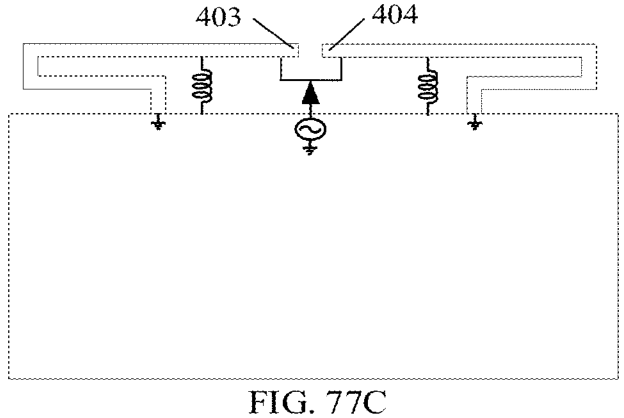

FIGS. 77A-77C are diagrams of an antenna structure 400 according to an embodiment of this application.

As shown in FIGS. 77A-77C, the antenna structure 400 may include a radiator 410, a ground plane 420, a first inductor 431, and a second inductor 432.

The radiator 410 includes a first end 401, a second end 402, and a first connection point 411 and a second connection point 412 that are located between the first end 401 and the second end 402. The radiator 410 is grounded at the first end 401 and the second end 402 through the ground plane 420. Inductance values of the first inductor 431 and the second inductor 432 are both less than a first threshold. A length of the radiator 410 is greater than three quarters of a first wavelength, a part of the radiator from the first end 401 to the second end 402 is configured to generate a first resonance, and the first wavelength is a medium wavelength of the first resonance. The first inductor 431 is electrically connected between the first connection point 411 and the ground plane 420, and the second inductor 432 is electrically connected between the second connection point 412 and the ground plane 420. A distance between the first connection point 411 and a center of the radiator 410 is less than one-eighth of the first wavelength, and the second connection point 412 is located between the first connection point 411 and the second end 402.

A difference between the antenna structure 400 shown in FIG. 77A and the antenna structure 300 shown in FIG. 54 lies in that the length of the radiator 310 of the antenna structure 300 is equal to a distance between the first end 301 and the second end 302, and a linear (for example, a strip) gap is formed by the radiator 310 and the ground plane 320, while the length of the radiator 410 of the antenna structure 400 is far greater than a distance between the first end 401 and the second end 402, and a non-linear (T-shaped or bent) gap is formed by the radiator 410 and the ground plane 420. In one embodiment, the antenna structure 300 is a slot antenna (slot antenna). In one embodiment, the antenna structure 400 is a loop antenna (loop antenna). In an embodiment, the distance L1 between the first end and the second end is approximately the same as the length L2 of the radiator, and it may be understood as that $L2\times80\%\leq L1\leq L2\times120\%$, for example, $L2\times90\%\leq L1\leq L2\times110\%$. In an embodiment, the length L2 of the radiator is far greater than the distance L1 between the first end and the second end, and it may be understood that $L1\leq L2\times50\%$, for example, $L1\leq L2\times30\%$. It should be understood that, when a ratio of the distance L1 between the first end and the second end to the length L2 of the radiator is between a ratio of a loop antenna to a slot antenna (for example, $L2\times30\%\leq L1<L2\times80\%$), the antenna structure may have features of both a slot antenna and a loop antenna.

In an embodiment, the radiator 410 may be disposed on an antenna bracket in the electronic device through LDS, or may be disposed on a rear cover. This is not limited in this application.

In an embodiment, when a frequency of the first resonance is less than or equal to 1 GHz, the first threshold is 20 nH. When a resonance frequency of the first resonance is greater than 1 GHz and less than or equal to 2.2 GHz, the first threshold is 16 nH. When a frequency of the first resonance is greater than 2.2 GHz and less than or equal to 3 GHz, the first threshold is 12 nH. When a frequency of the first resonance is greater than 3 GHz, the first threshold is 10 nH.

In an embodiment, one or more gaps may be disposed on the radiator 410. For positions of the gaps (or capacitors), refer to the foregoing embodiment. A gap structure disposed on the radiator 410 may be equivalent to a capacitor, so that the radiator 410 is equivalent to a metamaterial structure in which the capacitor is connected in series. It should be understood that, the inductor is disposed between the radiator 410 and the ground plane 420, to improve the efficiency of the antenna structure 400 in the DM mode, and the gap is disposed on the radiator 410, to improve the efficiency of the antenna structure 400 in the CM mode. In addition, the center of the radiator 410 may fall outside the radiator. For example, when lengths of the radiator 410 on both sides of the gap are the same or roughly the same, the center of the radiator 410 is located in the gap.

In an embodiment, the radiator 410 may further include a feed point. The feed point is configured to feed an electrical signal to the antenna structure 400, so that the antenna structure 400 generates radiation.

As shown in FIG. 77B, a first feed point and a second feed point are respectively disposed at both ends of the gap of the radiator 410, or a first feed point and a second feed point are respectively disposed at a third end 403 and a fourth end 404 of the radiator 410, to provide central anti-symmetrical feed or asymmetrical feed for the radiator 410. The first feed point and the second feed point correspond to a same feed source. For example, signals of the first feed point and signals of the second feed point may be radio frequency signals of a same amplitude but different phases.

As shown in FIG. 77C, a first feed point and a second feed point are respectively disposed at both ends of the gap of the radiator 410, or a first feed point and a second feed point are respectively disposed at a third end 403 and a fourth end 404 of the radiator 410, to provide central symmetrical feed for the radiator 410. The first feed point and the second feed point correspond to a same feed. For example, the first feed point and the second feed point are electrically connected to a same position of a feed source.

In one embodiment, the feed point is located between the first end 401 or the second end 402 of the radiator 410. An electrical signal may be fed into the antenna structure 400 in an offset feed manner, so that the antenna structure 400 may operate in both a CM mode and a DM mode, to extend an operating frequency band of the antenna structure 400. In actual application, the CM mode and the DM mode of the antenna structure may be excited by using central symmetrical feed or central anti-symmetrical feed. This is not limited in this application, and may be adjusted based on an internal layout of the electronic device. The following embodiments may also be correspondingly understood.

It should be understood that, the technical solutions provided in this embodiment of this application may be applied to the loop antenna shown in FIGS. 77A-77C, and the inductors disposed between the radiator and the ground plane may be used, so that when the electrical signal is fed at the feed point, because the first inductor 431 and the second inductor 432 are respectively disposed between the radiator 410 and the ground plane 420 at the first connection point 411 and the second connection point 412, the current on the radiator 420 is reversed in areas near the first connection point 411 and the second connection point 412. Correspondingly, a current on the ground plane 420 is also reversed at a connection between the first inductor 431 and the ground plane 420 and a connection between the second inductor 432 and the ground plane 420. Current density on the radiator may be dispersed (strength of a single maximum current is reduced, so that the current is distributed more evenly). Therefore, a loss caused by the radiator and a medium disposed around the radiator is reduced, to further improve efficiency of an antenna structure.

In addition, because the current on the radiator 420 is reversed in the areas near the first connection point 411 and the second connection point 412, the electric field cannot reach zero at the first connection point 411 and the second connection point 412, and the electric field generated by the radiator is continuous and is not reversed (does not include an electric field reverse area) and does not have zero. This increases a radiation aperture of the antenna structure, reduces the conductor loss, and improves the efficiency of the antenna structure.

FIG. 78 to FIG. 81 are diagrams of a group of antenna structures according to an embodiment of this application.

Figure 78:
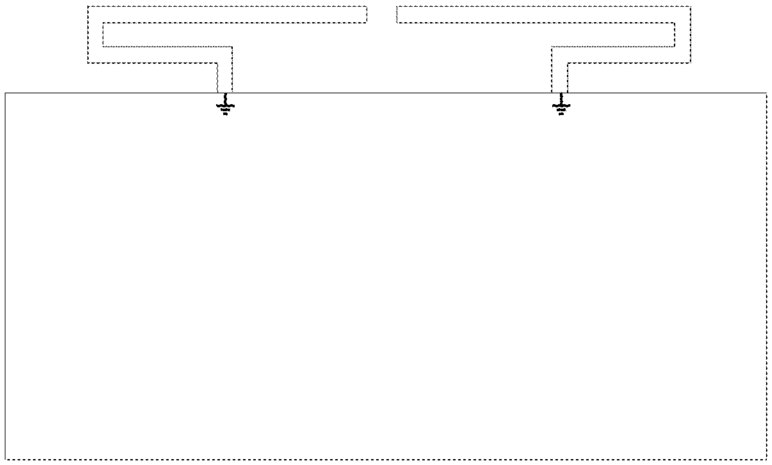
FIG. 78 is a diagram of an antenna structure according to an embodiment of this application.

FIG. 78 to FIG. 81 are diagrams of different structures of a loop antenna. The antenna structure shown in FIG. 78 is a loop antenna with an opening disposed at a center of the radiator. A difference between the antenna structure shown in FIG. 79 and the antenna structure shown in FIG. 78 lies in that two gaps are added to the radiator in FIG. 79. A difference between the antenna structure shown in FIG. 80 and the antenna structure shown in FIG. 78 lies in that two inductors are disposed between the radiator and the ground plane. A difference between the antenna structure shown in FIG. 81 and the antenna structure shown in FIG. 78 lies in that two gaps are added to the radiator, and two inductors are disposed between the radiator and the ground plane.

Figure 79:
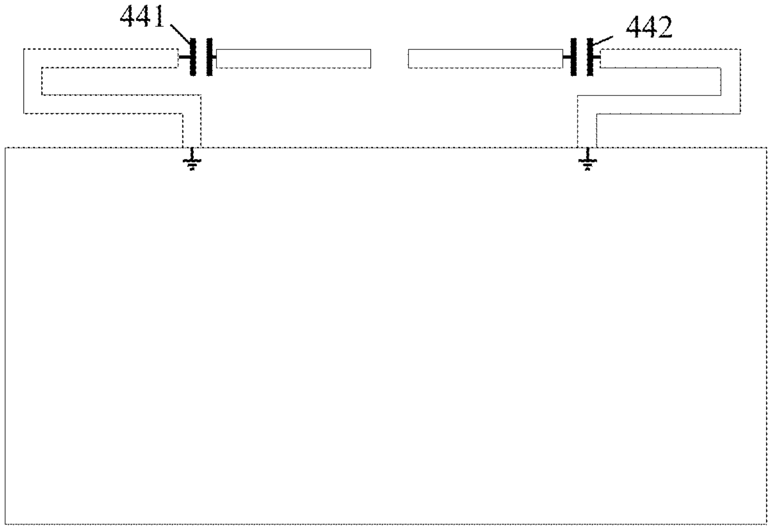
FIG. 79 is a diagram of an antenna structure according to an embodiment of this application.
Figure 81:
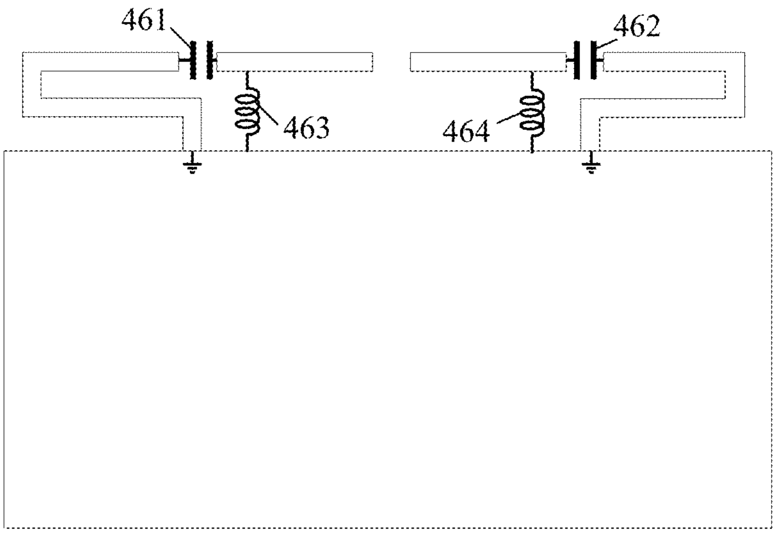
FIG. 81 is a diagram of an antenna structure according to an embodiment of this application.

As shown in FIG. 79 and FIG. 81, in an embodiment, the gap disposed on the radiator may be considered as an equivalent capacitor (for example, a distributed capacitor) disposed on the radiator. In an embodiment, a capacitor (for example, a lumped capacitor) may be connected in series at both ends of the gap disposed on the radiator, to form a metamaterial structure in which the capacitor is connected in series.

Figure 82:
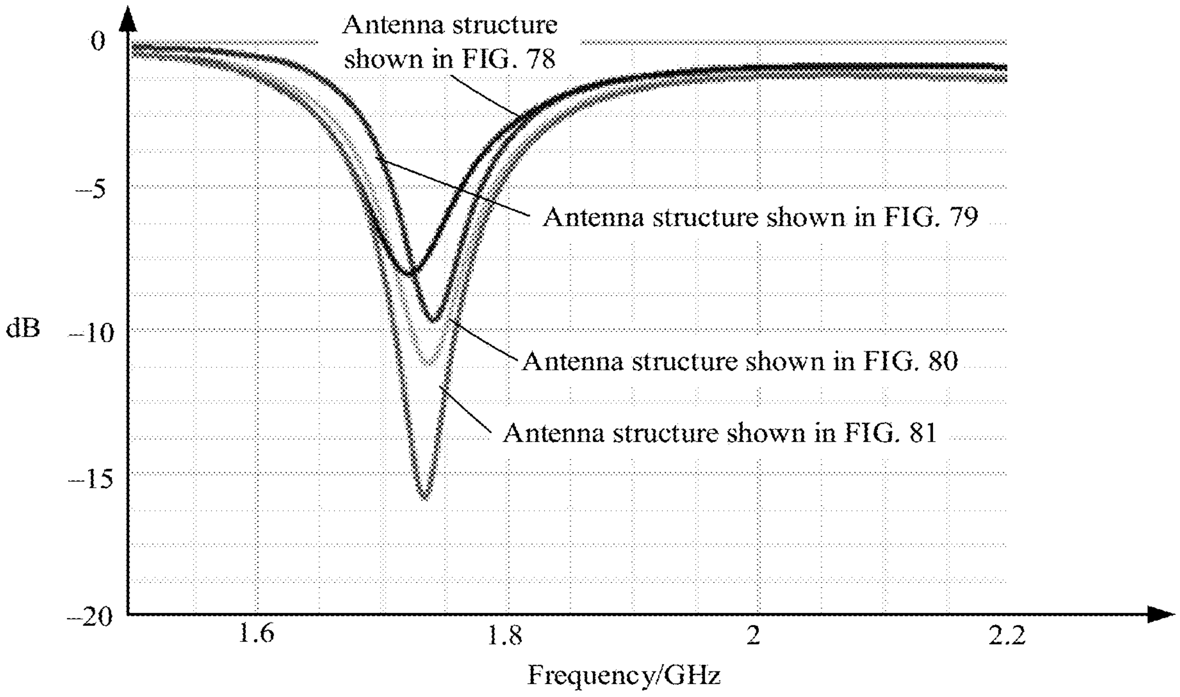
FIG. 82 is a diagram of S-parameters of the antenna structures shown in FIG. 78 to FIG. 81 in a CM mode according to an embodiment of this application.
Figure 83:
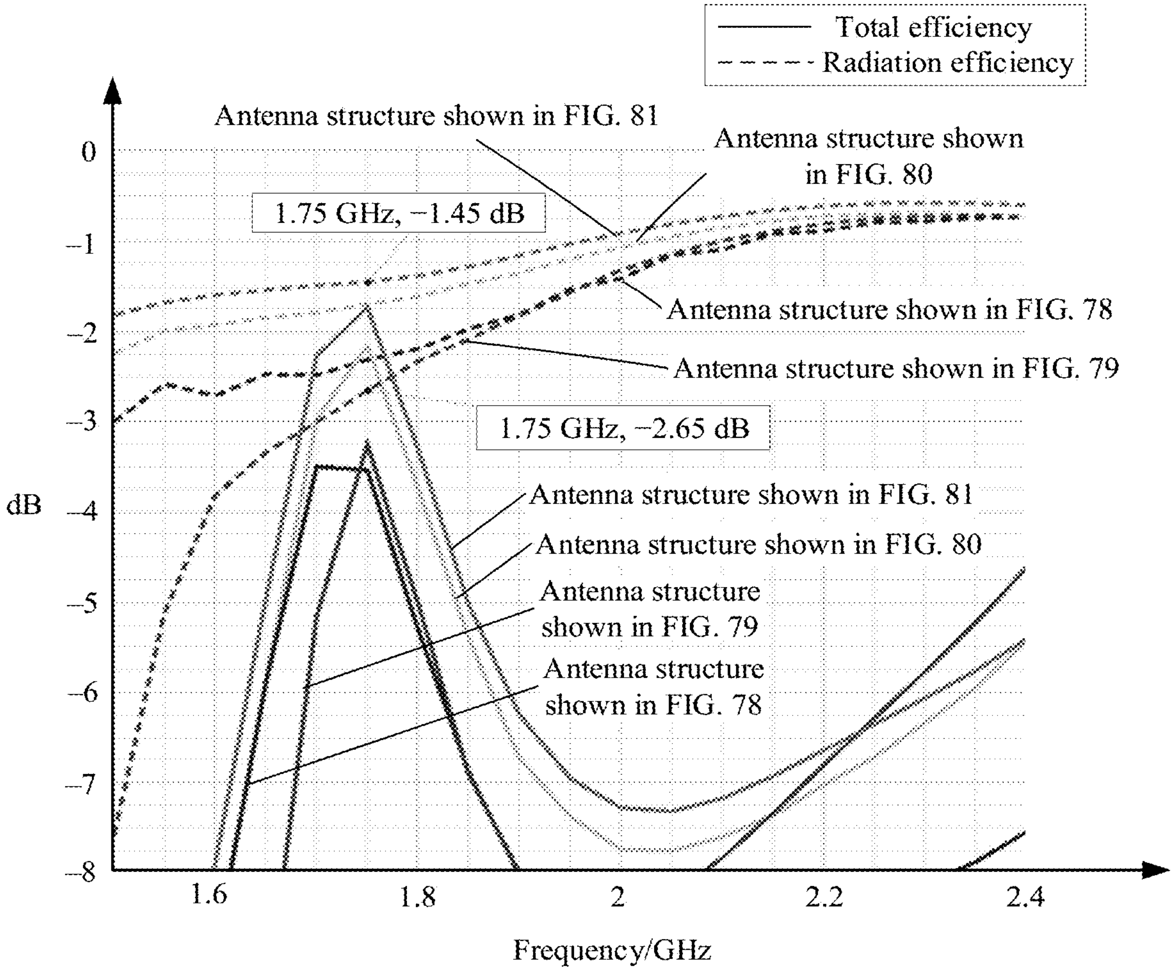
FIG. 83 is a diagram of simulation results of total efficiency and radiation efficiency of the antenna structures shown in FIG. 78 to FIG. 81 in a CM mode according to an embodiment of this application.

FIG. 82 and FIG. 83 are diagrams of simulation results of the antenna structures shown in FIG. 78 to FIG. 81 in a CM mode. FIG. 82 is a diagram of S-parameters of the antenna structures shown in FIG. 78 to FIG. 81 in a CM mode according to an embodiment of this application. FIG. 83 is a diagram of simulation results of total efficiency and radiation efficiency of the antenna structures shown in FIG. 78 to FIG. 81 in a CM mode according to an embodiment of this application.

It should be understood that, for ease of intuitive display of comparison of antenna efficiency when the loop antenna operates in the CM mode, an example in which the antenna structure excites the CM mode in a central symmetrical feed manner is used for description. In addition, the antenna structures shown in FIG. 82 and FIG. 83 operate in a half-wavelength mode in the CM mode. To ensure that the antenna structures shown in FIG. 78 to FIG. 81 operate in a same frequency band, a length of the radiator in the antenna structures is adjusted. In the antenna structure shown in FIG. 78, the length of the radiator is 42.8 mm. In the antenna structure shown in FIG. 79, the length of the radiator is 62.8 mm, and capacitance values of a distributed or lumped capacitor 441 and a distributed or lumped capacitor 442 are 0.35 pF. In the antenna structure shown in FIG. 80, the length of the radiator is 62.8 mm, and inductance values of the inductor 451 and the inductor 452 are both 15 nH. In the antenna structure shown in FIG. 81, the length of the radiator is 62.8 mm, capacitance values of a distributed or lumped capacitor 461 and a distributed or lumped capacitor 362 are 0.4 pF, and inductance values of the inductor 463 and the inductor 464 are both 12 nH. It should be understood that, the foregoing inductance value is merely used as an example. In this embodiment of this application, in an antenna structure including both a gap and a ground inductor, a specific value of the ground inductor is not limited.

As shown in FIG. 82, S11<−4 dB is used as an example. The antenna structures shown in FIG. 78 to FIG. 81 operate in a CM mode, and operating frequency bands all include 1.7 GHz to 1.78 GHz. A bandwidth generated during resonance of the antenna structure shown in FIG. 81 is wider.

As shown in FIG. 83, within the foregoing frequency band, compared with the efficiency (total efficiency and radiation efficiency) of the antenna structure shown in FIG. 78, efficiency of the antenna structure shown in FIG. 79 is approximately the same as that of the antenna structure shown in FIG. 78. The antenna structures shown in FIG. 80 and FIG. 81 may improve the efficiency of the antenna structures. For example, the total efficiency (at 1.75 GHz) of the antenna structure shown in FIG. 81 is improved by more than 1.1 dB.

Figure 84:
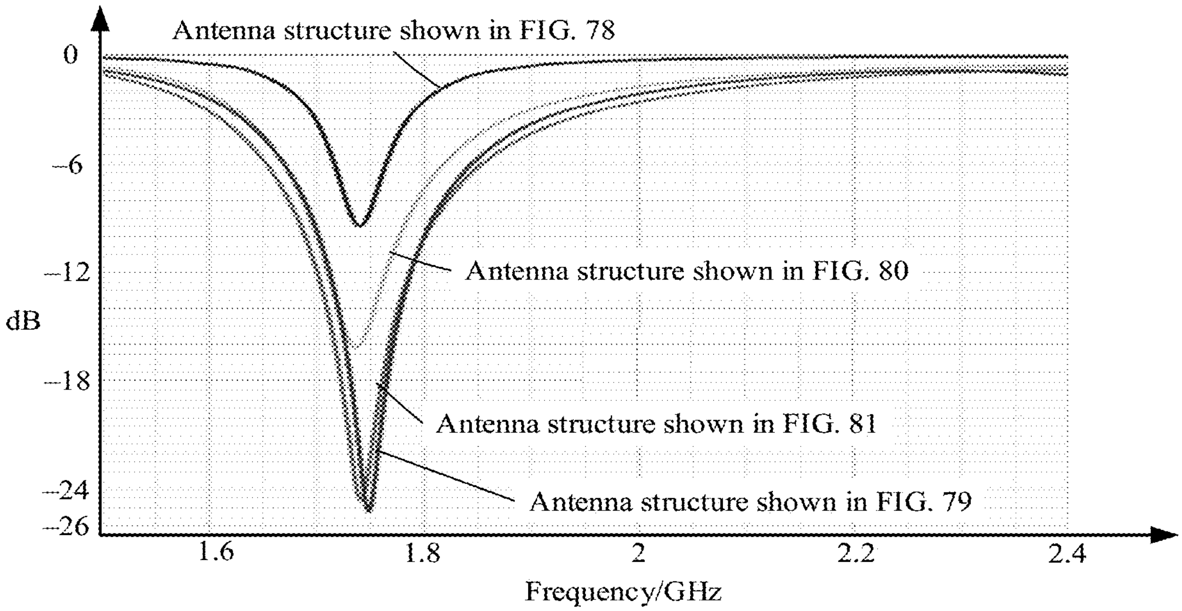
FIG. 84 is a diagram of S-parameters of the antenna structures shown in FIG. 78 to FIG. 81 in a DM mode according to an embodiment of this application.
Figure 85:
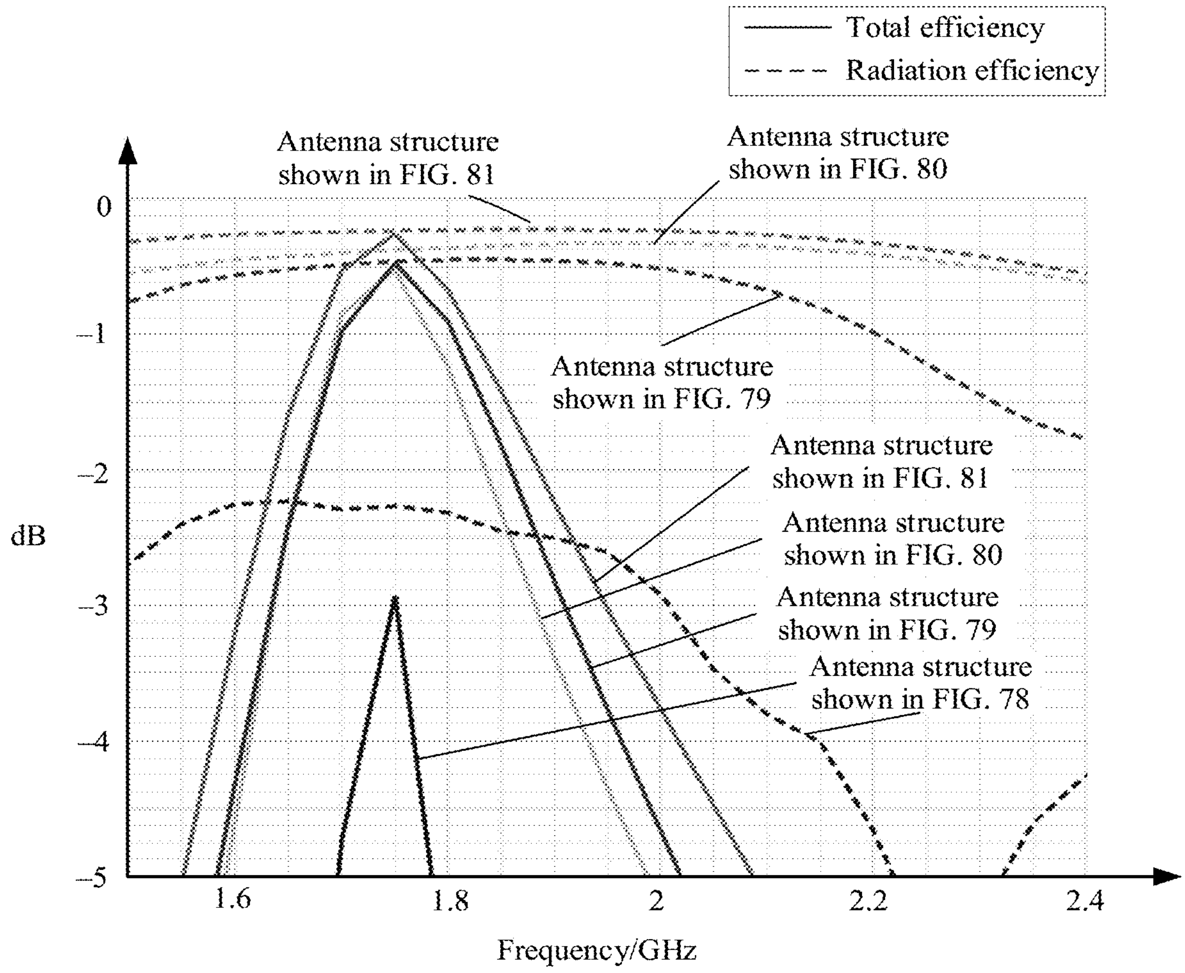
FIG. 85 is a diagram of simulation results of total efficiency and radiation efficiency of the antenna structures shown in FIG. 78 to FIG. 81 in a DM mode according to an embodiment of this application.

FIG. 84 and FIG. 85 are diagrams of simulation results of the antenna structures shown in FIG. 78 to FIG. 81 in a DM mode. FIG. 84 is a diagram of S-parameters of the antenna structures shown in FIG. 78 to FIG. 81 in a DM mode according to an embodiment of this application. FIG. 85 is a diagram of simulation results of total efficiency and radiation efficiency of the antenna structures shown in FIG. 78 to FIG. 81 in a DM mode according to an embodiment of this application.

It should be understood that, for ease of intuitive display of comparison of antenna efficiency when the loop antenna operates in the DM mode, an example in which the antenna structure excites the DM mode in a central anti-symmetrical feed manner is used for description. In addition, the antenna structures shown in FIG. 84 and FIG. 85 operate in a half-wavelength mode of the DM mode. To ensure that the antenna structures shown in FIG. 78 to FIG. 81 operate in a same frequency band, a length of the radiator in the antenna structures is adjusted. In the antenna structure shown in FIG. 78, the length of the radiator is 42.8 mm. In the antenna structure shown in FIG. 79, the length of the radiator is 62.8 mm, and equivalent capacitance values of the capacitor 441 and the capacitor 442 are 0.2 pF. In the antenna structure shown in FIG. 80, the length of the radiator is 62.8 mm, and inductance values of the inductor 451 and the inductor 452 are both 2 nH. In the antenna structure shown in FIG. 81, the length of the radiator is 62.8 mm, equivalent capacitance values of the capacitor 461 and the capacitor 362 are 0.6 pF, and inductance values of the inductor 463 and the inductor 464 are both 3.5 nH.

As shown in FIG. 84, S11<−4 dB is used as an example. The antenna structures shown in FIG. 78 to FIG. 81 operate in a DM mode, and operating frequency bands all include 1.7 GHz to 1.78 GHz. A bandwidth generated during resonance of the antenna structure shown in FIG. 81 is wider.

Figure 80:
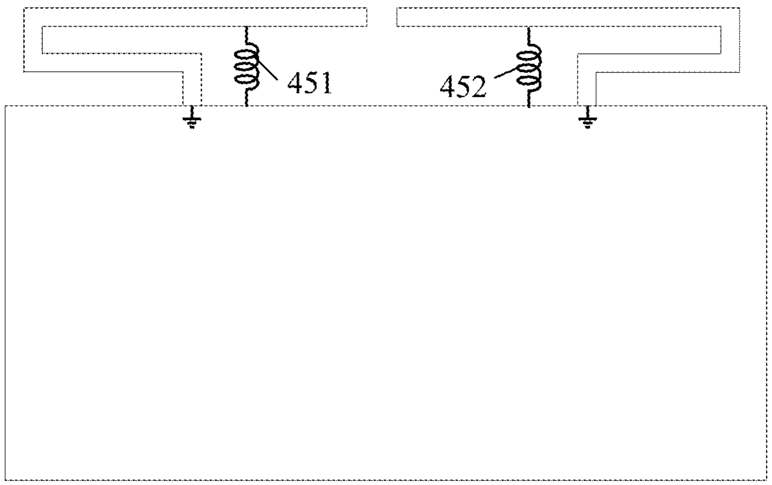
FIG. 80 is a diagram of an antenna structure according to an embodiment of this application.

As shown in FIG. 85, within the foregoing frequency band, compared with the efficiency (total efficiency and radiation efficiency) of the antenna structure shown in FIG. 78, efficiency of the antenna structure shown in FIG. 79 and the antenna structures shown in FIG. 80 and FIG. 81 may be improved. For example, the total efficiency (at 1.75 GHz) of the antenna structure shown in FIG. 81 is improved by more than 2 dB.

Figure 86:
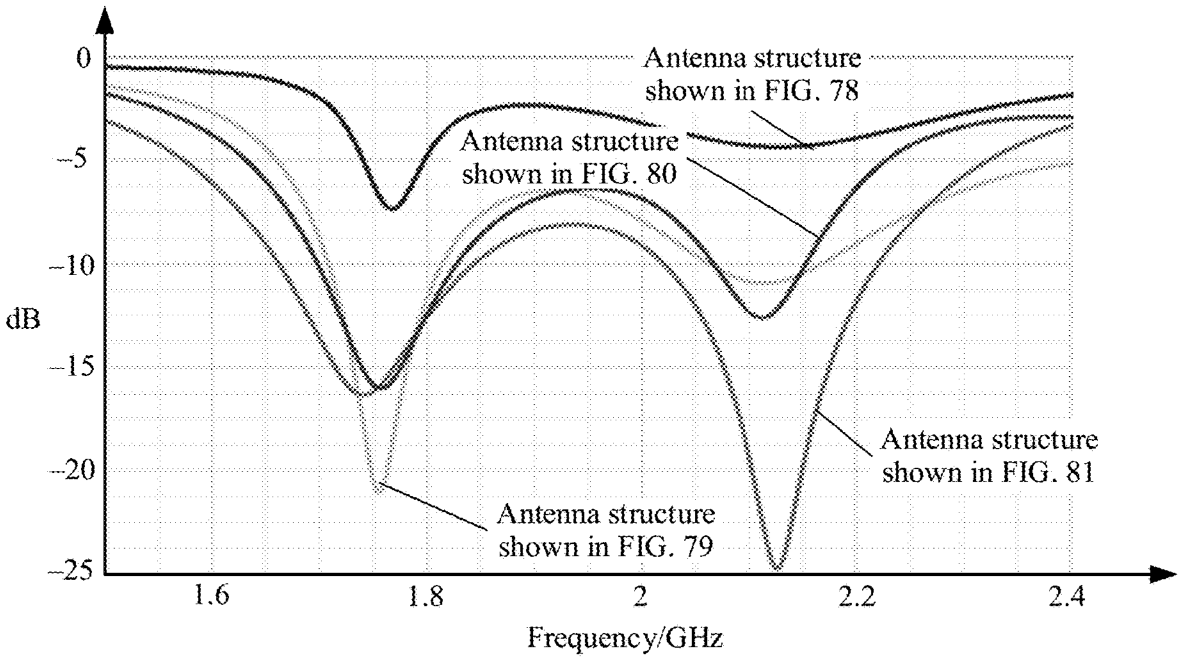
FIG. 86 is a diagram of S-parameters of the antenna structures shown in FIG. 78 to FIG. 81 according to an embodiment of this application.
Figure 87:
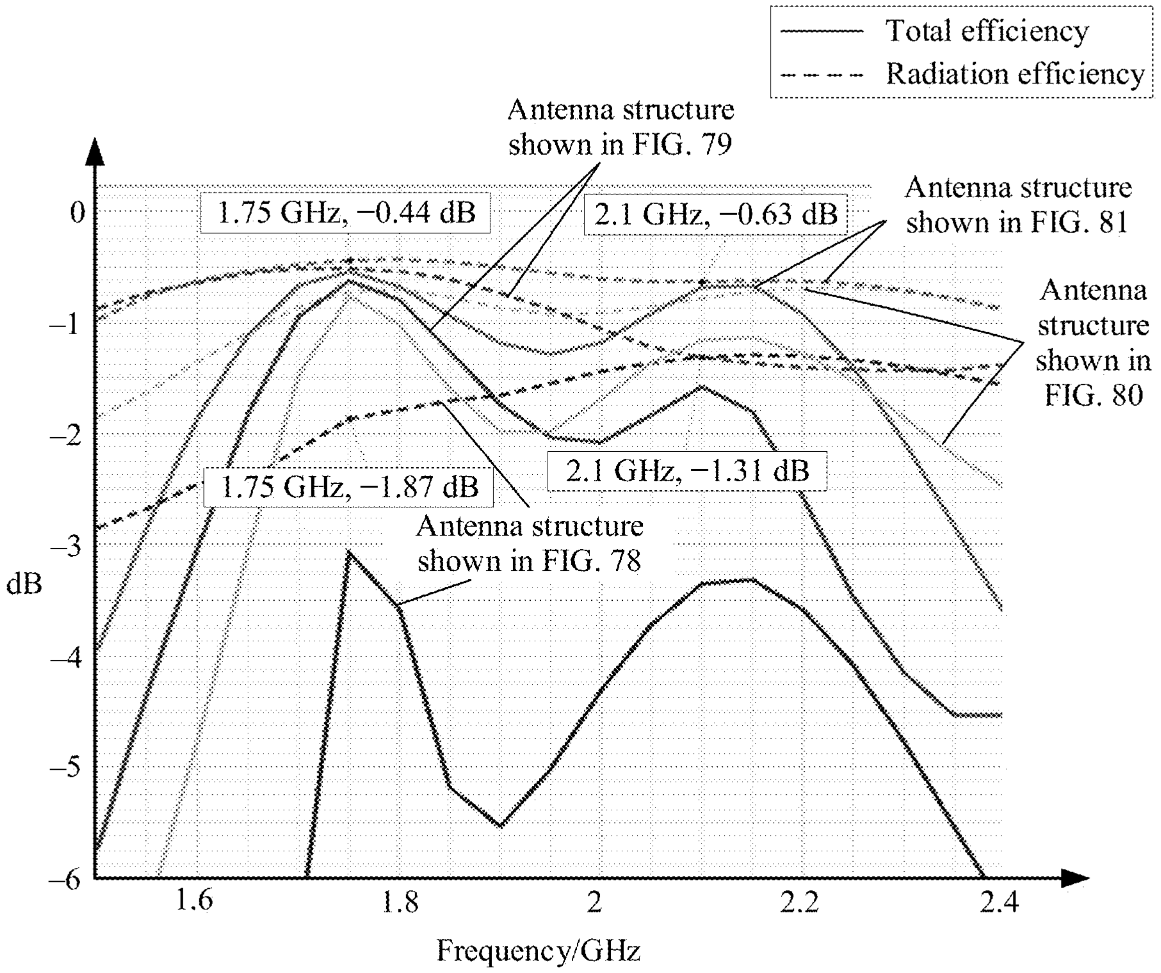
FIG. 87 is a diagram of simulation results of total efficiency and radiation efficiency of the antenna structures shown in FIG. 78 to FIG. 81 according to an embodiment of this application.

FIG. 86 and FIG. 87 are diagrams of simulation results of the antenna structures shown in FIG. 78 to FIG. 81 in a CM mode and a DM mode. FIG. 86 is a diagram of S-parameters of the antenna structures shown in FIG. 78 to FIG. 81 according to an embodiment of this application. FIG. 87 is a diagram of simulation results of total efficiency and radiation efficiency of the antenna structures shown in FIG. 78 to FIG. 81 according to an embodiment of this application.

It should be understood that, for ease of intuitive display of comparison of antenna efficiency when the loop antenna operates in the CM mode and the DM mode, an example in which the antenna structure simultaneously excites the CM mode and the DM mode in an offset feed manner is used for description. To ensure that the antenna structures shown in FIG. 78 to FIG. 81 operate in a same frequency band, a length of the radiator in the antenna structures is adjusted. In the antenna structure shown in FIG. 78, the length of the radiator is 42.8 mm. In the antenna structure shown in FIG. 79, the length of the radiator is 62.8 mm, an equivalent capacitance value of the distributed capacitor 441 or a capacitance value of the lumped capacitor 441 is 0.4 pF, an equivalent capacitance value of the distributed capacitor 442 or a capacitance value of the lumped capacitor 442 is 0.1 pF, and a capacitor is disposed at a central gap with a capacitance value of 0.45 pF. In the antenna structure shown in FIG. 80, the length of the radiator is 62.8 mm, inductance values of the inductor 451 and the inductor 452 are both 8 nH, and a capacitor is disposed at a central gap with a capacitance value of 0.1 pF. In the antenna structure shown in FIG. 81, the length of the radiator is 62.8 mm, an equivalent capacitance value of the distributed capacitor 461 or a capacitance value of the lumped capacitor 461 is 0.2 pF, an equivalent capacitance value of the distributed capacitor 462 or a capacitance value of the lumped capacitor 462 is 0.4 pF, an inductance value of the inductor 463 is 8 nH, an inductance value of the inductor 464 is 5 nH, and a distributed capacitor or a lumped capacitor is disposed at a central gap with an equivalent capacitance value of 0.15 pF.

As shown in FIG. 86, S11<−4 dB is used as an example. The antenna structures shown in FIG. 78 to FIG. 81 operate in a CM mode and a DM mode, operating frequency bands corresponding to the CM mode include 2.05 GHz to 2.2 GHz, and operating frequency bands corresponding to the DM mode all include 1.74 GHz to 1.8 GHz. A bandwidth generated during resonance of the antenna structure shown in FIG. 81 is wider.

As shown in FIG. 87, within the foregoing frequency band, compared with the efficiency (total efficiency and radiation efficiency) of the antenna structure shown in FIG. 78, efficiency of the antenna structure in the DM mode may be improved by using the antenna structure shown in FIG. 79, but efficiency in the CM mode is not significantly improved. The antenna structures shown in FIG. 80 and FIG. 81 may improve the efficiency of the antenna structures in both the CM mode and the DM mode. For example, the total efficiency (at 2.1 GHz and 1.75 GHz) of the antenna structure shown in FIG. 81 is respectively improved by more than 1.3 dB and 0.7 dB in the CM mode and the DM mode.

SAR values of the antenna structures shown in FIG. 78 to FIG. 81 are shown in Table 7. An example in which input power is 24 dbm is used for description.

TABLE 7

| Antenna structure | FIG. 78 | | FIG. 79 | | FIG. 80 | | FIG. 81 | |
|---|---|---|---|---|---|---|---|---|
| Frequency (GHz) | 1.75 | 2.1 | 1.75 | 2.1 | 1.75 | 2.1 | 1.75 | 2.1 |
| Bottom (5 mm) 10 g normalization | 0.468 | 0.713 | 0.614 | 0.616 | 0.337 | 0.342 | 0.392 | 0.278 |
| Rear (5 mm) 10 g normalization | 0.887 | 1.378 | 0.806 | 0.802 | 0.777 | 0.724 | 0.681 | 0.638 |

As shown in Table 7, compared with the antenna structure shown in FIG. 78, the antenna structure shown in FIG. 79 has good SAR values at both 1.75 GHz (CM mode) and 2.1 GHz (DM mode), and the antenna structure shown in FIG. 80 has better SAR values at both 1.75 GHz (CM mode) and 2.1 GHz (DM mode). Features of the antenna structure shown in FIG. 79 and the antenna structure shown in FIG. 80 are combined in the antenna structure shown in FIG. 81. Therefore, the antenna structure shown in FIG. 81 has optimal SAR values at both 1.75 GHz (CM mode) and 2.1 GHz (DM mode).

A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An electronic device, comprising:

a radiator comprising:

a first end that is an open end;

a second end that is an open end;

a central area between the first end and the second end;

a part extending from the first end to the second end, configured to generate a first resonance having a medium wavelength, and having a length that is greater than three-quarters of the medium wavelength;

a ground point disposed in the central area of the radiator;

a first connection point disposed in the central area, wherein a distance between the first connection point and the first end is less than a quarter of the medium wavelength; and a second connection point disposed in the central area and between the first connection point and the second end;

a ground plane configured to ground the radiator at the ground point through the ground plane;

a first inductor electrically connected between the first connection point and the ground plane, wherein the first inductor comprises a first inductance value; and a second inductor electrically connected between the second connection point and the ground plane, wherein the second inductor comprises a second inductance value, wherein the first inductance value and the second inductance value are both less than or equal to a first threshold.

2. The electronic device according to claim 1, wherein the first resonance comprises a first resonance frequency, wherein when the first resonance frequency is less than or equal to 1 gigahertz (GHz), the first threshold is 6 nanohenries (nH), wherein when the first resonance frequency is greater than 1 GHz and less than or equal to 2.2 GHz, the first threshold is 4 nH, wherein when the first resonance frequency is greater than 2.2 GHz and less than or equal to 3 GHz, the first threshold is 3 nH, and wherein when the first resonance frequency is greater than 3 GHz, the first threshold is 2 nH.

3. The electronic device according to claim 1, wherein the first connection point is disposed between the first end and the ground point, wherein the second connection point is further disposed between the second end and the ground point, and wherein a distance between the second connection point and the second end is less than a quarter of the medium wavelength.

4. The electronic device according to claim 1, further comprising at least one of:

a third inductor electrically connected between a third connection point of the radiator and the ground plane, wherein the third connection point is disposed between the ground point and the first connection point; or a fourth inductor electrically connected between a fourth connection point of the radiator and the ground plane, wherein the fourth connection point is disposed between the ground point and the second connection point.

5. The electronic device according to claim 1, further comprising one or more insulation gaps disposed on the radiator, wherein a width of each of the insulation gaps is greater than or equal to 0.1 millimeters (mm) and less than or equal to 2 mm.

6. The electronic device according to claim 1, further comprising:

a conductive frame comprising a first point and a second point, wherein the radiator is a portion of the conductive frame between the first point and the second point, wherein the central area of the radiator is an area within 5 mm from a center of the radiator; and insulation gaps disposed at the first point and the second point.

7. An electronic device, comprising:

a radiator, comprising:

a first end;

a second end;

a part extending from the first end to the second end, configured to generate a first resonance having a medium wavelength, and having a length that is greater than three-quarters of the medium wavelength;

a first connection point disposed between a center of the radiator and the first end, wherein a distance between the first connection point and the center of the radiator is less than one-eighth of the medium wavelength; and a second connection point disposed between the first connection point and the second end;

a ground plane configured to ground the radiator at the first end and the second end through the ground plane;

a first inductor electrically connected between the first connection point and the ground plane, wherein the first inductor comprises a first inductance value; and a second inductor electrically connected between the second connection point and the ground plane, wherein the second inductor comprises a second inductance value, and wherein the first inductance value and the second inductance value are both less than a first threshold.

8. The electronic device according to claim 7, wherein a distance between the first end and the second end is equal to the length of the radiator and the first threshold is 6 nanohenries (nH) when a first resonance frequency of the first resonance is less than or equal to 1 gigahertz (GHz), 4 nH when the first resonance frequency is greater than 1 GHz and less than or equal to 2.2 GHz, 3 nH when the first resonance frequency is greater than 2.2 GHz and less than or equal to 3 GHz, 2 nH when the first resonance frequency is greater than 3 GHz, or wherein the distance between the first end and the second end is less than the length of the radiator and the first threshold is 20 nH when the first resonance frequency is less than or equal to 1 GHz, 16 nH when the first resonance frequency is greater than 1 GHz and less than or equal to 2.2 GHz, 12 nH when the first resonance frequency is greater than 2.2 GHz and less than or equal to 3 GHz, and 10 nH when the first resonance frequency is greater than 3 GHz.

9. The electronic device according to claim 7, wherein the second connection point is further disposed between the second end and the center of the radiator, and wherein a distance between the second connection point and the center of the radiator is less than one-eighth of the medium wavelength.

10. The electronic device according to claim 7, further comprising at least one of:

a third inductor electrically connected between a third connection point of the radiator and the ground plane, wherein the third connection point is disposed between the center of the radiator and the first connection point; or a fourth inductor electrically connected between a fourth connection point of the radiator and the ground plane, wherein the fourth connection point is disposed between the center of the radiator and the second connection point.

11. The electronic device according to claim 7, further comprising one or more insulation gaps disposed on the radiator, wherein a width of each of the insulation gaps is greater than or equal to 0.1 millimeters (mm) and less than or equal to 2 mm.

12. The electronic device according to claim 7, further comprising a conductive frame having a first point and a second point, wherein the conductive frame comprises:

a first frame portion between the first point and the second point, wherein the first frame portion comprises the radiator; and a second frame portion being continuous at the first point and the second point.

13. An electronic device, comprising:

a radiator, comprising:

a first part configured to generate a first resonance having a medium wavelength, and having a length that is greater than three-eighths of the medium wavelength, and wherein the first part comprises:

a first end;

a second end that is an open end;

a feed point disposed between the first end and the second end; and a first connection point disposed between the feed point and the first end, wherein a distance between the first connection point and the second end is less than a quarter of the medium wavelength;

a ground plane configured to ground the radiator at the first end through the ground plane; and a first inductor electrically connected between the first connection point and the ground plane, wherein the first inductor comprises a first inductance value that is less than a first threshold.

14. The electronic device according to claim 13, wherein the radiator further comprises a second connection point disposed between the first connection point and the first end, and wherein the electronic device further comprises a second inductor electrically connected between the second connection point and the ground plane.

15. The electronic device according to claim 13, wherein the radiator further comprises a second part, wherein the length of the first part is different from a length of the second part, wherein the length of the second part is greater than three-eighths of a second wavelength, wherein the second part is configured to generate a second resonance, wherein the second wavelength is the medium wavelength of the second resonance, wherein the second part comprises:

a third end connected to the first end to form a continuous radiator;

a fourth end that is an open end; and a third connection point disposed between the third end and the fourth end, wherein a distance between the third connection point and the fourth end is less than a quarter of the second wavelength, wherein the electronic device further comprises a third inductor electrically connected between the third connection point and the ground plane, and wherein the third inductor comprises a third inductor value that is less than a second threshold.

16. The electronic device according to claim 15, wherein the second resonance comprises a second resonance frequency, wherein when the second resonance frequency is less than or equal to 1 gigahertz (GHz), the second threshold is 6 nanohenries (nH), wherein when the second resonance frequency is greater than 1 GHz and less than or equal to 2.2 GHz, the second threshold is 4 nH, wherein when the second resonance frequency is greater than 2.2 GHz and less than or equal to 3 GHz, the second threshold is 3 nH, and wherein when the second resonance frequency is greater than 3 GHz, the second threshold is 2 nH.

17. The electronic device according to claim 13, wherein the first resonance comprises a first resonance frequency, wherein when the first resonance frequency is less than or equal to 1 GHz, the first threshold is 6 nH, wherein when the first resonance frequency is greater than 1 GHz and less than or equal to 2.2 GHz, the first threshold is 4 nH, wherein when the first resonance frequency is greater than 2.2 GHz and less than or equal to 3 GHz, the first threshold is 3 nH, and wherein when the first resonance frequency is greater than 3 GHz, the first threshold is 2 nH.

18. An electronic device, comprising:

a radiator, comprising:

a first end;

a second end;

a radiator portion from the first end to the second end configured to generate a first resonance;

a first connection point disposed between the first end and the second end; and a second connection point disposed between the first end and the second end;

a ground plane configured to ground the radiator;

a first inductor electrically connected between the first connection point and the ground plane, wherein the first inductor comprises a first inductor value that is less than or equal to a first threshold;

a second inductor electrically connected between the second connection point and the ground plane, wherein the second inductor comprises a second inductor value that is less than or equal to the first threshold;

a first area between the first connection point and the second connection point; and a second area comprising a connection between the first inductor and the ground plane and a connection between the second inductor and the ground plane, wherein at least one of a first current of the radiator in the first area or a second current of the ground plane in the second area comprises a current reverse area, and wherein when the radiator generates the first resonance, magnetic fields generated by the radiator between the first area and the ground plane are in a same direction.

19. The electronic device according to claim 18, wherein there is no switch between the first inductor and the radiator or the ground plane, and wherein there is no switch between the second inductor and the radiator or the ground plane.

20. The electronic device according to claim 18, further comprising an insulation gap disposed on the radiator, wherein when the radiator generates the first resonance, at least one of:

a third current of the radiator in a fifth area does not comprise the current reverse area and the fifth area comprises the insulation gap; or a magnetic field of the radiator in the fifth area comprises a magnetic field reverse area.

* * * * *